US012579943B2

(12) United States Patent
Kozuma et al.

(10) Patent No.: US 12,579,943 B2
(45) Date of Patent: Mar. 17, 2026

(54) DISPLAY APPARATUS, DISPLAY MODULE, AND ELECTRONIC DEVICE

(71) Applicant: SEMICONDUCTOR ENERGY LABORATORY CO., LTD., Atsugi (JP)

(72) Inventors: Munehiro Kozuma, Atsugi (JP); Tatsuya Onuki, Atsugi (JP); Hidetomo Kobayashi, Isehara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/293,869

(22) PCT Filed: Jul. 28, 2022

(86) PCT No.: PCT/IB2022/056968
§ 371 (c)(1),
(2) Date: Jan. 31, 2024

(87) PCT Pub. No.: WO2023/017349
PCT Pub. Date: Feb. 16, 2023

(65) Prior Publication Data
US 2024/0331641 A1 Oct. 3, 2024

(30) Foreign Application Priority Data
Aug. 10, 2021 (JP) ................................. 2021-130589

(51) Int. Cl.
*G09G 3/3266* (2016.01)
*G06F 3/042* (2006.01)
(Continued)

(52) U.S. Cl.
CPC ........... *G09G 3/3266* (2013.01); *G06F 3/042* (2013.01); *G06V 40/1318* (2022.01);
(Continued)

(58) Field of Classification Search
CPC ............... G09G 3/3266; G09G 3/3233; G09G 2300/0426; G09G 2300/0842;
(Continued)

(56) References Cited

U.S. PATENT DOCUMENTS

| | | | | |
|---|---|---|---|---|
| 6,747,290 B2 * | 6/2004 | Yamazaki | .............. | H10K 59/65 257/53 |
| 7,006,080 B2 * | 2/2006 | Gettemy | ............... | G06F 3/0421 345/173 |

(Continued)

FOREIGN PATENT DOCUMENTS

| | | | | |
|---|---|---|---|---|
| CN | 100452665 C | * | 1/2009 | ........... G09G 3/3266 |
| CN | 101446873 A | | 6/2009 | |

(Continued)

OTHER PUBLICATIONS

International Search Report (Application No. PCT/IB2022/056968) Dated Oct. 25, 2022.

(Continued)

*Primary Examiner* — Ricardo Osorio
(74) *Attorney, Agent, or Firm* — Fish & Richardson P.C.

(57) ABSTRACT

To provide a display apparatus with a novel structure. A display portion including a first subpixel, a second subpixel, a first gate line supplied with a first selection signal to scan the first subpixel, and a second gate line supplied with a second selection signal to scan the second subpixel; and a driver control circuit including a gate line driver circuit, a switching portion that allots the first selection signal or the second selection signal output from the gate line driver circuit to the first gate line or the second gate line to be output, and a timing control circuit that controls the switching portion are included. The timing control circuit allows the gate line driver circuit to output the first selection signal of a first frame frequency and the second selection signal having a selection period longer than the first selection (Continued)

signal in a first operation mode, and to output the first selection signal and the second selection signal with a second frame frequency lower than the first frame frequency in a second operation mode.

16 Claims, 41 Drawing Sheets

(51) Int. Cl.
*G06V 40/13* (2022.01)
*G09G 3/3233* (2016.01)

(52) U.S. Cl.
CPC ... *G09G 3/3233* (2013.01); *G09G 2300/0426* (2013.01); *G09G 2300/0842* (2013.01); *G09G 2310/0286* (2013.01); *G09G 2310/08* (2013.01); *G09G 2330/021* (2013.01); *G09G 2354/00* (2013.01); *G09G 2360/14* (2013.01)

(58) Field of Classification Search
CPC ....... G09G 2310/0246; G09G 2310/08; G09G 2330/021; G09G 2354/00; G09G 2360/14; G09G 2310/0286; G03F 3/042; G06F 3/042; G06V 40/1318
See application file for complete search history.

(56) References Cited

U.S. PATENT DOCUMENTS

| | | | | |
|---|---|---|---|---|
| 8,416,227 | B2 | 4/2013 | Fujioka et al. | |
| 8,587,560 | B2 | 11/2013 | Tateuchi et al. | |
| 8,638,317 | B2 * | 1/2014 | Harada | G06F 3/0412 |
| | | | | 345/212 |
| 9,570,002 | B2 * | 2/2017 | Sakariya | G06F 3/042 |
| 10,162,457 | B2 | 12/2018 | Ito et al. | |
| 10,739,884 | B2 | 8/2020 | Ota et al. | |
| 11,574,571 | B2 * | 2/2023 | Nishio | G09G 3/3233 |
| 2006/0103637 | A1 * | 5/2006 | Yamaguchi | G09G 3/3648 |
| | | | | 345/175 |
| 2006/0274026 | A1 * | 12/2006 | Kerofsky | G09G 3/3406 |
| | | | | 345/102 |
| 2009/0284505 | A1 | 11/2009 | Tateuchi et al. | |
| 2010/0177060 | A1 * | 7/2010 | Han | G06F 3/042 |
| | | | | 345/174 |

| | | | | |
|---|---|---|---|---|
| 2010/0237990 | A1 * | 9/2010 | Amano | A61B 5/0059 |
| | | | | 340/5.82 |
| 2010/0292578 | A1 * | 11/2010 | Sato | A61B 5/489 |
| | | | | 600/473 |
| 2011/0007047 | A1 | 1/2011 | Fujioka et al. | |
| 2017/0010739 | A1 | 1/2017 | Ito et al. | |
| 2018/0095575 | A1 | 4/2018 | Ota et al. | |
| 2018/0349669 | A1 * | 12/2018 | Kim | G06F 3/041 |
| 2019/0130087 | A1 | 5/2019 | Mori et al. | |
| 2020/0168159 | A1 * | 5/2020 | Kim | G09G 3/3266 |
| 2021/0374378 | A1 | 12/2021 | Kobayashi et al. | |
| 2021/0391388 | A1 * | 12/2021 | Nakagawa | H10K 65/00 |
| 2022/0285461 | A1 * | 9/2022 | Hatsumi | H10K 59/40 |
| 2022/0294981 | A1 * | 9/2022 | Kubota | H10K 39/32 |

FOREIGN PATENT DOCUMENTS

| | | | | |
|---|---|---|---|---|
| CN | 101960372 A | | 1/2011 | |
| CN | 112840456 A | | 5/2021 | |
| CN | 113614819 A | * 11/2021 | ........... G09G 3/3241 |
| EP | 1406240 A2 | * 4/2004 | ........... G02F 1/1362 |
| EP | 2249201 A | | 11/2010 | |
| JP | H1011018 A | * 1/1998 | |
| JP | 2000259348 A | * 9/2000 | |
| JP | 2009-129271 A | | 6/2009 | |
| JP | 2016-045329 A | | 4/2016 | |
| JP | 2017-016560 A | | 1/2017 | |
| JP | 2018-010829 A | | 1/2018 | |
| JP | 2018-060319 A | | 4/2018 | |
| JP | 2019-079415 A | | 5/2019 | |
| KR | 2009-0054374 A | | 5/2009 | |
| KR | 20150082901 A | * 7/2015 | |
| KR | 20200002908 A | * 1/2020 | |
| KR | 2021-0076019 A | | 6/2021 | |
| KR | 20210114578 A | * 9/2021 | |
| WO | WO-2009/110294 | | 9/2009 | |
| WO | WO-2015137706 A1 | * 9/2015 | ........... G06F 3/0412 |
| WO | WO-2020/075002 | | 4/2020 | |
| WO | WO-2020075002 A1 | * 4/2020 | ........... A61B 5/0002 |
| WO | WO-2020194492 A1 | * 10/2020 | ........... G09G 3/035 |
| WO | WO-2020194493 A1 | * 10/2020 | ........... G09G 3/3241 |

OTHER PUBLICATIONS

Written Opinion (Application No. PCT/IB2022/056968) Dated Oct. 25, 2022.

* cited by examiner

FIG. 40A
FIG. 40B
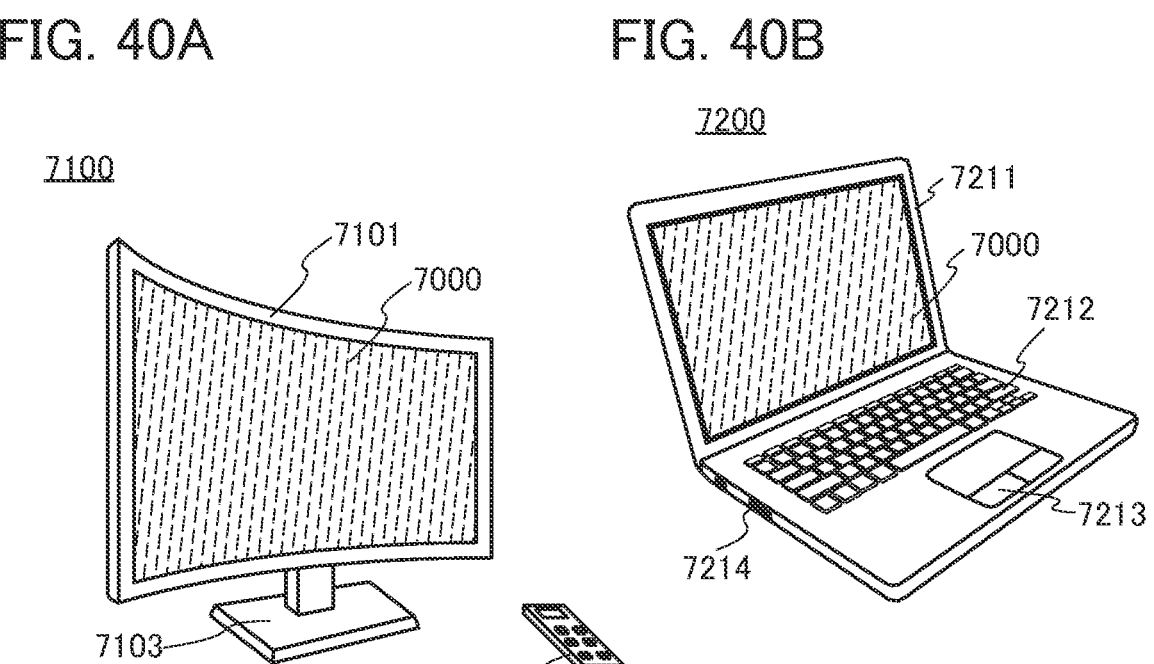
FIG. 40C
FIG. 40D
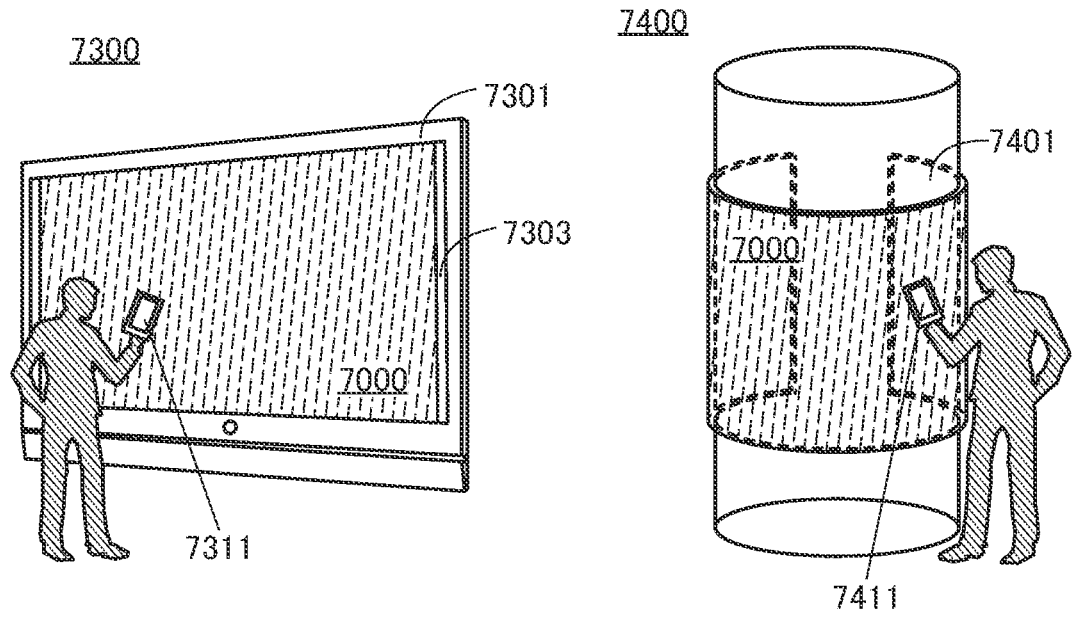

FIG. 41A
9101
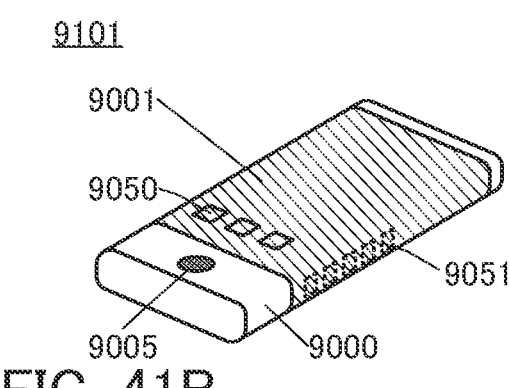
FIG. 41B
9102
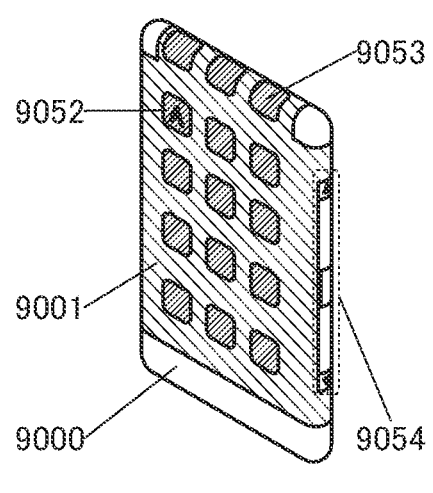
FIG. 41C
9200
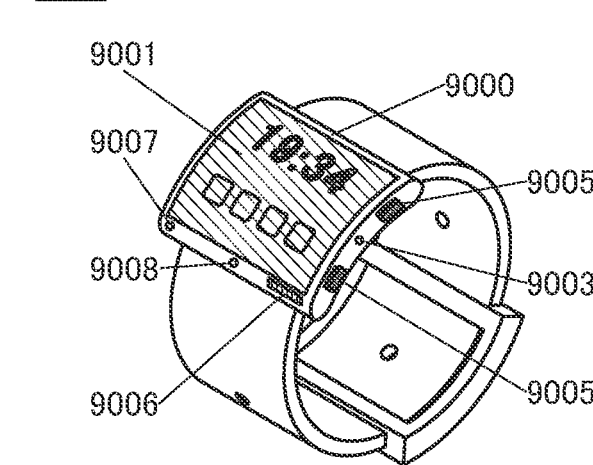
FIG. 41D
9201
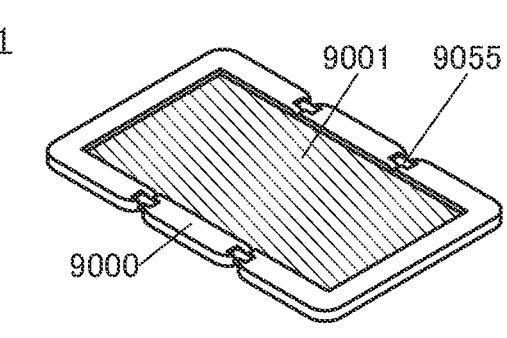
FIG. 41E
9201
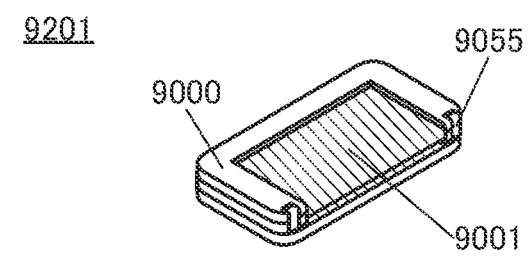
FIG. 41F
9201

DISPLAY APPARATUS, DISPLAY MODULE, AND ELECTRONIC DEVICE

CROSS REFERENCE TO RELATED APPLICATIONS

This application is a U.S. National Phase Application under 35 U.S.C. § 371 of International Application PCT/IB2022/056968, filed on Jul. 28, 2022, which is incorporated by reference and claims the benefit of a foreign priority application filed in Japan on Aug. 10, 2021, as Application No. 2021-130589.

TECHNICAL FIELD

One embodiment of the present invention relates to a semiconductor device, a display apparatus, a display module, and an electronic device. One embodiment of the present invention relates to a method for manufacturing a display apparatus.

Note that one embodiment of the present invention is not limited to the above technical field. Examples of the technical field of one embodiment of the present invention include a semiconductor device, a display apparatus, a light-emitting device, a power storage device, a memory device, an electronic device, a lighting device, an input device (e.g., a touch sensor), an input/output device (e.g., a touch panel), a driving method thereof, and a manufacturing method thereof.

BACKGROUND ART

Commoditization of display apparatuses used in information terminal devices such as a smartphone has progressed as a result of recent technological innovation, and thus such display apparatuses are required to be higher value-added products to gain a competitive edge in the commoditization. For example, display apparatuses have been used for not only taking a photograph or a moving image but also biometric authentication such as face authentication, fingerprint authentication, and vein authentication or light-receiving devices such as touch sensors or motion sensors, for example; that is, the usage has been diversified. Patent Document 1 discloses an electronic device such as a smartphone that can perform fingerprint authentication.

REFERENCE

Patent Document

[Patent Document 1] Japanese Published Patent Application No. 2019-79415

SUMMARY OF THE INVENTION

Problems to be Solved by the Invention

A detection operation performed by driving a light-receiving device is performed between the display operations. In order to improve a display quality by display operation, the frame frequency of display is preferably increased. In the case where display operation and detection operation are alternately performed, the frequency of the display operation is increased and the frequency of the detection operation is reduced, whereby the frame frequency of the display can be increased. However, in the case where scan of a subpixel including a light-emitting device for display operation and scan of a subpixel including a light-receiving device for detection operation are controlled at different timings, control signals are supplied to respective driver circuits, the circuit scale of driver circuits is increased unfortunately.

In the case where the accuracy of detection operation performed by driving the light-receiving device is increased, the frequency of detection operation is preferably increased and the frequency of display operation is preferably reduced. In order to ensure both the improved display quality by display operation and the accuracy of detection operation, a preferred structure is that a state with a high frame frequency of display and a state with a high frequency of detection operation can be switched. In addition, the number of selection signals to scan the subpixels including the light-receiving devices is increased, whereby the accuracy of detection operation can be further increased. However, if the frequency of sensing operation is variable in the case where the number of selection signals to scan the subpixels including light-receiving devices is large, unfortunately, power consumption is increased due to unnecessary and continual detection operations.

An object of one embodiment of the present invention is to provide a display apparatus or the like having a novel structure. Another object of one embodiment of the present invention is to provide a display apparatus or the like having a novel structure that can suppress an increase in a circuit scale. Another object of one embodiment of the present invention is to provide a display apparatus or the like having a novel structure that can suppress an increase in power consumption. Another object of one embodiment of the present invention is to provide a display apparatus or the like having a novel structure that can an increase of the circuit scale and can lower power consumption in the display apparatus in which detection operations and display operations are alternately performed.

Note that the description of these objects does not preclude the existence of other objects. One embodiment of the present invention does not need to achieve all of these objects. Other objects can be derived from the description of the specification, the drawings, and the claims.

Means for Solving the Problems

One embodiment of the present invention is a display apparatus that includes a display portion including a first subpixel including a light-emitting device, a second subpixel including a light-receiving device, a first gate line supplied with a first selection signal to scan the first subpixel, and a second gate line supplied with a second selection signal to scan the second subpixel; a first switching portion that allots the first selection signal or the second selection signal output from a gate line driver circuit to the first gate line or the second gate line to be output; and a driver control circuit including a gate line driver circuit that outputs the first selection signal or the second selection signal, a second switching portion that allots the first selection signal or the second selection signal output from the gate line driver circuit to be output, and a timing control circuit that controls the first switching portion and the second switching portion. The timing control circuit has a function of switching between a first operation mode and a second operation mode. The gate line driver circuit outputs the first selection signal with a first frame frequency and the second selection signal having a selection period longer than the first selection signal in the first operation mode. The gate line driver circuit outputs the first selection signal and the second selection signal with a second frame frequency lower than the first frame frequency in the second operation mode.

In a preferred embodiment of the display apparatus of the present invention, the first switching portion and the second switching portion each include an analog switch provided between the gate line driver circuit and the first gate line or the second gate line.

In a preferred embodiment of the present invention, the display apparatus further includes an image processor, and the image processor has a function of switching between the first operation mode and the second operation mode in accordance with a detection state or a non-detection state of an object by the light-receiving device.

In a preferred embodiment of the display apparatus of the present invention, the light-emitting device has a function of emitting visible light, and the light-receiving device has a function of detecting visible light.

In a preferred embodiment of the display apparatus of the present invention, the light-emitting device has a function of emitting infrared light, and the light-receiving device has a function of detecting infrared light.

One embodiment of the present invention is a display module including the display apparatus described above and at least one of a connector and an integrated circuit.

One embodiment of the present invention is an electronic device including the display module described above and at least one of a housing, a battery, a camera, a speaker, and a microphone.

Effect of the Invention

One embodiment of the present invention can provide a display apparatus or the like having a novel structure. Another embodiment of the present invention can provide a display apparatus or the like having a novel structure that can suppress an increase in a circuit scale. Another embodiment of the present invention can provide a display apparatus or the like having a novel structure that can suppress an increase in power consumption. Another embodiment of the present invention can provide a display apparatus or the like having a novel structure that can suppress an increase of the circuit scale and can reduce power consumption in the display apparatus in which detection operations and display operations are alternately performed.

Note that the description of these effects does not preclude the existence of other effects. One embodiment of the present invention does not necessarily have all of these effects. Other effects can be derived from the description of the specification, the drawings, and the claims

BRIEF DESCRIPTION OF THE DRAWINGS

FIG. 21A to FIG. 21I are top views illustrating examples of pixels.

FIG. 22A to FIG. 22E are top views illustrating examples of pixels.

FIG. 40A to FIG. 40D are diagrams illustrating examples of electronic devices.

FIG. 41A to FIG. 41F are diagrams illustrating examples of electronic devices.

MODE FOR CARRYING OUT THE INVENTION

Figure 1A:
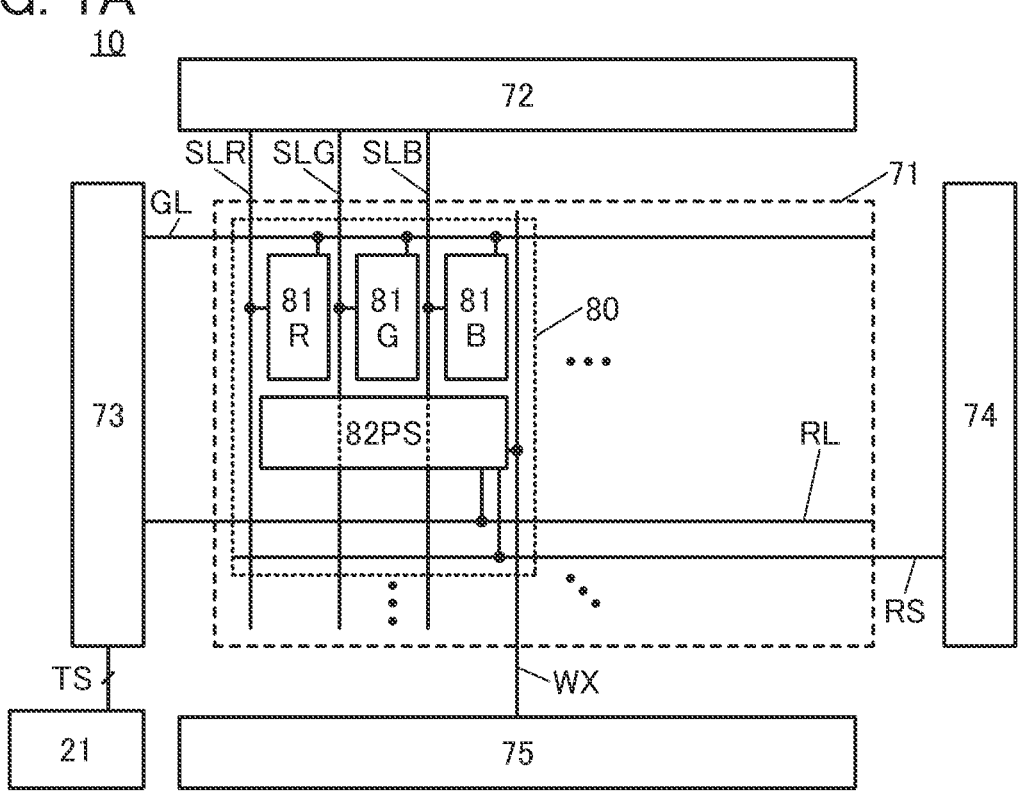
FIG. 1A and FIG. 1B are diagrams illustrating structure examples of a display apparatus.

Embodiments will be described in detail with reference to the drawings. Note that the present invention is not limited to the following description, and it will be readily understood by those skilled in the art that modes and details of the present invention can be modified in various ways without departing from the spirit and scope of the present invention. Therefore, the present invention should not be construed as being limited to the description in the following embodiments.

Note that in structures of the present invention described below, the same reference numerals are commonly used for the same portions or portions having similar functions in different drawings, and a repeated description thereof is omitted. Furthermore, the same hatch pattern is used for the portions having similar functions, and the portions are not especially denoted by reference numerals in some cases.

In addition, the position, size, range, or the like of each structure illustrated in drawings does not represent the actual position, size, range, or the like in some cases for easy understanding. Therefore, the disclosed invention is not necessarily limited to the position, size, range, or the like disclosed in the drawings.

The term "film" and the term "layer" can be interchanged with each other depending on the case or circumstances. For example, the term "conductive layer" can be replaced with the term "conductive film". As another example, the term "insulating film" can be replaced with the term "insulating layer".

Embodiment 1

In this embodiment, a display apparatus of one embodiment of the present invention will be described. In this embodiment, a circuit configuration of a pixel in the display apparatus is specifically described.

<Block Diagram of Display Apparatus>

FIG. 1A is a block diagram of a display apparatus 10. The display apparatus 10 includes a display portion 71, a signal line driver circuit 72, a gate line driver circuit 73, a control line driver circuit 74, a signal readout circuit 75, a timing control circuit 21, and the like.

The display portion 71 includes a plurality of pixels 80 arranged in a matrix. The pixel 80 includes a subpixel 81R, a subpixel 81G, a subpixel 81B, and a subpixel 82PS. The subpixel 81R, the subpixel 81G, and the subpixel 81B each include a light-emitting device functioning as a display device. The subpixel 82PS includes a light-receiving device functioning as a photoelectric conversion element.

The light-emitting device functions as a display device (also referred to as a display element). In the display apparatus of one embodiment of the present invention, the light-emitting devices are arranged in a matrix in the display portion, and an image can be displayed on the display portion. In addition, the display apparatus of one embodiment of the present invention has a function of detecting light with use of the light-receiving devices.

As the light-emitting device, an EL device such as an OLED (Organic Light Emitting Diode) or a QLED (Quantum-dot Light Emitting Diode) is preferably used. Examples of alight-emitting substance contained in the EL device include a substance exhibiting fluorescence (a fluorescent material), a substance exhibiting phosphorescence (a phosphorescent material), an inorganic compound (e.g., a quantum dot material), and a substance exhibiting thermally activated delayed fluorescence (a thermally activated delayed fluorescence (TADF) material). In addition, an LED (Light Emitting Diode) such as a micro-LED can also be used as the light-emitting device. Note that as a TADF material, a material that is in a thermal equilibrium state between a singlet excited state and a triplet excited state may be used. Since such a TADF material has a short emission lifetime (excitation lifetime), it can inhibit a reduction in the efficiency of a light-emitting device in a high-luminance region.

The light-receiving devices are arranged in a matrix in the display portion of the display apparatus of one embodiment of the present invention, and the display portion has one or both of an image capturing function and a sensing function in addition to an image displaying function. The display portion can be used as an image sensor or a touch sensor. That is, by sensing light with the display portion, an image can be captured or an approach or touch of an object (e.g., a finger, a hand, or a pen) can be detected. Furthermore, in the display apparatus of one embodiment of the present invention, the light-emitting devices can be used as a light source of the sensor. Accordingly, a light-receiving portion and a light source do not need to be provided separately from the display apparatus; hence, the number of components of an electronic device can be reduced.

In the case where the light-receiving devices are used as the image sensor, the display apparatus can capture an image with the use of the light-receiving devices. For example, the display apparatus of this embodiment can be used as a scanner.

For example, data on biological information such as a fingerprint or a palm print can be obtained with the use of the image sensor. That is, a biometric authentication sensor can be incorporated in the display apparatus. When the display apparatus incorporates a biometric authentication sensor, the number of components of an electronic apparatus can be reduced as compared to the case where a biometric authentication sensor is provided separately from the display apparatus; thus, the size and weight of the electronic apparatus can be reduced.

In the case where the light-receiving devices are used as the touch sensor, the display apparatus can detect the approach or contact of a target with use of the light-receiving devices.

The pixel 80 is electrically connected to a wiring GL, a wiring SLR, a wiring SLG, a wiring SLB, a wiring RL, a wiring RS, a wiring WX, and the like. The wiring SLR, the wiring SLG, and the wiring SLB are electrically connected to the signal line driver circuit 72. The wiring GL is electrically connected to the gate line driver circuit 73. The signal line driver circuit 72 functions as a source line driver circuit (also referred to as a source driver). The gate line driver circuit 73 is referred to as a gate driver in some cases.

The pixel 80 includes the subpixel 81R, the subpixel 81G, and the subpixel 81B as the subpixels each including a light-emitting device. For example, the subpixel 81R is a subpixel exhibiting a red color, the subpixel 81G is a subpixel exhibiting a green color, and the subpixel 81B is a subpixel exhibiting a blue color. Thus, the display apparatus 10 can perform full-color display. In the illustrated example, the pixel 80 includes the subpixels of three colors, or may include subpixels of four or more colors.

The subpixel 81R includes a light-emitting device that emits red light. The subpixel 81G includes a light-emitting device that emits green light. The subpixel 81B includes a light-emitting device that emits blue light. Note that the pixel 80 may include a subpixel including a light-emitting device that emits light of another color. For example, the pixel 80 may include, in addition to the three subpixels, a subpixel including a light-emitting device that emits white light, a subpixel including a light-emitting device that emits yellow light, or the like.

Note that in this specification and the like, although a minimum unit in which independent operation is performed in one "pixel" is defined as a "subpixel" in the description for convenience, a "subpixel" may be replaced with a "pixel".

The wiring GL is electrically connected to the subpixel 81R, the subpixel 81G, and the subpixel 81B arranged in a row direction (an extending direction of the wiring GL). The wiring SLR, the wiring SLG, and the wiring SLB are electrically connected to the subpixels 81R, the subpixels 81G, and the subpixels 81B arranged in a column direction (extending directions of the wiring SLR and the like), respectively.

The subpixel 82PS included in the pixel 80 is electrically connected to the wiring RL, the wiring RS, and the wiring WX. The wiring RL is electrically connected to the gate line driver circuit 73. The wiring RS is electrically connected to the control line driver circuit 74. The wiring WX is electrically connected to the signal readout circuit 75.

The control line driver circuit 74 has a function of generating a signal for driving the subpixel 82PS and outputting the signal to the subpixel 82PS through the wiring RS. The signal readout circuit 75 has a function of receiving a signal output from the subpixel 82PS through the wiring WX and outputting the signal to the outside as image data. The signal readout circuit 75 functions as a circuit for reading out image data.

In a structure of one embodiment of the present invention, a selection signal for selecting the subpixel 81R, the subpixel 81G, and the subpixel 81B as subpixels each including a light-emitting device (also referred to as a scan signal or a first selection signal) and a selection signal for selecting the subpixel 82PS as a subpixel including a light-receiving device (also referred to as a second selection signal) are output from the gate line driver circuit 73. That is, the gate line driver circuit 73 can be configured to switch between the scan of subpixels including light-emitting devices at the time of performing a display operation and the scan of subpixels including light-receiving devices at the time of performing a detection operation, which are controlled at different timings. With this structure, signals controlled at different timings can be output from one circuit, so that the circuit scale of the driver circuit can be downsized.

The timing control circuit 21 outputs a control signal TS for switching between the scan of subpixels including light-emitting devices at the time of performing a display operation and the scan of subpixels including light-receiving devices at the time of performing a detection operation. The timing control circuit 21 can control the operation state of switching between the scan of subpixels including light-emitting devices at the time of performing a display operation and the scan of subpixels including light-receiving devices at the time of performing a detection operation, in accordance with a signal from an application processor or a touch controller, for example.

A structure example of the gate line driver circuit 73 and a structure example of the wiring GL and the wiring RL connected to the gate line driver circuit 73 are described with reference to FIG. 1B.

Figure 1B:
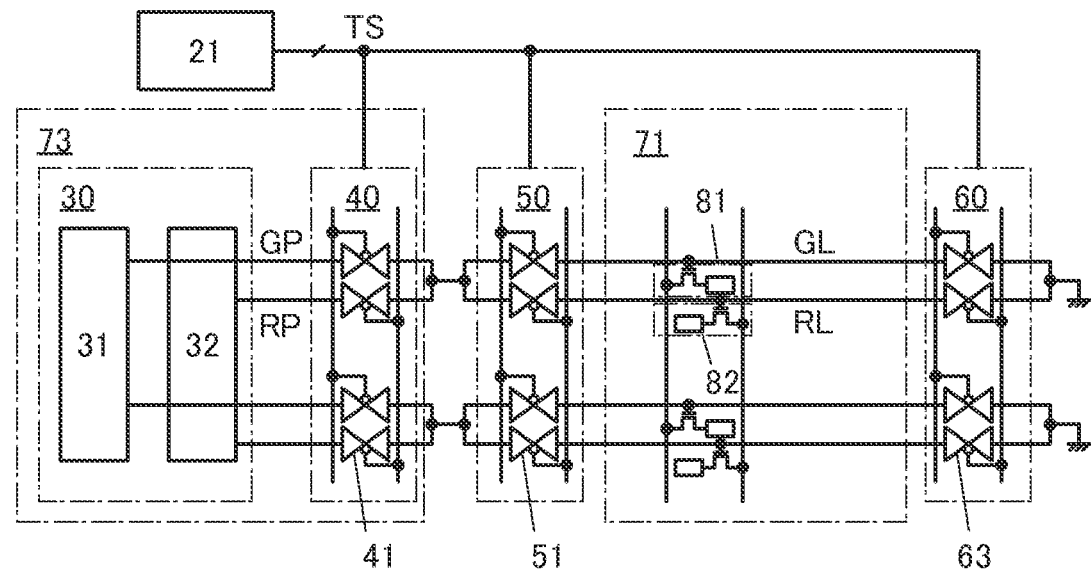

In FIG. 1B, a driver circuit portion 30 including a display portion driver circuit 31 and a sensor portion driver circuit 32 and a switching portion 40 including an analog switch 41 are illustrated as components included in the gate line driver circuit 73. In FIG. 1B, the subpixel 81 and the subpixel 82 are illustrated as components of the display portion 71 provided with the wiring GL and the wiring RL connected to the gate line driver circuit 73. In FIG. 1B, a switching portion 50 including the analog switch 51 and a switching portion 60 including the analog switch 63 are illustrated as components connected to the wiring GL and the wiring RL. FIG. 1B illustrates a timing control circuit 21 that supplies the control signal TS for controlling analog switches included in the switching portions 40, 50, and 60.

The display portion driver circuit 31 generates a selection signal GP output to the wiring GL. The sensor portion driver circuit 32 generates a selection signal RP output to the wiring RL. The selection signal GP is a signal for selecting the subpixel 81 at the time of the display operation. The selection signal RP is a signal for selecting the subpixel 82 at the time of the detection operation. Note that the subpixel 81 corresponds to the subpixel 81R, the subpixel 81G, and the subpixel 81B, and the subpixel 82 corresponds to the subpixel 82PS. In addition, the display portion driver circuit 31 and the sensor portion driver circuit 32 are configured to switch between the selection signal GP and the selection signal RP to be output, on the basis of a signal output from a common shift register, whereby the increase in the circuit scale of the driver circuit portion 30 can be suppressed.

The switching portions 40 and 50 each have a function of switching the on/off of the analog switch 41 and the analog switch 51 to allot the selection signal GP or the selection signal RP output from the driver circuit portion 30 to be output to the wiring GL or the wiring RL. With the switching portions 40 and 50, the number of terminals between the driver circuit portion 30 and the display portion 71 can be reduced. The switching portion 60 has a function of setting the potentials of the wiring GL and the wiring RL to a constant potential such as a ground potential. With the control of the switching portions 40, 50, and 60 by the control signal TS output from the timing control circuit 21, signals output from the driver circuit portion 30 at different timings can be switched between the display operation and the detection operation to be supplied to the subpixel 81 or the subpixel 82.

Figure 2:
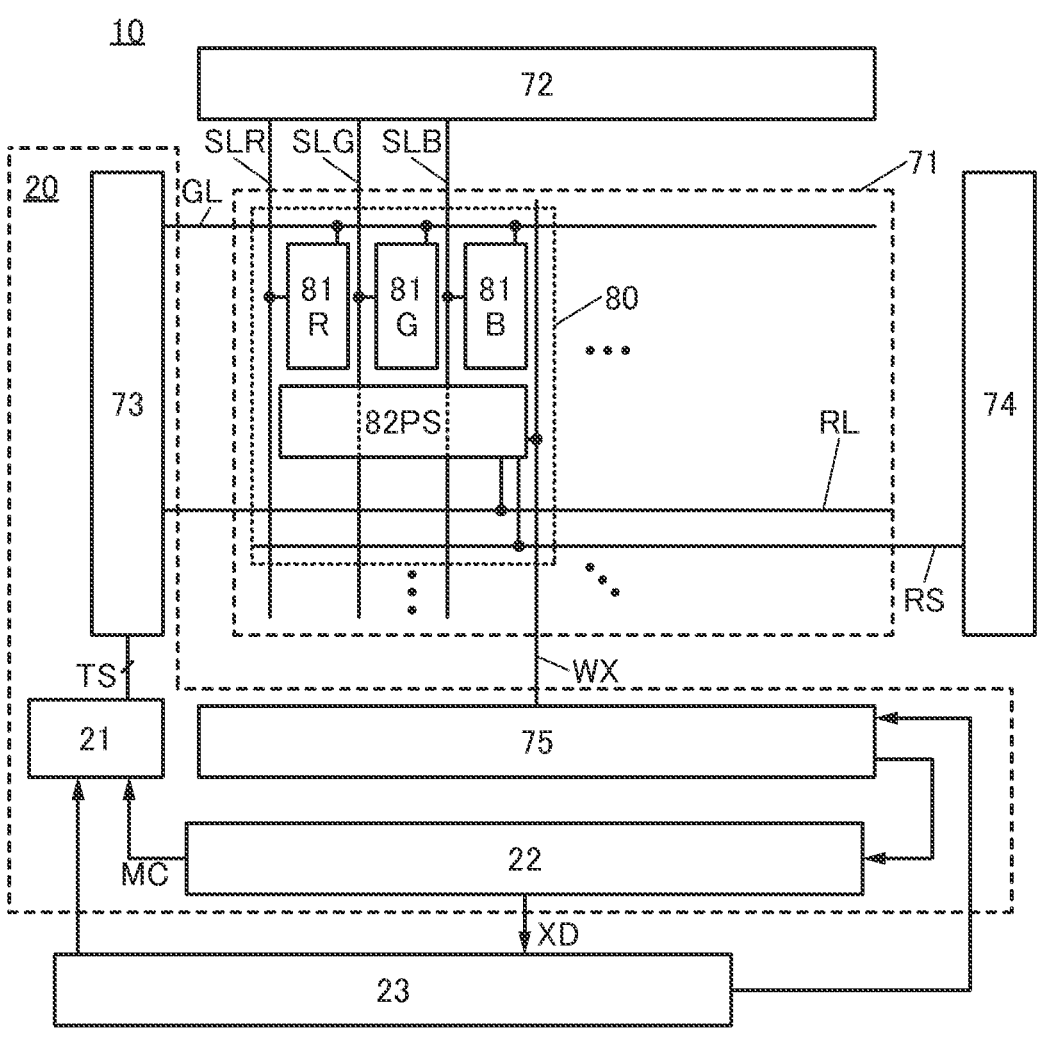
FIG. 2 is a diagram illustrating a structure example of a display apparatus.

FIG. 2 illustrates a structure in which an image processor 22 and an application processor 23 are added to the structure of the block diagram illustrated in FIG. 1A. FIG. 2 illustrates a mode switching signal MC that is output to enable the image processor 22 to control the timing control circuit 21 and sensor information data XD output to the application processor 23 on the basis of a signal obtained by a detection operation in the image processor 22.

The image processor 22 outputs the mode switching signal MC that controls the timing control circuit 21 in accordance with a detection state or a non-detection state of an object when the detection operation is executed. The timing control circuit 21 can switch between the display operation and the detection operation in accordance with the mode switching signal MC. Thus, switching of the operation mode in accordance with the usage state of the display apparatus 10 can be performed. The image processor 22 can output the mode switching signal MC for switching between the display operation and the detection operation on the basis of image data obtained by the signal readout circuit 75, i.e., data obtained by detecting an object.

The application processor 23 can perform arithmetic processing for controlling circuits included in the display apparatus 10 such as the timing control circuit 21 and the signal readout circuit 75 in accordance with the sensor information data XD corresponding to the display operation or the detection operation from the image processor 22.

As illustrated in FIG. 2, in the display apparatus 10, the gate line driver circuit 73, the signal readout circuit 75, the timing control circuit 21, and the image processor 22 are preferably integrated to be the driver control circuit 20 as an integrated circuit. When the circuits are integrated as an integrated circuit, i.e., one IC chip, the circuit scale of the driver circuit can be downsized.

<Operation Example of Display Apparatus>

With reference to FIG. 3A to FIG. 5, an operation example of a display apparatus that performs a display operation or a detection operation corresponding to a detection state or a non-detection state of an object will be described.

Figure 3A:
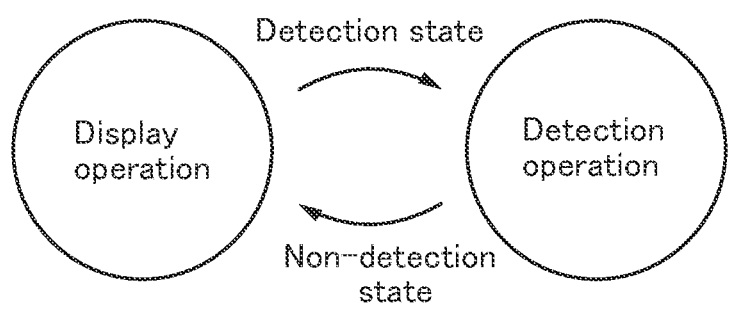
FIG. 3A to FIG. 3C are diagrams illustrating structure examples of a display apparatus.

FIG. 3A is a state transition diagram showing switching between the display operation and the detection operation corresponding to a detection state or a non-detection state of an object. As illustrated in FIG. 3A, the above-described display apparatus 10 transitions from the display operation to the detection operation upon the detection state of the object and transitions from the detection operation to the display operation upon the non-detection state of the object. Note that the display operation is referred to as a first operation mode in some cases. The detection operation is referred to as a second operation mode in some cases.

Figure 3B:
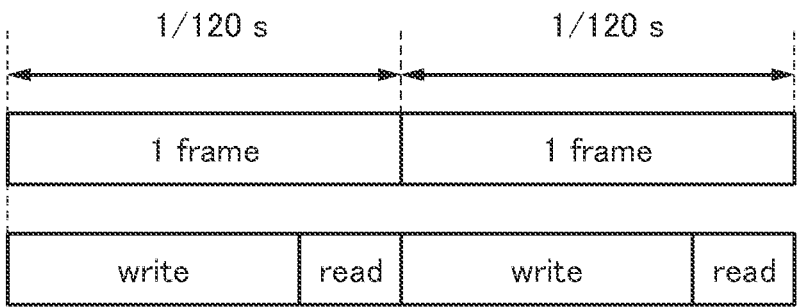

FIG. 3B is a schematic view of the operation mode of the display operation. In the display operation, a write operation of image data (write) and a read operation of captured image data (read) in a period shorter than the write operation are alternately performed in one frame period (1 frame). One frame period in the display operation is preferably a short period, for example, $1/120$ s. The frame frequency in one frame period in the display operation is also referred to as a first frame frequency.

The period of the write operation in one frame period in the display operation is shorter than the one frame period, and the period of the read operation is much shorter. In the write operation, selection signals of the gate driver circuit are output to all rows one by one through the wiring GL. At the time of the write operation, the pulse width (selected period) of a selection signal of the gate driver circuit is shortened.

The wiring RL through which a selection signal of the gate driver circuit is output at the time of the read operation in the display operation is configured in such a manner that signals are output to a plurality of rows collectively (low-resolution read), whereby capturing image with the whole device is possible even when the read operation period is short. In the case where the read operation targets a simple object detection, an image does not need to be captured at the maximum resolution of the light-receiving device. In the structure in which selection signals are output to a plurality of rows, the pulse width (selection period) of a selection signal of the gate driver circuit to be output to the wiring RL is longer than the case where a signal is output to the wiring RL row by row. In other words, the selection signal output from the gate driver circuit output to the wiring RL can ensure a sufficient selection period at the time of read operation.

In the display operation illustrated in FIG. 3B, the display with a high frame frequency and the read operation for determining a detection state or a non-detection state can be performed periodically. Thus, a transition to the detection operation is possible without a decrease of the display quality.

Figure 3C:
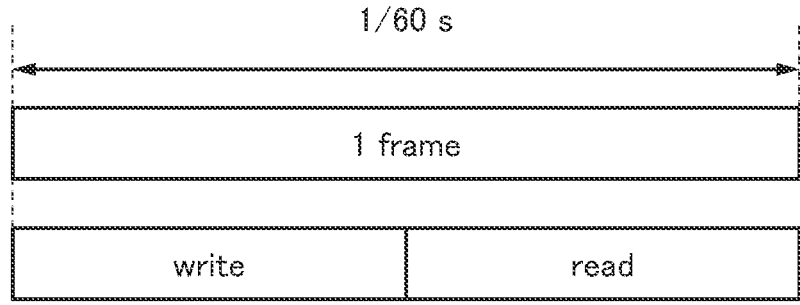

FIG. 3C is a schematic view of the operation mode of the detection operation. In the detection operation, the write operation (write) of image data and the read operation (read) of captured image data are alternately performed in one frame period (1 frame). The one frame period in the detection operation is preferably longer than that in the display operation, and is, for example, $1/60$ s. The frame frequency in one frame period in the detection operation is also referred to as a second frame frequency.

The write operation in one frame period in the detection operation is configured to output to, one by one, all rows of the wirings GL through which a selection signal of the gate driver circuit is output. Note that one frame period in the detection operation is longer than one frame period in the display operation; thus, the frequency of write operation is reduced.

At the time of the read operation in the detection operation, the wiring RL through which a selection signal of the gate driver circuit is output is configured in such a manner that signals are output to all rows one by one. At the time of the read operation, the pulse width (selection period) of a selection signal of the gate driver circuit output to the wiring RL is equivalent to that at the time of the write operation. Thus, at the time of the write operation and the read operation, selection signals from the gate driver circuit output to the wiring GL and the wiring RL select sequentially subpixels in the rows with signals output at a frame frequency lower than that at the time of the display operation.

At the time of the detection operation illustrated in FIG. 3C, display and image data write operation (write) can be performed and a read operation (read) of captured image data can be performed row by row. Thus, the state of an object detected in the detection state can be detected with high accuracy.

Figure 4:
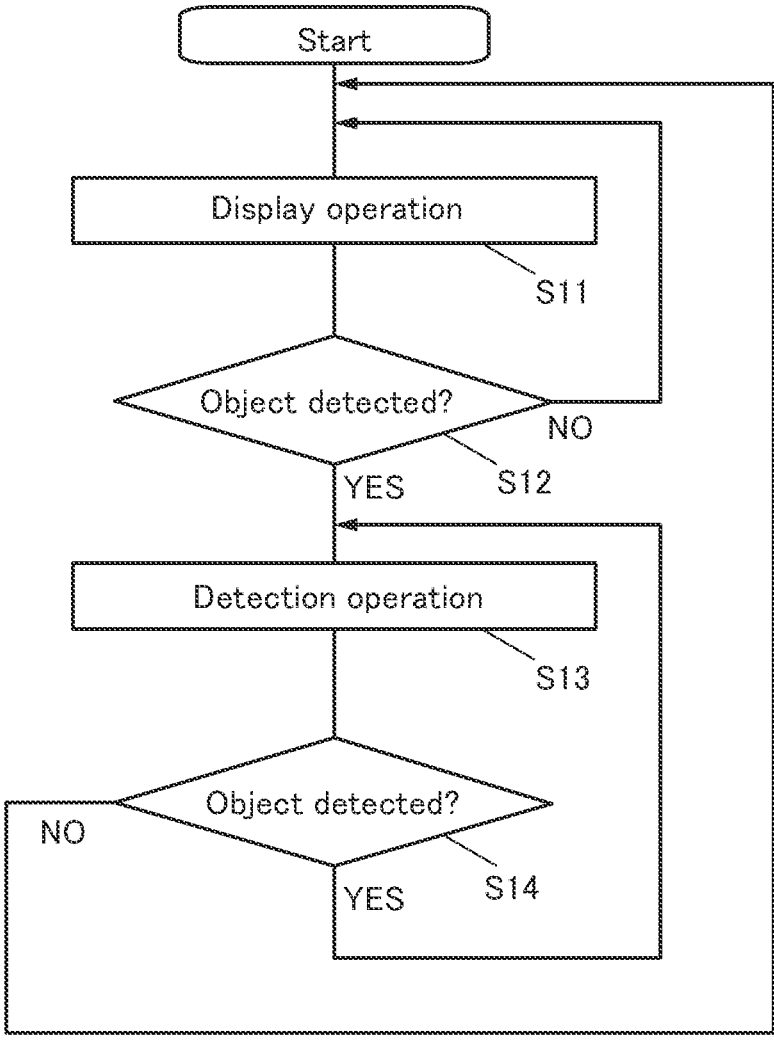
FIG. 4 is a flow chart showing an operation example of a display apparatus.

FIG. 4 is a diagram illustrating a flow chart for describing a detection state or a non-detection state of an object serving as a trigger for a transition to the display operation or the detection operation.

Figure 5:
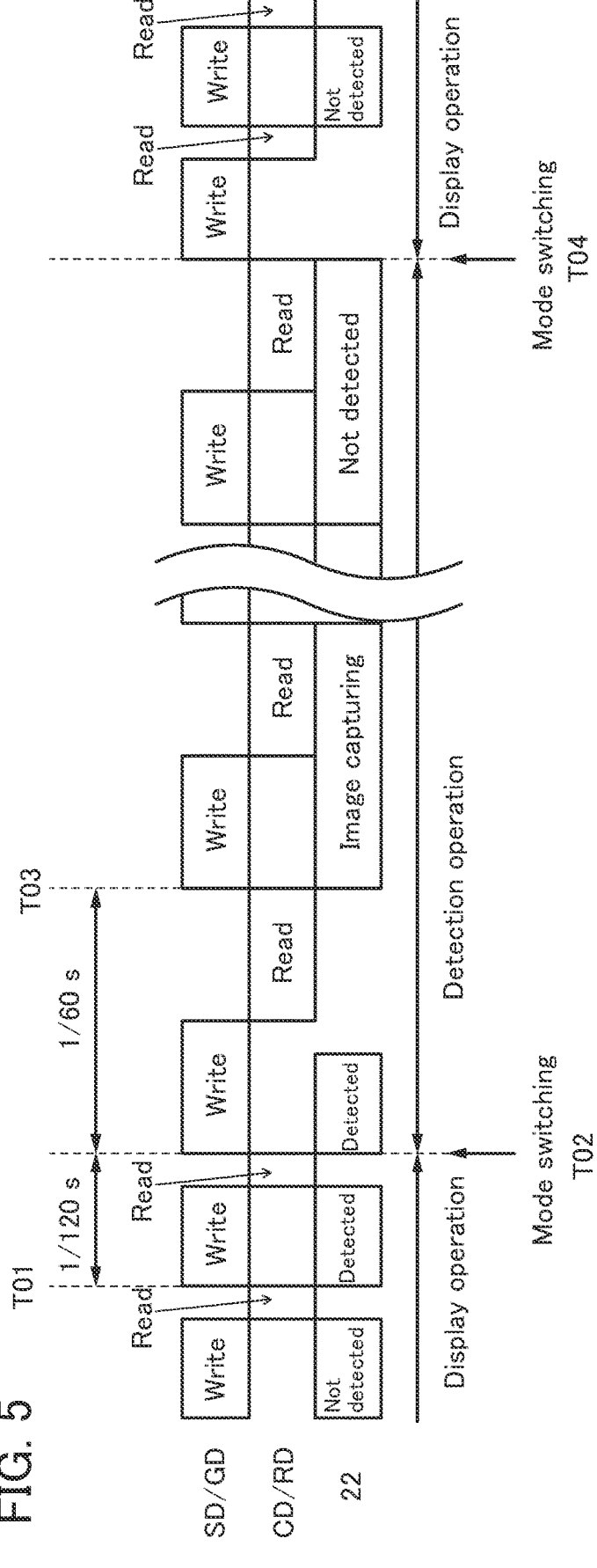
FIG. 5 is a diagram illustrating an operation example of a display apparatus.

FIG. 5 is a schematic view illustrating a transition to display operation or detection operation. In FIG. 5, the signal line driver circuit 72 and the gate line driver circuit 73 that write image data are denoted by "SD/GD", and the gate line driver circuit 73, the control line driver circuit 74, and the signal readout circuit 75 that read captured image data are denoted by "CD/RD". The determination of the image processor 22 that determines detection or non-detection of an object on the basis of captured image data is denoted by "22". The image processor 22 can output the mode switching signal MC for switching the operation mode and can perform detection or non-detection of an object and image capturing processing.

First, in the display operation (Step S11), as described with reference to FIG. 3B, image display is performed in the display apparatus and captured image data is acquired by scanning a plurality of rows at the same time. At this time, as illustrated in FIG. 5, the write operation of image data is performed in the SD/GD and the read operation of the captured image data is performed in the CD/RD. The write operation and the read operation are performed in 1/120 s (the period between Time T01 and Time T02) as described with reference to FIG. 3B.

Next, determination of detection of an object is performed (Step S12). The determination is performed on the basis of captured image data acquisition in Step S11. At this time, detection or non-detection is determined on the basis of captured image data in the image processor 22 illustrated in FIG. 5. The captured image data acquisition in the display operation is performed for detecting presence or absence of an object approaching the display apparatus. If there is no object approaching the display apparatus (NO), Step S11 is continued.

If there is an object approaching the display apparatus (YES), the process proceeds to a detection operation (Step S13). In FIG. 5, the determination of the detection of an object is performed on the basis of captured image data in the image processor 22 immediately before Time T02, and thus mode switching is performed. Thus, at Time T02, the mode is switched from the display operation to the detection operation by the mode switching signal MC. The write operation and the read operation in the detection operation are performed in 1/60 s (the period between Time T02 and Time T03) as described with reference to FIG. 3C. Image capturing processing based on the captured image data is performed over periods of the write operation and the read operation in the detection operation. Thus, the state of the object can be detected with high accuracy.

The determination of detection of the object is performed again (Step 14). The determination is performed on the basis of the captured image data read in Step S13. If there is an object approaching the display apparatus (YES), Step S13 is continued.

If there is not an object approaching the display apparatus (NO), the mode is shifted to the display operation. The shift is set to be performed, for example, when non-detection based on captured image data is continued over a plurality of frames in the image processor 22. In FIG. 5, the non-detection of an object on the basis of captured image data is determined at Time T04 in the image processor 22, and the mode switching from the detection operation to the display operation is performed.

The display apparatus of one embodiment of the present invention can be configured to switch between the detection operation and the display operation on the basis of detection or non-detection of an object. Thus, for a higher accuracy of the detection operation, switching can be performed in such a manner that the period of the detection operation is prolonged and the period of the display operation is shortened. At the time of the detection operation, the resolution of the detection operation can be increased by increasing the number of selection signals to scan the subpixels including the light-receiving devices. The resolution of detection of an object is reduced at the time of the display operation, whereby unnecessary detection operation can be reduced to suppress an increase in power consumption.

<Operation of Driver Circuit Portion>

Next, a structure example and an operation of the driver circuit portion 30 included in the display apparatus 10 described above are described with reference to FIG. 6 to FIG. 10.

Figure 6:
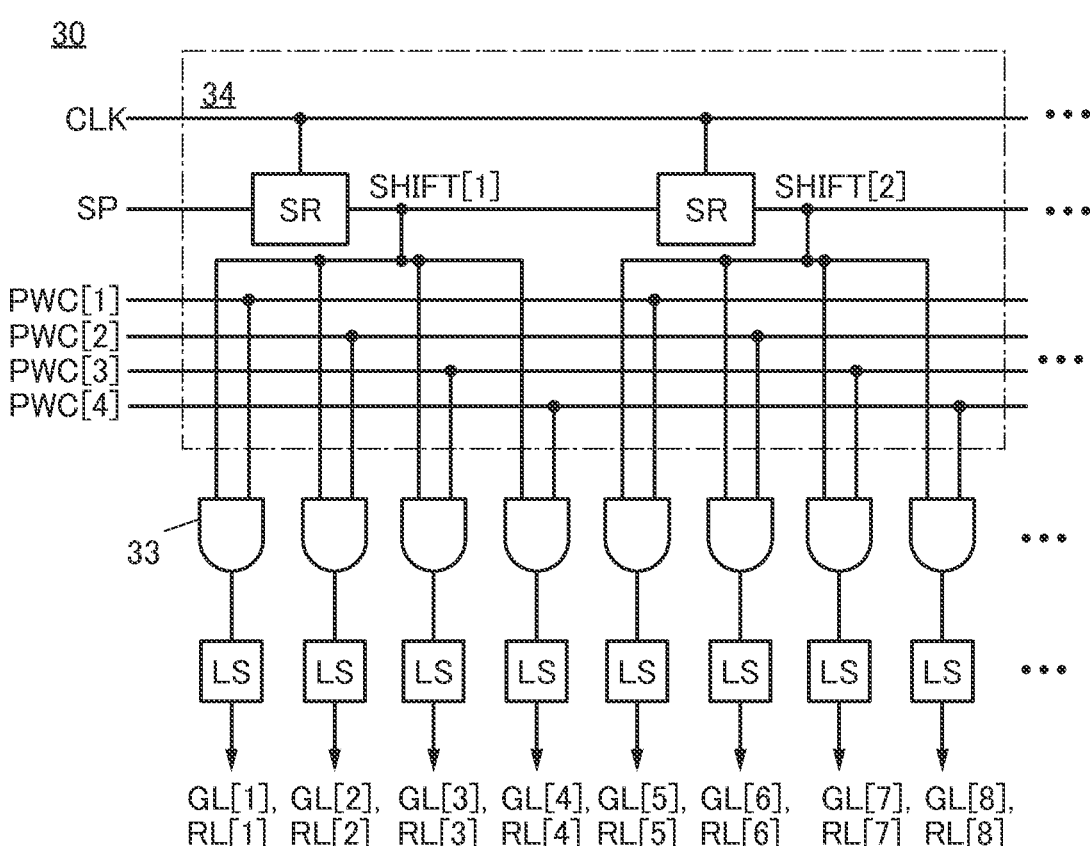
FIG. 6 is a diagram illustrating an operation example of a display apparatus.

FIG. 6 illustrates a driver circuit 34 included in the driver circuit portion 30. FIG. 6 illustrates, as an example, a clock signal CLK, a start pulse signal SP, a shift register circuit SR, and output signals SHIFT[1] and SHIFT[2], control signals PWC[1] to PWC[4], an AND circuit 33, and a level shift circuit LS. The driver circuit portion 30 can output selection signals supplied to wirings GL[1] to GL[8] and wirings RL[1] to RL[8].

In the case where a plurality of components are denoted by the same reference numeral, and, particularly when the components need to be distinguished from each other, an identification sign such as "_1", "_2", "[n]", or "[m, n]" is sometimes added to the reference numerals. For example, a second wiring GL is referred to as a wiring GL[2].

The output signal SHIFT[1] is a pulse signal output from the shift register circuit SR in the first stage, upon input of the clock signal CLK and the start pulse signal SP. The output signal SHIFT[2] is a pulse signal output from the shift register circuit SR in the second stage, upon input of the clock signal CLK and the output signal SHIFT[1]. The control signals PWC[1] to PWC[4] are signals for controlling a selection period of a pulse signal output from the shift register circuit SR. The AND circuit 33 is a circuit that outputs a signal corresponding to the logic product of any one of the control signals PWC[1] to PWC[4] and a pulse signal output from the shift register circuit SR. The level shift circuit LS is a circuit that outputs, to the wiring GL (GL[1] to GL[8]) and the wiring RL (RL[1] to RL[8]), a signal obtained by converting an amplitude voltage of an input signal into a predetermined amplitude voltage. An output of a signal to either the wiring GL or the wiring RL can be switched by switching ON or OFF of analog switches of the switching portions 40 and 50.

Figure 7:
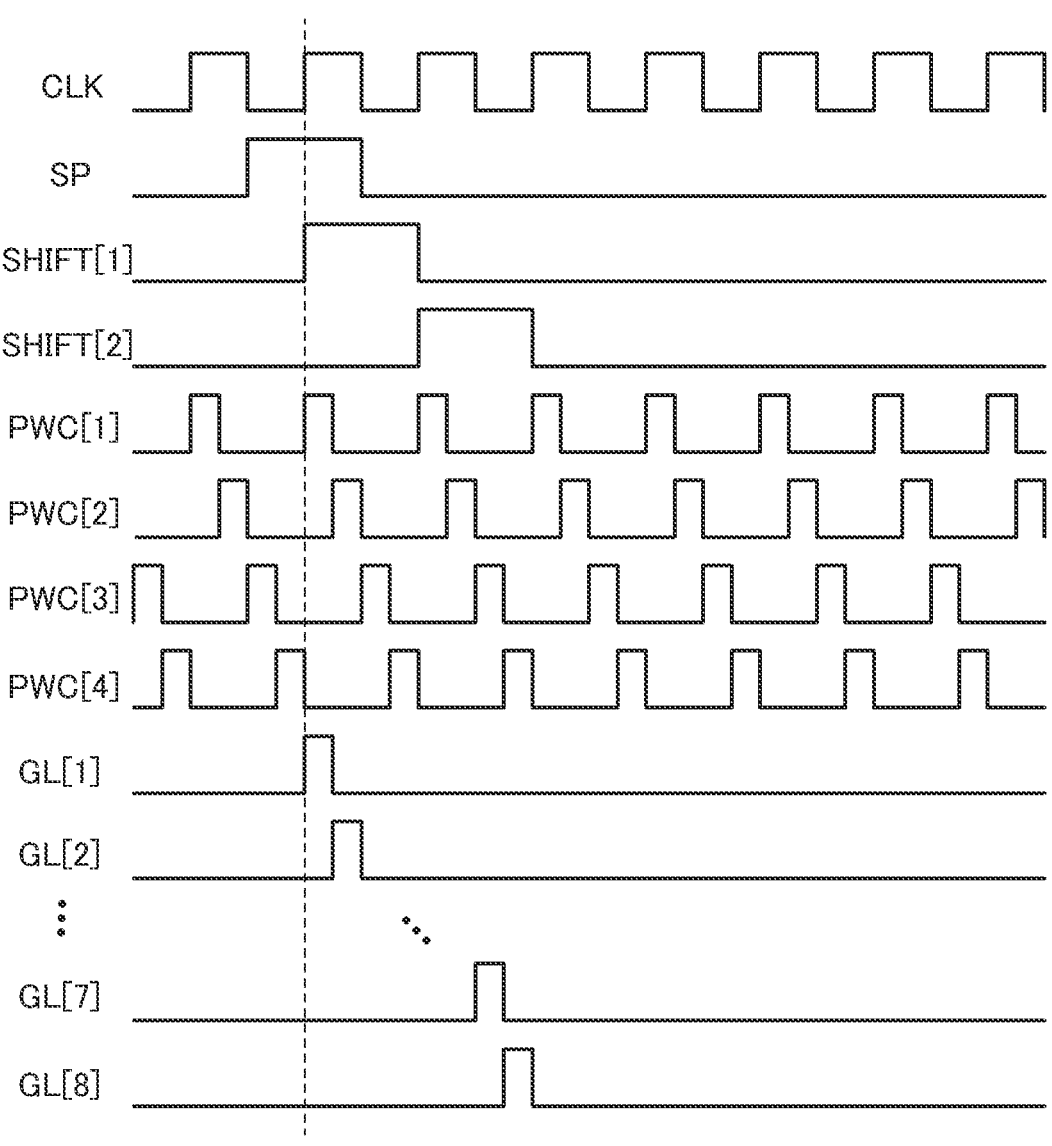
FIG. 7 is a timing chart showing an operation example of a display apparatus.
Figure 8:
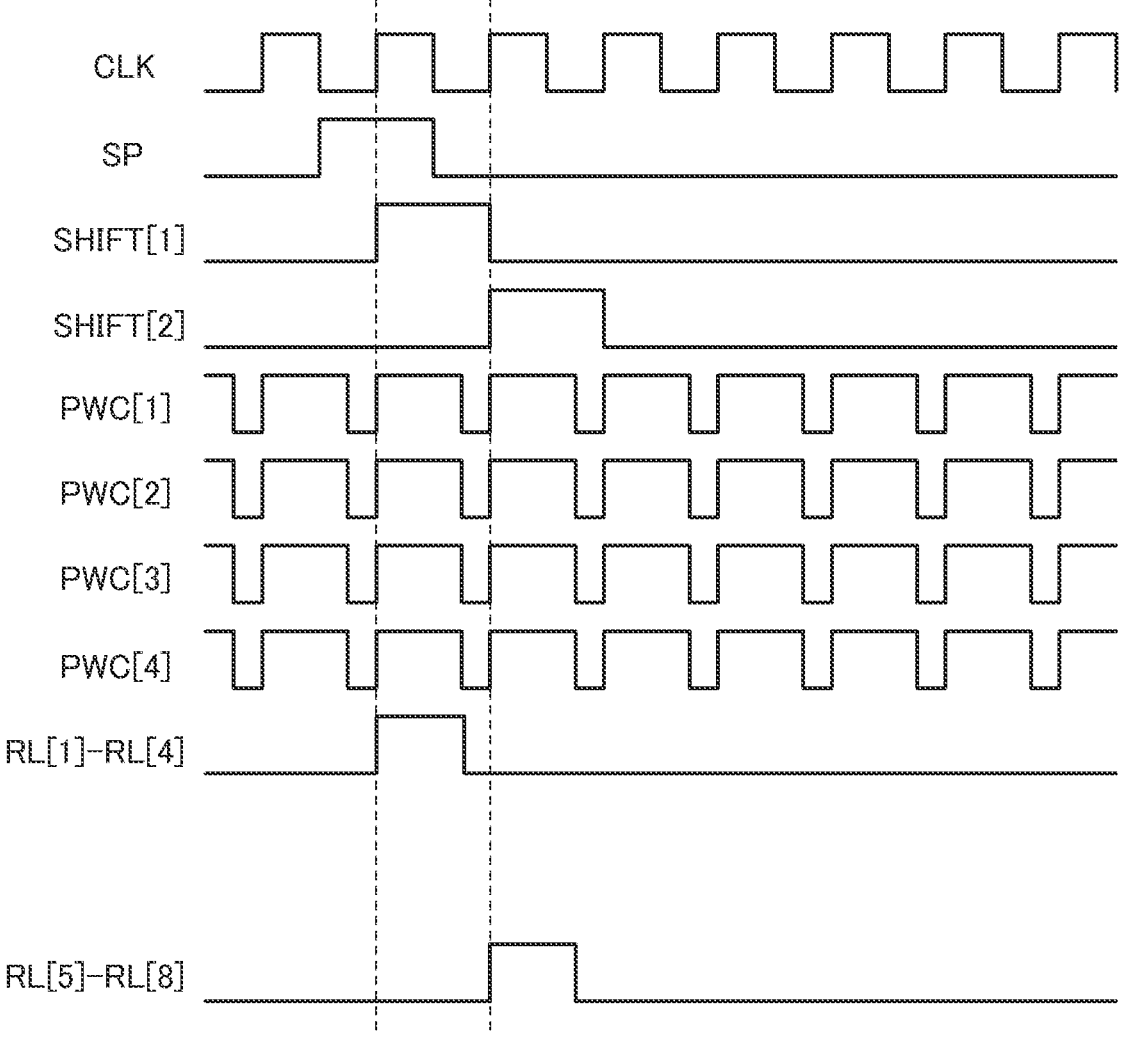
FIG. 8 is a timing chart showing an operation example of a display apparatus.

FIG. 7 and FIG. 8 illustrate timing charts of various kinds of signals in the driver circuit portion 30 in FIG. 6. FIG. 7 shows a timing chart of the display operation in which a selection signal is output to the wiring GL. FIG. 8 shows a timing chart of the detection operation in which a selection signal is output to the wiring RL.

As illustrated in FIG. 7, selection signals can be sequentially output to the wirings GL in rows in the display operation. The output signals SHIFT[1] and SHIFT[2] output from the shift register circuit SR can be output as a signal with a short selection period in accordance with the control signals PWC[1] to PWC[4] illustrated in FIG. 7.

As illustrated in FIG. 8, the same selection signal can be sequentially output to the wirings RL in a plurality of rows during the detection operation. The output signals SHIFT[1] and SHIFT[2] output from the shift register circuit SR can be output as a signal with a long selection period in accordance with the control signals PWC[1] to PWC[4] illustrated in FIG. 8.

Figure 9:
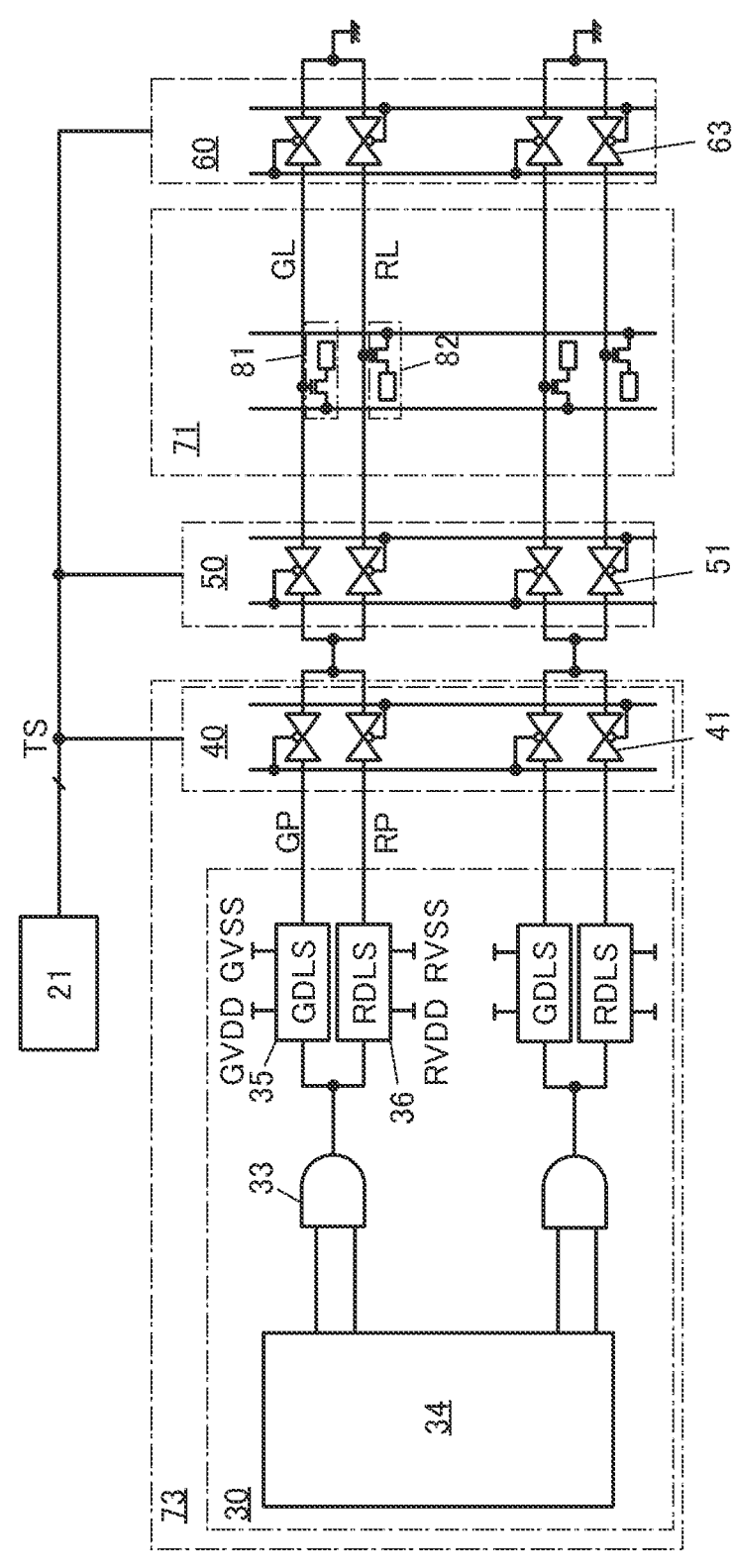
FIG. 9 is a diagram illustrating a structure example of a display apparatus.

Note that the selection signal supplied to the wiring GL and the selection signal supplied to the wiring RL have preferably different amplitude voltages. FIG. 9 illustrates a structure example in which the selection signal GP or the selection signal RP is output through different level shift circuits, a level shift circuit 35 (GDLS) and a level shift circuit 36 (RDLS), when signals output from the AND circuit 33 are allotted to the wiring GL or the wiring RL. Voltages GVDD and GVSS are supplied to the level shift circuit 35, so that the selection signal GP with the amplitude voltage corresponding to the voltage can be output. Voltages RVDD and RVSS different from the voltages GVDD and GVSS are supplied to the level shift circuit 36, so that the selection signal PR with an amplitude voltage corresponding to the voltages can be output.

Allocation of the signals output to the wirings corresponding to the display operation or the detection operation may be applied to the wiring SL and the wiring WX connected to the driver control circuit including the signal line driver circuit 72 and the signal readout circuit 75.

Figure 10:
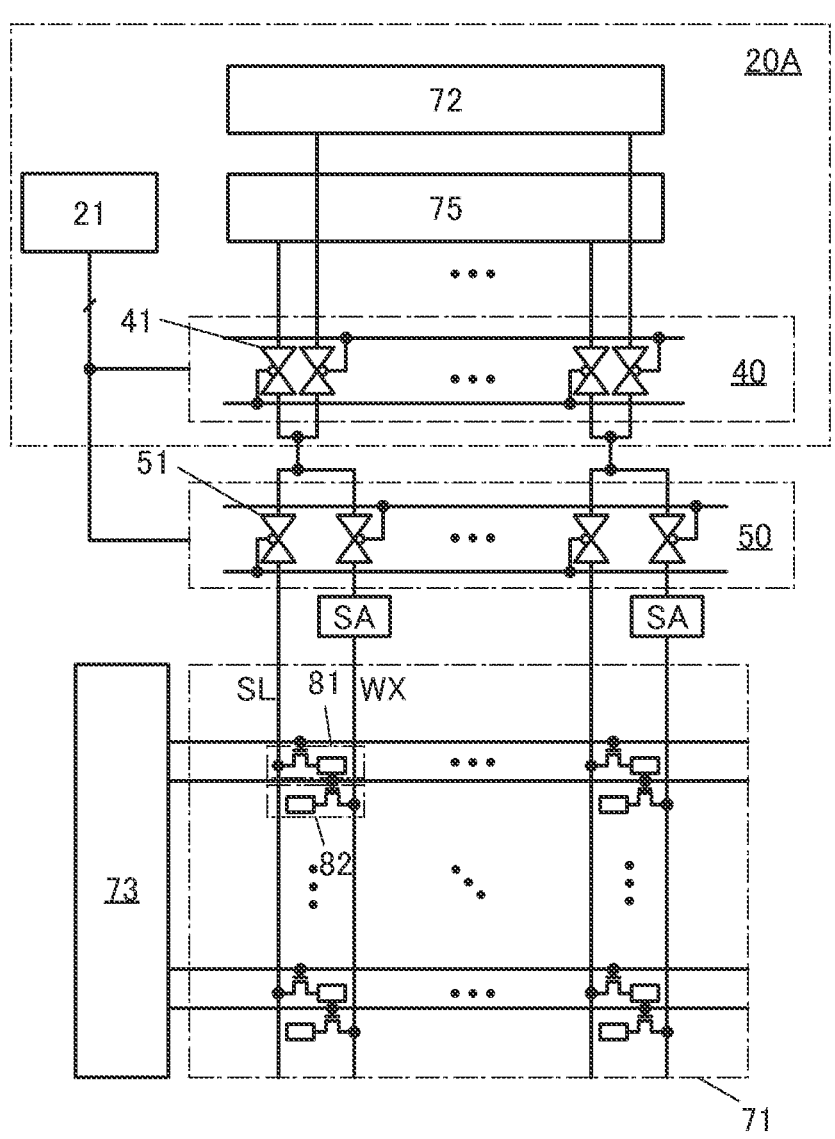
FIG. 10 is a diagram illustrating a structure example of a display apparatus.

In the driver control circuit 20A illustrated in FIG. 10, the switching portion 40 including the analog switch 41 is illustrated in addition to the signal line driver circuit 72 and the signal readout circuit 75. In FIG. 10, the switching portion 50 including the analog switch 51 is illustrated between the driver control circuit 20A and the display portion 71. In FIG. 10, the timing control circuit 21 that supplies the control signal TS for controlling the analog switches included in the switching portions 40 and 50 is illustrated.

In the driver control circuit 20A illustrated in FIG. 10, for example, analog switches of the switching portions 40 and 50 can be switched so that a data signal supplied to the subpixel 81, output from the signal line driver circuit 72 is output at the time of the display operation. In the driver control circuit 20A illustrated in FIG. 10, for example, at the time of the detection operation, analog switches of the switching portions 40 and 50 can be switched so that a signal read from the subpixel 82 input to the signal readout circuit 75 is selectively read through the sense amplifier circuit SA.

<Structure Example of Pixel Circuit>

FIG. 11A to FIG. 11D and FIG. 12A to FIG. 12D illustrate examples of a circuit diagram of a pixel circuit that can be employed for the subpixel 81R, the subpixel 81G, and the subpixel 81B.

Figure 11A:
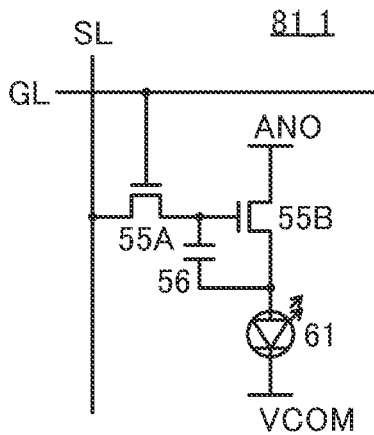
FIG. 11A to FIG. 11D are diagrams illustrating structure examples of a display apparatus.

A pixel circuit 81_1 illustrated in FIG. 11A includes the transistor 55A, the transistor 55B, and the capacitor 56. FIG. 11A illustrates a light-emitting device 61 connected to the pixel circuit 81_1. FIG. 11A also illustrates the wiring SL, the wiring GL, a wiring ANO, and a wiring VCOM.

A gate of the transistor 55A is electrically connected to the wiring GL, one of a source and a drain of the transistor 55A is electrically connected to the wiring SL, and the other of the source and the drain of the transistor 55A is electrically connected to a gate of the transistor 55B and one electrode of the capacitor 56. One of a source and a drain of the transistor 55B is electrically connected to the wiring ANO and the other of the source and the drain of the transistor 55B is electrically connected to an anode of the light-emitting device 61. The other electrode of the capacitor 56 is electrically connected to the anode of the light-emitting device 61. A cathode of the light-emitting device 61 is electrically connected to the wiring VCOM.

The transistor 55A functions as a switch. The transistor 55B functions as a transistor that controls current flowing through the light-emitting device 61.

Here, transistors including silicon in the channel formation regions (hereinafter referred to as Si transistors) are preferably used as the transistor 55A and the transistor 55B. Alternatively, it is preferable that a transistor including a metal oxide (hereinafter also referred to as an oxide semiconductor) in its channel formation region (hereinafter such a transistor is also referred to as an OS transistor) be used as the transistor 55A and a Si transistor be used as the transistor 55B.

Examples of silicon include single crystal silicon, polycrystalline silicon, and amorphous silicon. A Si transistor has high field-effect mobility and favorable frequency characteristics. For example, a transistor including low-temperature polysilicon (LTPS) in its channel formation region (hereinafter such a transistor is also referred to as an LTPS transistor) can be used.

With the use of Si transistors, a circuit required to be driven at a high frequency (e.g., a source driver circuit) can be formed on the same substrate as the display portion. Thus, external circuits mounted on the display apparatus can be simplified, and costs of parts and mounting costs can be reduced.

The oxide semiconductor preferably contains indium, a metal M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. Specifically, M is preferably one or more selected from aluminum, gallium, yttrium, and tin. It is particularly preferable to use an oxide containing indium, gallium, and zinc (also referred to as IGZO) for the semiconductor layer of the OS transistor. Alternatively, it is preferable to use an oxide containing indium, tin, and zinc. Further alternatively, it is preferable to use an oxide containing indium, gallium, tin, and zinc.

An OS transistor using an oxide semiconductor having a wider band gap and a lower carrier density than silicon can achieve an extremely low off-state current. Thus, such a low off-state current enables long-term retention of charge accumulated in a capacitor that is connected in series with the OS transistor. Therefore, it is particularly preferable to use an OS transistor as the transistor 55A which is connected in series with the capacitor 56. The use of the OS transistor as the transistor 55A can prevent leakage of charge retained in the capacitor 56 through the transistor 55A. Furthermore, charge retained in the capacitor 56 can be retained for along period, and thus a still image can be displayed for a long period without rewriting data in the pixel 81_1.

The off-state current value per micrometer of channel width of an OS transistor at room temperature can be lower than or equal to 1 aA ($1\times10^{-18}$ A), lower than or equal to 1 zA ($1\times10^{-21}$ A), or lower than or equal to 1 yA ($1\times10^{-24}$ A). Note that the off-state current value per micrometer of channel width of a Si transistor at room temperature is higher than or equal to 1 fA ($1\times10^{-15}$ A) and lower than or equal to 1 pA ($1\times10^{-12}$ A). Thus, the off-state current of the OS transistor is lower than the off-state current of the Si transistor by approximately ten orders of magnitude.

For example, when both an LTPS transistor and an OS transistor are used as the transistor 55A and the transistor 55B, the display apparatus can have low power consumption and high drive capability. Note that a structure where an LTPS transistor and an OS transistor are used in combination is referred to as LTPO in some cases. Note that as a more preferable example, it is preferable to use an OS transistor as, for example, a transistor functioning as a switch for controlling electrical continuity or discontinuity between wirings and an LTPS transistor as, for example, a transistor for controlling current.

The light-emitting device 61 has a function of emitting light (hereinafter, also referred to as a light-emitting function). The light-emitting device 61 is preferably an organic EL device (organic electroluminescent device).

Figure 11B:
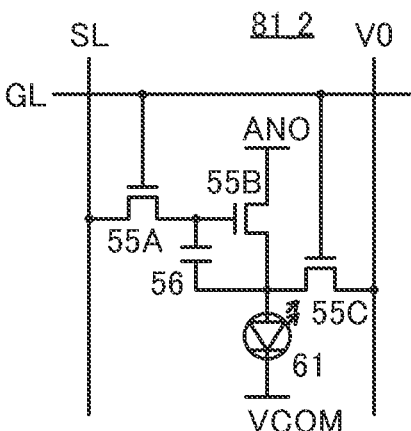

The pixel circuit 81_2 illustrated in FIG. 11B has a structure in which a transistor 55C is added to the pixel circuit 81_1. In addition, a wiring V0 to supply a constant potential is electrically connected to the pixel circuit 81_2.

Figure 11C:
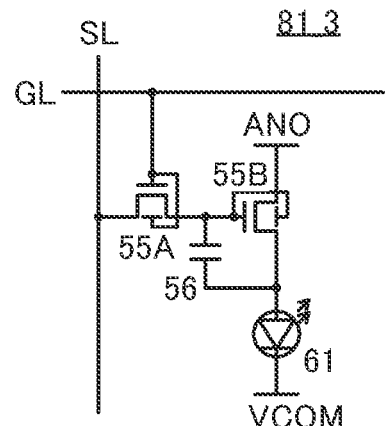
Figure 11D:
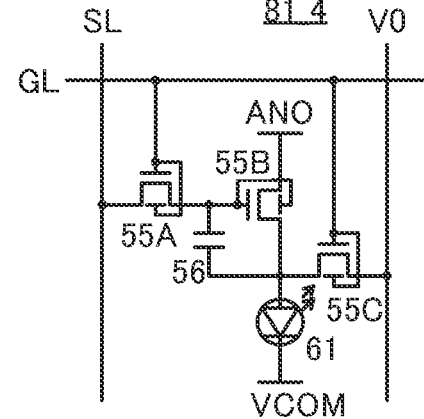

A pixel circuit 81_3 illustrated in FIG. 11C is an example of the case where transistors having a pair of gates are used as the transistor 55A and the transistor 55B of the pixel circuit 81_3. A pixel circuit 81_4 illustrated in FIG. 11D is an example of the case where such transistors are used in the pixel circuit 81_2. Note that although the transistors having a pair of gates are used as all the transistors here, one embodiment of the present invention is not limited thereto.

In the transistor including a pair of gates, the same potential is supplied to the pair of gates electrically connected to each other, which provides an advantage that the transistor can have a higher on-state current and improved saturation characteristics. A potential for controlling the threshold voltage of the transistor may be supplied to one of the pair of gates. Furthermore, when a constant potential is supplied to one of the pair of gates, the stability of the electrical characteristics of the transistor can be improved. For example, one of the gates of the transistor may be electrically connected to a wiring to which a constant potential is supplied or may be electrically connected to a source or a drain thereof.

Figure 12A:
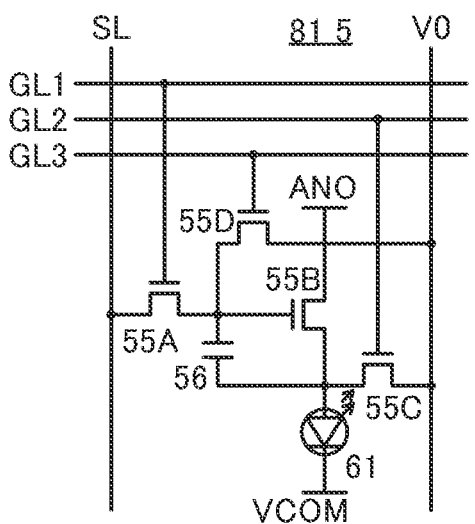
FIG. 12A to FIG. 12D are diagrams illustrating structure examples of a display apparatus.

A pixel circuit 81_5 illustrated in FIG. 12A has a structure in which a transistor 55D is added to the pixel circuit 81_2. Three wirings (the wiring GL1, the wiring GL2, and a wiring GL3) functioning as gate lines are electrically connected to the pixel circuit 81_5.

A gate of the transistor 55D is electrically connected to the wiring GL3, one of a source and a drain of the transistor 55D is electrically connected to the gate of the transistor 55B, and the other of the source and the drain of the transistor 55D is electrically connected to the wiring V0. In addition, the gate of the transistor 55A is electrically connected to the wiring GL1, and a gate of the transistor 55C is electrically connected to the wiring GL2.

When the transistor 55C and the transistor 55D are brought into conduction at the same time, the source and the gate of the transistor 55B have the same potential, so that the transistor 55B can be brought out of conduction. Thus, current flowing through the light-emitting device 61 can be blocked forcibly. Such a pixel circuit is suitable for the case of using a display method in which a display period and a non-lighting period are alternately provided.

Figure 12B:
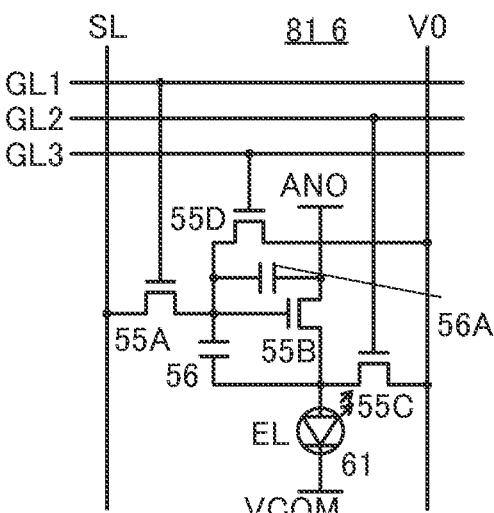

A pixel circuit 81_6 illustrated in FIG. 12B is an example of the case where a capacitor 56A is added to the pixel circuit 81_5. The capacitor 56A functions as a storage capacitor.

Figure 12C:
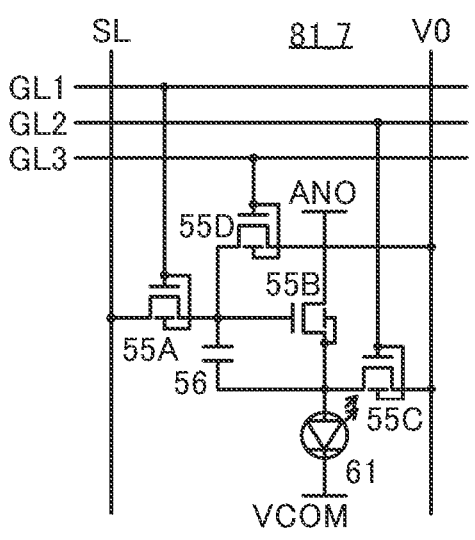
Figure 12D:
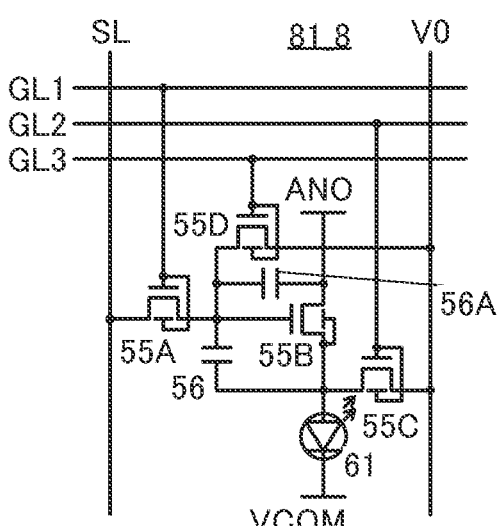

A pixel circuit 817 illustrated in FIG. 12C and a pixel circuit 81_8 illustrated in FIG. 12D are examples where transistors having a pair of gates are used in the pixel circuit 81_5 and the pixel circuit 81_6. A transistor whose pair of gates are electrically connected to each other is employed as each of the transistor 55A, the transistor 55C, and the transistor 55D, and a transistor whose one of gates is electrically connected to a source is employed as the transistor 55B.

Next, FIG. 13A to FIG. 13E illustrate examples of circuit diagrams of pixel circuits that can be employed for the subpixel 82PS. In FIG. 13A to FIG. 13E, the wiring RS and the wiring TX are illustrated in addition to the wiring RL and the wiring WX. The wiring RL is, for example, a wiring transmitting a selection signal for reading data from the pixel circuit. The wiring RS is, for example, a wiring transmitting a reset signal for initializing the pixel circuit. The wiring WX is, for example, a wiring transmitting a signal read from the pixel circuit. The wiring TX is, for example, a wiring transmitting a transmission signal for controlling a current flowing to the light-receiving device 62. The pixel circuit that can be employed for the subpixel 82PS is connected to a wiring supplying a constant potential.

Figure 13A:
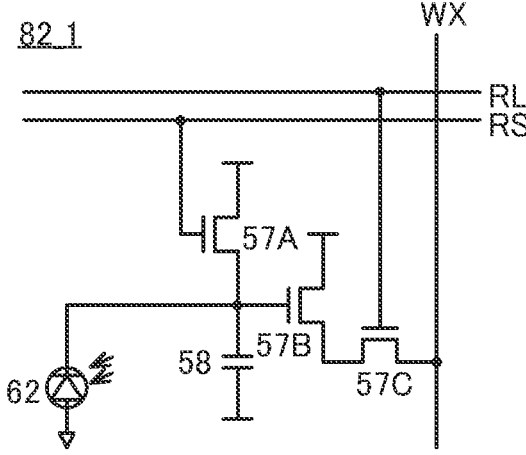
FIG. 13A to FIG. 13E are diagrams illustrating structure examples of a display apparatus.

The pixel circuit 82_1 illustrated in FIG. 13A includes a transistor 57A, a transistor 57B, a transistor 57C, and a capacitor 58, and the transistors and the capacitor are electrically connected to each other as illustrated in FIG. 13A. FIG. 13A also illustrates the light-receiving device 62 connected to the pixel circuit 82_1.

The light-receiving device 62 has a function of detecting light (hereinafter, also referred to as a light-receiving function). For example, a pn or pin photodiode can be used for the light-receiving device 62. The light-receiving device 62 has a function of detecting visible light. The light-receiving device 62 has sensitivity to visible light. The light-receiving device 62 further preferably has a function of detecting visible light and infrared light. The light-receiving device 62 preferably has sensitivity to at least one of visible light and infrared light.

In this specification and the like, a blue (B) wavelength range is greater than or equal to 400 nm and less than 490 nm, and blue (B) light has at least one emission spectrum peak in the wavelength range. A green (G) wavelength range is greater than or equal to 490 nm and less than 580 nm, and green (G) light has at least one emission spectrum peak in the wavelength range. A red (R) wavelength range is greater than or equal to 580 nm and less than 700 nm, and red (R) light has at least one emission spectrum peak in the wavelength range. In this specification and the like, a wavelength range of visible light is greater than or equal to 400 nm and less than 700 nm, and visible light has at least one emission spectrum peak in the wavelength range. An infrared (IR) wavelength range is greater than or equal to 700 nm and less than 900 nm, and infrared (IR) light has at least one emission spectrum peak in the wavelength range.

The active layer included in the light-receiving device 62 includes a semiconductor. Examples of the semiconductor include an inorganic semiconductor such as silicon and an organic semiconductor including an organic compound. It is particularly preferable to use an organic photodiode including a layer containing an organic semiconductor, as the light-receiving device 62. An organic photodiode, which is easily made thin, lightweight, and large in area and has a high degree of freedom for shape and design, can be used in a variety of display apparatuses. An organic semiconductor is preferably used, in which case the EL layer included in the light-emitting device 61 and the light-receiving layer included in the light-receiving device 62 can be formed by the same method (e.g., a vacuum evaporation method) with a common manufacturing apparatus.

In the display apparatus of one embodiment of the present invention, an organic EL device can be suitably used as the light-emitting device 61 and an organic photodiode can be suitably used as the light-receiving device 62. The organic EL device and the organic photodiode can be formed over the same substrate. Thus, the organic photodiode can be incorporated in the display apparatus using the organic EL device. The display apparatus of one embodiment of the present invention has one or both of an image capturing function and a sensing function in addition to an image displaying function.

Figure 13B:
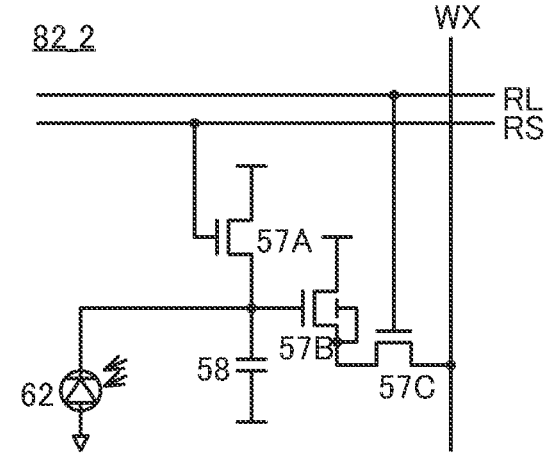
Figure 13C:
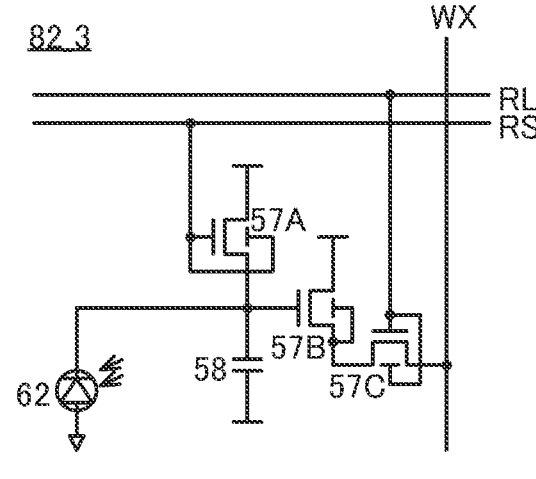
Figure 13D:
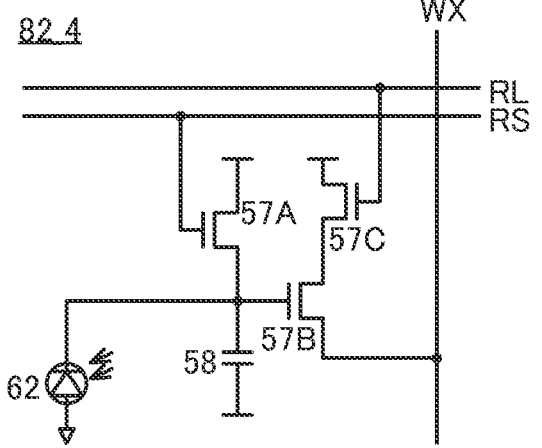
Figure 13E:
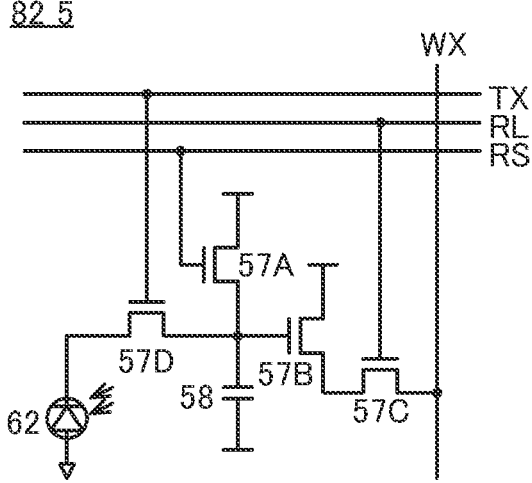

A pixel circuit 82_2 illustrated in FIG. 13B has a structure in which the transistor 57B in the pixel circuit 82_1 includes a pair of gates. A pixel circuit 82_3 illustrated in FIG. 13C is an example in which a transistor including a pair of gates is used as each of the transistor 57A to the transistor 57C in the pixel circuit 82_2. A pixel circuit 82_4 illustrated in FIG. 13D is an example in which the position of the transistor 57C is changed. A pixel circuit 82_5 illustrated in FIG. 13E is an example in which a transistor 57D is added.

As described above, the display apparatus of one embodiment of the present invention is configured to output a selection signal for selecting a subpixel including a light-emitting device and a selection signal for selecting a subpixel including a light-receiving device. That is, the gate line driver circuit can be configured to switch between the scan of subpixels including light-emitting devices at the time of performing a display operation and the scan of subpixels including light-receiving devices at the time of performing a detection operation, which are controlled at different timings. With this structure, signals controlled at different timings can be output from one circuit, so that the circuit scale of the driver circuit can be downsized.

In addition, the display apparatus of one embodiment of the present invention can be configured to switch between the detection operation and the display operation on the basis of detection or non-detection of an object. Thus, for higher accuracy of the detection operation, switching can be performed in such a manner that the period of the detection operation is prolonged and the period of the display operation is shortened. In the detection operation, the resolution of the detection operation can be increased by increasing the number of selection signals to scan the subpixels including the light-receiving devices. The resolution of detection of an object is reduced in the display operation, whereby unnecessary detection operation can be reduced to suppress an increase in power consumption.

This embodiment can be combined with any of the other embodiments as appropriate. In this specification, in the case where a plurality of structure examples are described in one embodiment, the structure examples can be combined as appropriate.

Embodiment 2

In this embodiment, a usage mode and the like of a display apparatus including the light-emitting devices and the light-receiving devices described in the above embodiments will be described.

Figure 14A:
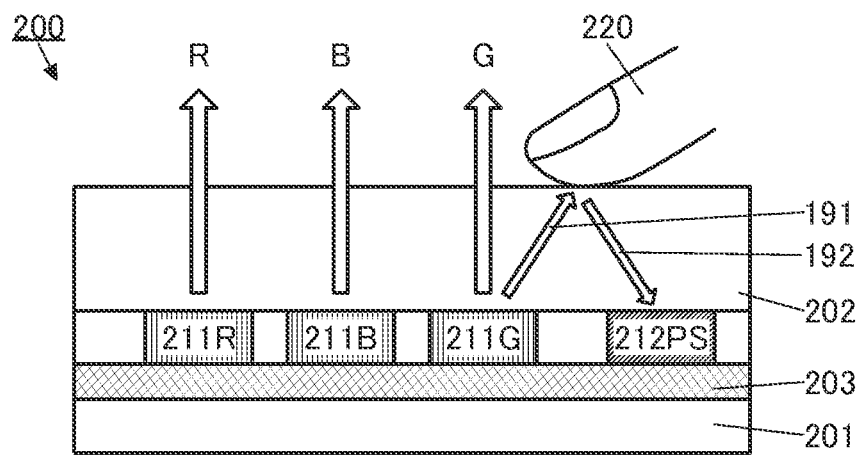
FIG. 14A, FIG. 14B, and FIG. 14D are cross-sectional views illustrating an example of a display apparatus.

FIG. 14A shows a schematic view illustrating a display apparatus of one embodiment of the present invention. A display apparatus 200 illustrated in FIG. 14A includes a substrate 201, a substrate 202, a light-emitting device 211R, a light-emitting device 211G, a light-emitting device 211B, a light-receiving device 212PS, a functional layer 203, and the like.

The light-emitting device 211R, the light-emitting device 211G, the light-emitting device 211B, and the light-receiving device 212PS are provided between the substrate 201 and the substrate 202. The light-emitting device 211R, the light-emitting device 211G, and the light-emitting device 211B emit red (R) light, green (G) light, and blue (B) light, respectively. Any of the above-described light-emitting devices can be used as the light-emitting device 211R, the light-emitting device 211G, and the light-emitting device 211B. Any of the light-receiving devices can be used as the light-receiving device 212PS. Note that in the following description, the term "light-emitting device 211" is sometimes used when the light-emitting device 211R, the light-emitting device 211G, and the light-emitting device 211B are not particularly distinguished from each other.

FIG. 14A illustrates a state where a finger 220 is in contact with a surface of the substrate 202. Part of light emitted by the light-emitting device (e.g., the light-emitting device 211G) is reflected by a contact portion between the substrate 202 and the finger 220. In the case where part of the reflected light is incident on the light-receiving device 212PS, the contact of the finger 220 with the substrate 202 can be detected. That is, the display apparatus 200 can function as a touch panel.

The functional layer 203 includes a circuit for driving the light-emitting device 211R, the light-emitting device 211G, and the light-emitting device 211B and a circuit for driving the light-receiving device 212PS. The functional layer 203 is provided with a switch, a transistor, a capacitor, a wiring, and the like. Note that in the case where the light-emitting device 211R, the light-emitting device 211G, the light-emitting device 211B, and the light-receiving device 212PS are driven by a passive matrix method, the switch and the transistor are not necessarily provided.

Figure 14B:
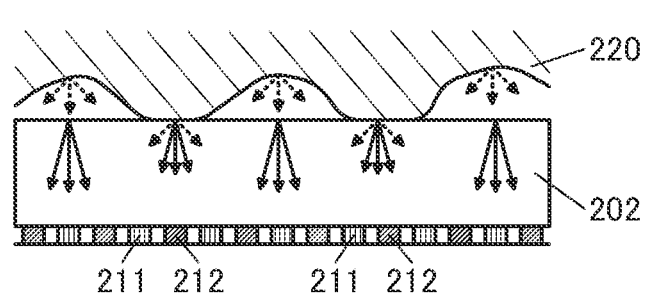

The display apparatus 200 can detect a fingerprint of the finger 220, for example. FIG. 14B schematically shows an enlarged view of the contact portion between the substrate 202 and the finger 220. FIG. 14B illustrates the light-emitting devices 211 and the light-receiving devices 212 that are alternately arranged.

The fingerprint of the finger 220 is formed of depressions and projections. Accordingly, as illustrated in FIG. 14B, the projections of the fingerprint touch the substrate 202.

Reflection of light from a surface or an interface is categorized into regular reflection and diffuse reflection. Regularly reflected light is highly directional light with an angle of reflection equal to the angle of incidence. Diffusely reflected light has low directionality and low angular dependence of intensity. As for regular reflection and diffuse reflection, diffuse reflection components are dominant in the light reflected from the surface of the finger 220. Meanwhile, regular reflection components are dominant in the light reflected from the interface between the substrate 202 and the air.

The intensity of light that is reflected from contact surfaces or non-contact surfaces between the finger 220 and the substrate 202 and is incident on the light-receiving devices 212 positioned directly below the contact surfaces or the non-contact surfaces is the sum of intensities of regularly reflected light and diffusely reflected light. As described above, regularly reflected light (indicated by solid arrows) is dominant in the depressions of the finger 220, where the finger 220 is not in contact with the substrate 202; whereas diffusely reflected light (indicated by dashed arrows) from the finger 220 is dominant in the projections of the finger 220, where the finger 220 is in contact with the substrate 202. Thus, the intensity of light received by the light-receiving device 212 positioned directly below the depression is higher than the intensity of light received by the light-receiving device 212 positioned directly below the projection. Accordingly, a fingerprint image of the finger 220 can be captured.

In the case where an arrangement interval between the light-receiving devices 212 is smaller than a distance between two projections of a fingerprint, preferably a distance between a depression and a projection adjacent to each other, a clear fingerprint image can be obtained. The distance between a depression and a projection of a human's fingerprint is approximately 200 μm; thus, the arrangement interval between the light-receiving devices 212 is, for example, less than or equal to 400 μm, preferably less than or equal to 200 μm, further preferably less than or equal to 150 μm, still further preferably less than or equal to 100 μm, yet still further preferably less than or equal to 50 μm and greater than or equal to 1 μm, preferably greater than or equal to 10 μm, further preferably greater than or equal to 20 μm.

Figure 14C:
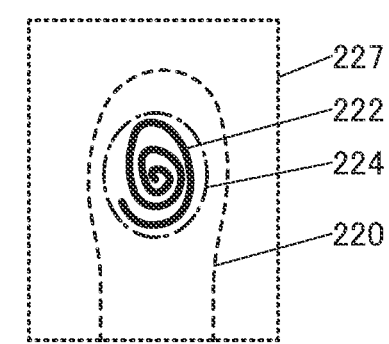
FIG. 14C and FIG. 14E are diagrams illustrating examples of an image captured by the display apparatus.

FIG. 14C illustrates an example of a fingerprint image captured by the display apparatus 200. In FIG. 14C, in an imaging range 227, the outline of the finger 220 is indicated by a dashed line and the outline of a contact portion 224 is indicated by a dashed-dotted line. In the contact portion 224, a high-contrast image of a fingerprint 222 can be captured owing to a difference in the amount of light incident on the light-receiving devices 212.

Figure 14D:
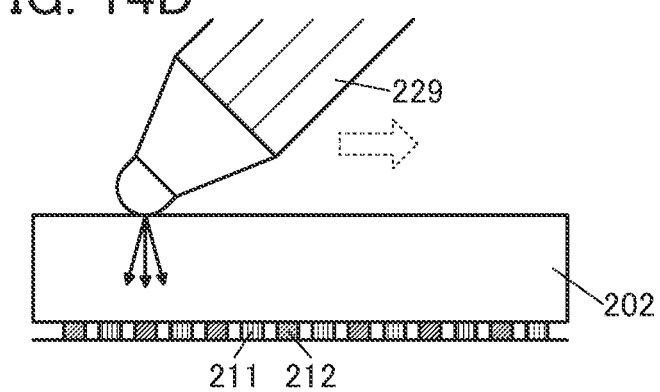

The display apparatus 200 can also function as a touch panel or a pen tablet. FIG. 14D illustrates a state where a tip of a stylus 229 slides in a direction indicated by a dashed arrow while being in contact with the substrate 202.

As illustrated in FIG. 14D, when diffusely reflected light that is diffused at the contact surface between the tip of the stylus 229 and the substrate 202 is incident on the light-receiving device 212 positioned in a portion overlapping with the contact surface, the position of the tip of the stylus 229 can be detected with high accuracy.

Figure 14E:
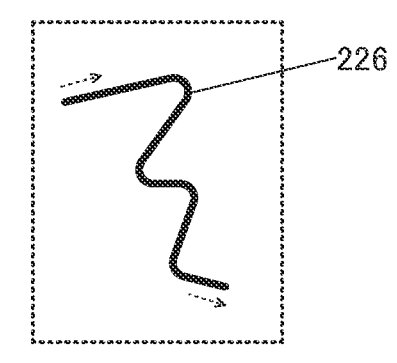

FIG. 14E illustrates an example of a path 226 of the stylus 229 that is detected by the display apparatus 200. The display apparatus 200 can detect the position of an object to be detected, such as the stylus 229, with high position accuracy, so that high-definition drawing can be performed using a drawing application or the like. Unlike the case of using a capacitive touch sensor, an electromagnetic induction touch pen, or the like, the display apparatus 200 can detect even the position of a highly insulating object to be detected, the material of a tip portion of the stylus 229 is not limited, and a variety of writing materials (e.g., a brush, a glass pen, and a quill pen) can be used.

Figure 15:
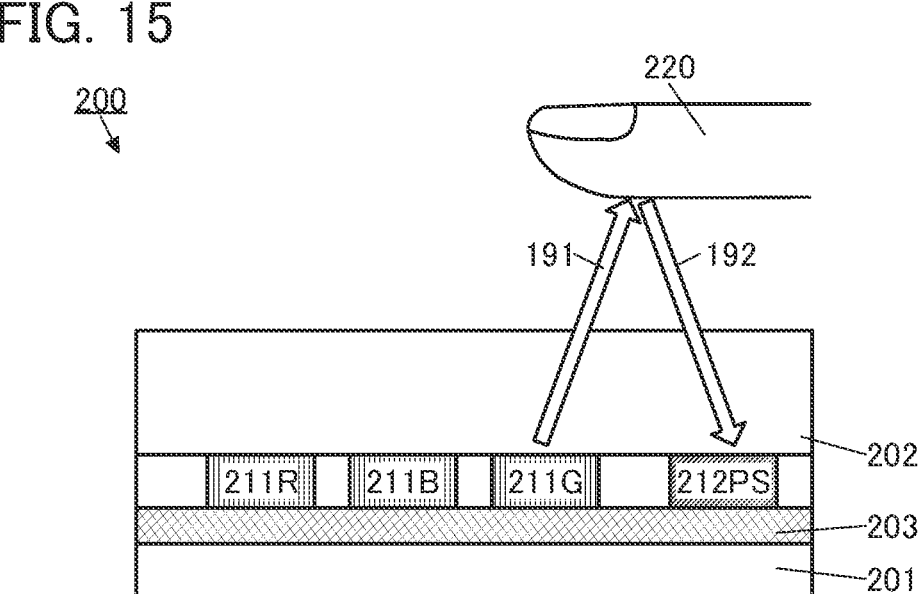
FIG. 15 is a cross-sectional view illustrating an example of a display apparatus.

The light-receiving device 212PS can be used in a touch sensor (also referred to as a direct touch sensor), a near touch sensor (also referred to as a hover sensor, a hover touch sensor, a contactless sensor, or a touchless sensor), or the like. FIG. 15 illustrates a state where light 191 emitted from the light-emitting device (e.g., the light-emitting device 211G) is reflected by an object (e.g., the finger 220), and light 192 that is reflected light is incident on the light-receiving device 212PS. The object is not in contact with the display apparatus 200; however, the object can be detected with the use of the light-receiving device 212PS. Note that the wavelength of light detected by the light-receiving device 212PS may be determined as appropriate depending on the intended use.

The touch sensor or the near touch sensor can detect an approach or contact of an object (e.g., a finger, a hand, or a pen). The touch sensor can detect the object when the display apparatus and the object come in direct contact with each other. Furthermore, even when an object is not in contact with the display apparatus, the near touch sensor can detect the object. For example, the display apparatus is preferably capable of detecting an object positioned in the range of 0.1 mm to 300 mm inclusive, further preferably 3 mm to 50 mm inclusive from the display apparatus. This structure enables the display apparatus to be operated without direct contact of an object; in other words, the display apparatus can be operated in a contactless (touchless) manner. With the above structure, the display apparatus can have a reduced risk of being dirty or damaged, or can be operated without the object directly touching a dirt (e.g., dust or a virus) attached to the display apparatus.

The refresh rate of the display apparatus of one embodiment of the present invention can be variable. For example, the refresh rate is adjusted (adjusted in the range from 1 Hz to 240 Hz inclusive, for example) in accordance with contents displayed on the display apparatus, whereby power consumption can be reduced. The driving frequency of the touch sensor or the near touch sensor may be changed in accordance with the refresh rate. In the case where the refresh rate of the display apparatus is 120 Hz, for example, the driving frequency of the touch sensor or the near touch sensor can be a frequency higher than 120 Hz (typically 240 Hz). With this structure, low power consumption can be achieved, and the response speed of the touch sensor or the near touch sensor can be increased.

The light-receiving device 212PS is preferably provided in all of the pixels included in the display apparatus. Providing the light-receiving device 212PS in all of the pixels enables highly accurate touch detection. Note that the light-receiving device 212PS may be provided in some of the pixels. For example, the display apparatus may include a pixel including the light-emitting device and the light-receiving device and a pixel including the light-receiving device (not including light-emitting device).

Figure 16A:
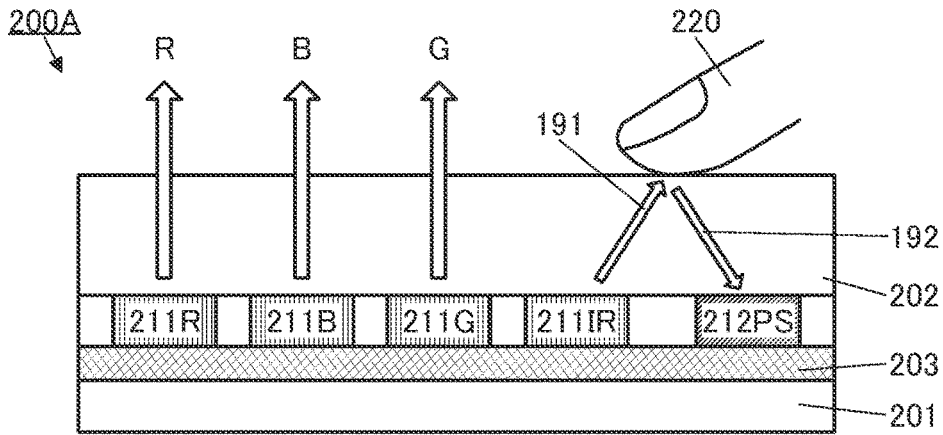
FIG. 16A to FIG. 16C are cross-sectional views illustrating an example of a display apparatus.

FIG. 16A illustrates a structure example different from that of the above-described display apparatus 200. A display apparatus 200A illustrated in FIG. 16A includes the substrate 201, the substrate 202, the light-emitting device 211R, the light-emitting device 211G, the light-emitting device 211B, a light-emitting device 211IR, the light-receiving device 212PS, the functional layer 203, and the like. The display apparatus 200A is different from the display apparatus 200 mainly in including the light-emitting device 211IR.

The light-emitting device 211R, the light-emitting device 211G, the light-emitting device 211B, and the light-receiving device 212PS are provided between the substrate 201 and the substrate 202. The light-emitting device 211IR emits infrared light. Any of the above-described light-emitting devices can be used as the light-emitting device 211IR.

FIG. 16A illustrates a state where the finger 220 touches a surface of the substrate 202. Part of light emitted from the light-emitting device (e.g., the light-emitting device 211IR) is reflected by a contact portion between the substrate 202 and the finger 220. In the case where part of the reflected light is incident on the light-receiving device 212PS, the contact of the finger 220 with the substrate 202 can be detected. For example, infrared rays are emitted from the light-emitting device 211IR and infrared light is detected by the light-receiving device 212PS, so that a touch can be detected even in a dark place.

The display apparatus 200A can perform touch detection in a display portion with the use of the light-emitting device 211IR and the light-receiving device 212PS while displaying an image on the display portion with the use of the light-emitting device 211R, the light-emitting device 211G, and the light-emitting device 211B. In addition, the display apparatus 200A can perform image capturing on the display portion while displaying an image on the display portion.

Figure 16B:
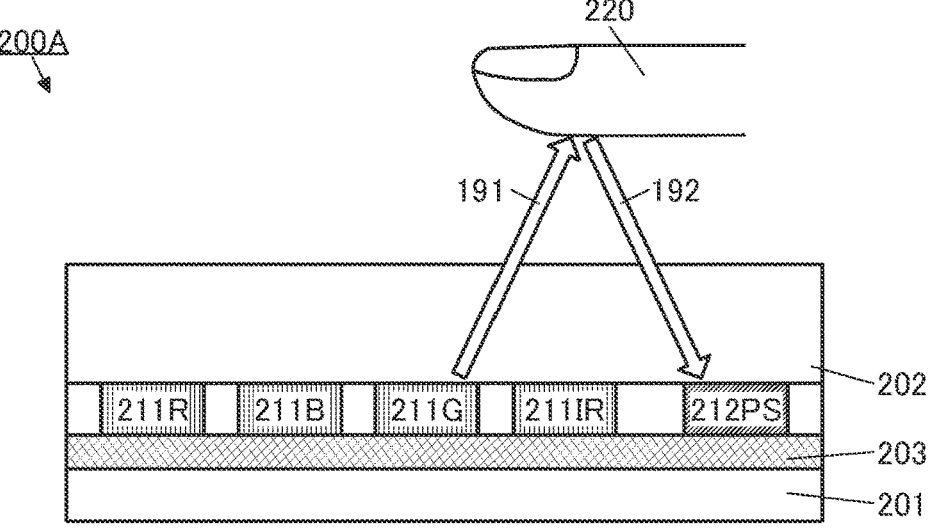
Figure 16C:
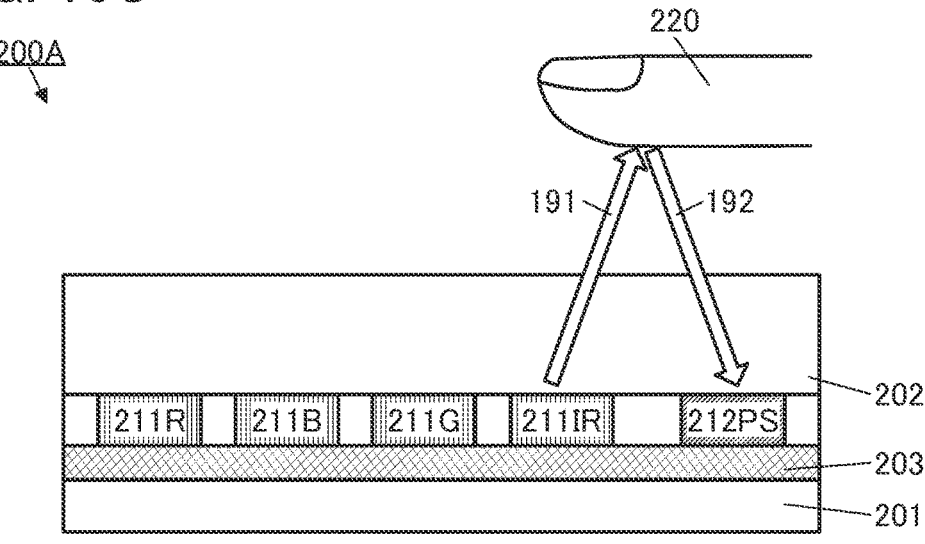

FIG. 16B illustrates a state where the light 191 emitted from the light-emitting device 211G is reflected by an object (e.g., the finger 220), and the light 192 that is reflected light is incident on the light-receiving device 212PS. FIG. 16C illustrates a state where the light 191 emitted from the light-emitting device 211IR is reflected by an object (e.g., the finger 220), and the light 192 that is reflected light is incident on the light-receiving device 212PS. The object is not in contact with the display apparatus 200A; however, the object can be detected with the use of the light-receiving device 212PS.

Figure 17A:
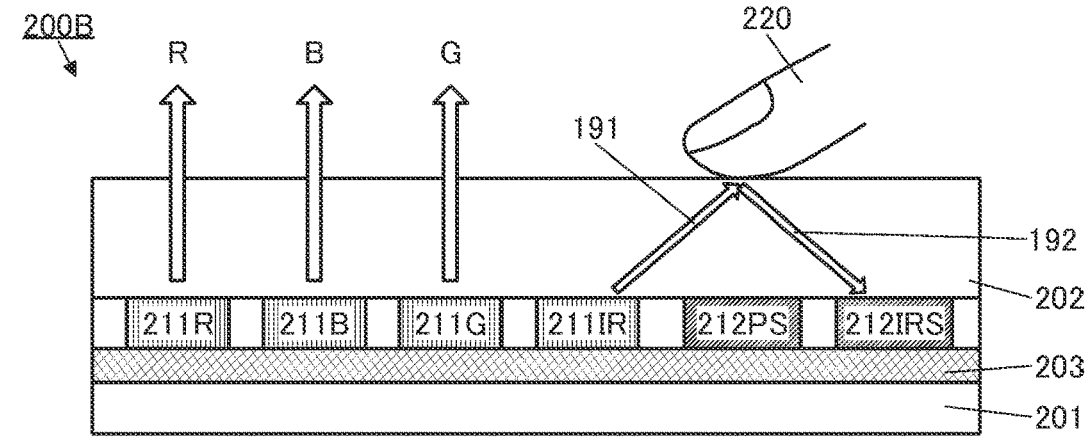
FIG. 17A to FIG. 17C are cross-sectional views illustrating an example of a display apparatus.

FIG. 17A illustrates a structure example different from that of the above-described display apparatus 200A. A display apparatus 200B illustrated in FIG. 17A includes the substrate 201, the substrate 202, the light-emitting device 211R, the light-emitting device 211G, the light-emitting device 211B, the light-emitting device 211IR, the light-receiving device 212PS, a light-receiving device 212IRS, the functional layer 203, and the like. The display apparatus 200B is different from the above-described display apparatus 200A mainly in the structure of the light-receiving device.

The light-emitting device 211R, the light-emitting device 211G, the light-emitting device 211B, the light-receiving device 212PS, and the light-receiving device 212IRS are provided between the substrate 201 and the substrate 202. The light-receiving device 212PS receives visible light. The light-receiving device 212IRS receives infrared light. Any of the above-described light-receiving devices can be used as the light-receiving device 212PS and the light-receiving device 212IRS.

FIG. 17A illustrates a state where a finger 220 is in contact with a surface of the substrate 202. Part of light emitted from the light-emitting device (e.g., the light-emitting device 211IR) is reflected by a contact portion between the substrate 202 and the finger 220. In the case where part of the reflected light is incident on the light-receiving device 212IRS, the contact of the finger 220 with the substrate 202 can be detected.

Figure 17B:
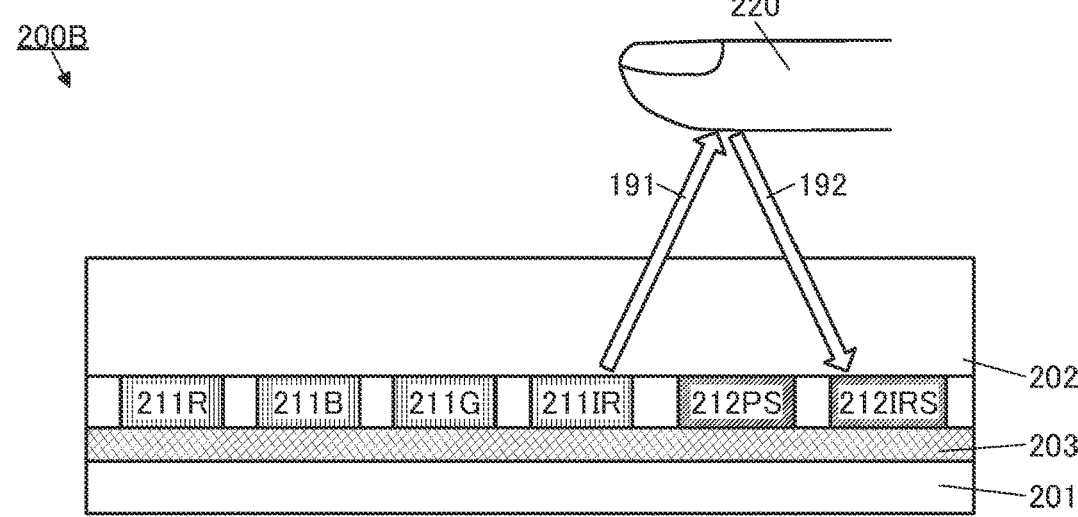
Figure 17C:
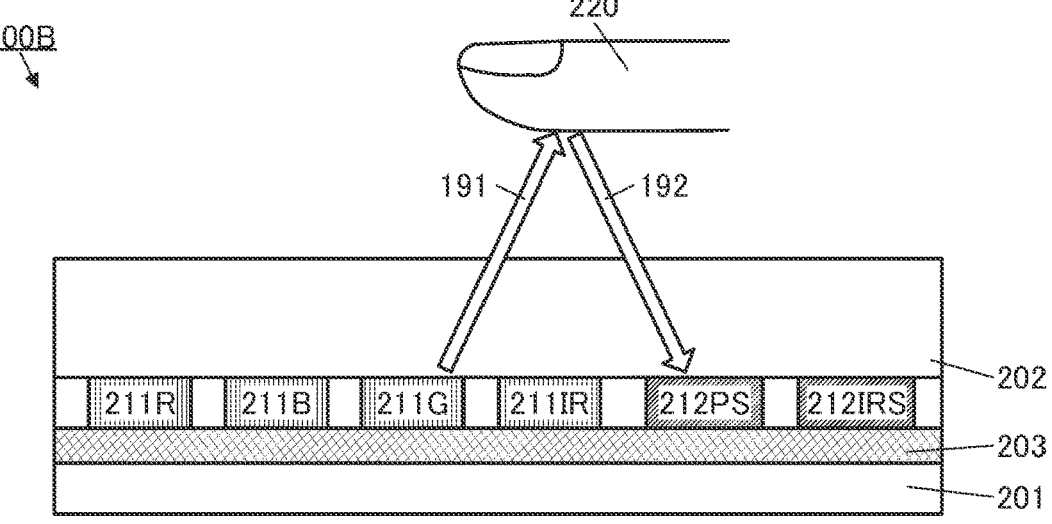

FIG. 17B illustrates a state where the light 191 emitted from the light-emitting device 211IR is reflected by an object (e.g., the finger 220), and the light 192 that is reflected light is incident on the light-receiving device 212IRS. FIG. 17C illustrates a state where the light 191 emitted from the light-emitting device 211G is reflected by an object (e.g., the finger 220), and the light 192 that is reflected light is incident on the light-receiving device 212PS. The object is not in contact with the display apparatus 200B; however, the object can be detected with the use of the light-receiving device 212PS or the light-receiving device 212IRS.

The area of a light-receiving region (hereinafter, also referred to as a light-receiving area) of the light-receiving device 212PS is preferably smaller than the light-receiving area of the light-receiving device 212IRS. When the light-receiving area of the light-receiving device 212PS is made small, that is, the image capturing range is made small, the light-receiving device 212PS can perform higher-definition image capturing than the light-receiving device 212IRS. In this case, the light-receiving device 212PS can be used to capture an image for personal authentication using a fingerprint, a palm print, the iris, the shape of a blood vessel (including the shape of a vein and the shape of an artery), a face, or the like. Note that the wavelength of light detected by the light-receiving device 212PS may be determined as appropriate depending on the intended use.

Since the light-receiving device 212PS and the light-receiving device 212IRS have difference in the detection accuracy, methods for detecting an object may be selected depending on the functions. For example, a function of scrolling a display screen may be achieved by a near touch sensor function using the light-receiving device 212IRS, and an input function with a keyboard displayed on a screen may be achieved by a high-definition touch sensor function using the light-receiving device 212PS.

When one pixel includes two kinds of light-receiving devices, the display apparatus can have two additional functions as well as a display function, enabling a multifunctional display apparatus.

For high-definition image capturing, the light-receiving device 212PS is preferably provided in all of the pixels included in the display apparatus. Meanwhile, the light-receiving device 212IRS used for a touch sensor, a near touch sensor, or the like may be provided in some of the pixels included in the display apparatus because detection with the light-receiving device 212IRS is not required to have high accuracy as compared to detection with the light-receiving device 212PS. When the number of the light-receiving devices 212IRS included in the display apparatus is smaller than the number of the light-receiving devices 212PS, the detection speed can be increased.

As described above, the display apparatus of this embodiment can be a multifunctional display apparatus by including a light-emitting device and a light-receiving device in one pixel. For example, a display apparatus with a high-definition image capturing function and a sensing function of a touch sensor, a near touch sensor, or the like can be achieved.

Figure 18A:
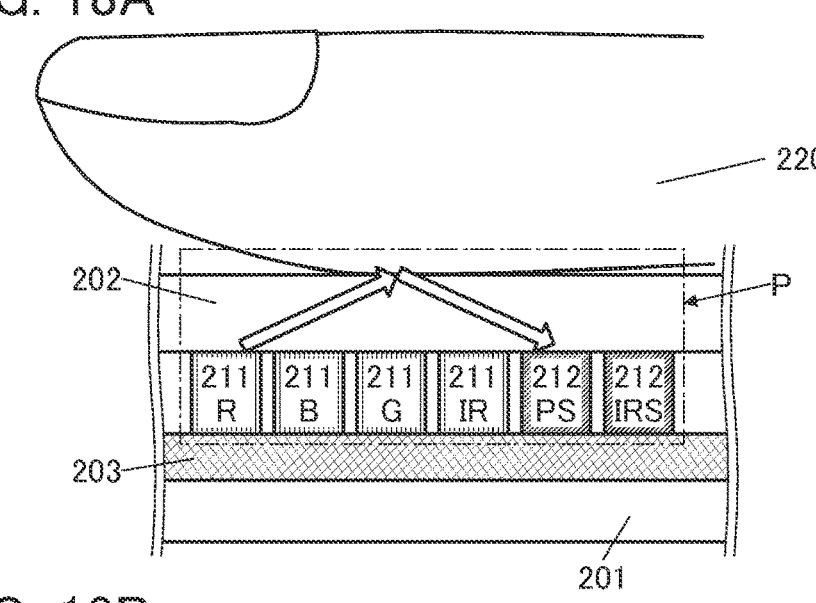
FIG. 18A to FIG. 18C are diagrams illustrating examples of a display apparatus.
Figure 18B:
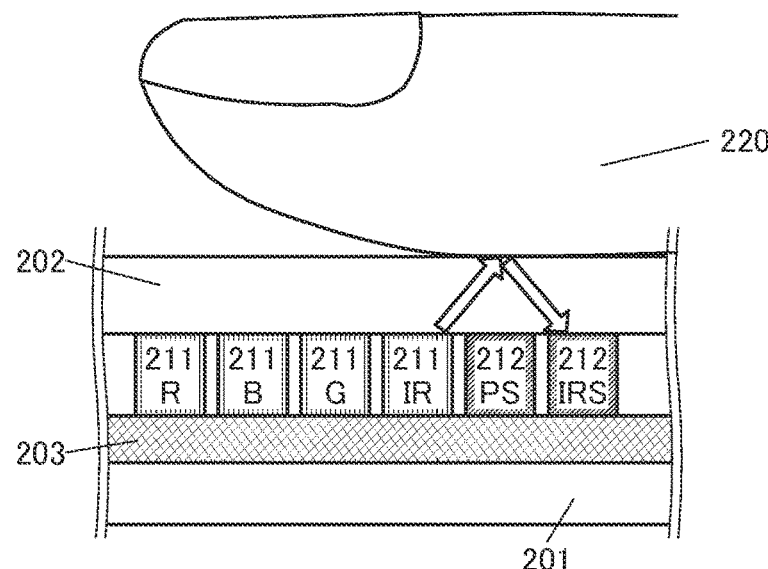

The display apparatus of one embodiment of the present invention may emit light of a particular color and receive reflected light that has been reflected by an object. In FIG. 18A, red light emitted from the display apparatus and the red light incident on the display apparatus after being reflected by an object (here, the finger 220) are schematically indicated by arrows. In FIG. 18B, infrared light emitted from the display apparatus and the infrared light incident on the display apparatus after being reflected by an object (here, the finger 220) are schematically indicated by arrows.

Red light is emitted with an object being in contact with or approaching the display apparatus, and light reflected by the object is incident on the display apparatus, so that the red light transmittance of the object can be measured. Similarly, infrared light is emitted with an object being in contact with or approaching the display apparatus, and light reflected by the object is incident on the display apparatus, so that the infrared light transmittance of the object can be measured.

Figure 18C:
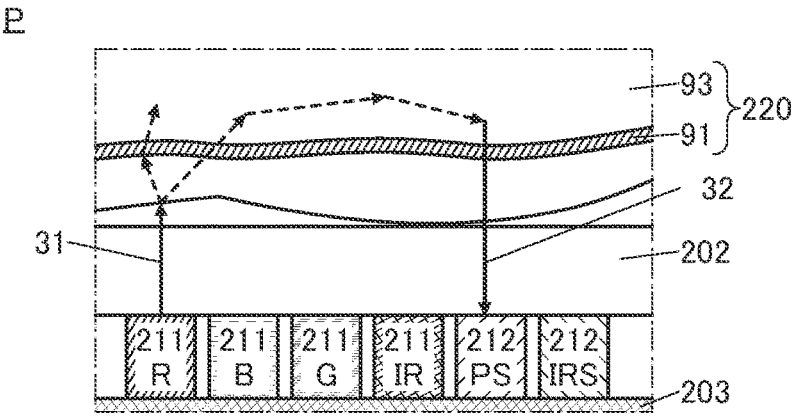

FIG. 18C shows an enlarged view of a region P indicated by the dashed-dotted line in FIG. 18A. The light 191 emitted from the light-emitting device 211R is scattered by biological tissue on the surface or at the inside of the finger 220, and part of the scattered light advances from the inside of the living body toward the light-receiving device 212PS. The scattered light passes through a blood vessel 91, and the light 192 having passed through the blood vessel 91 is incident on the light-receiving device 212PS.

Similarly, infrared light emitted from the light-emitting device 211IR is scattered by biological tissue on the surface or at the inside of the finger 220, and part of the scattered infrared light advances from the inside of the living body toward the light-receiving device 212IRS. The scattered infrared light passes through the blood vessel 91, and the infrared light having passed through the blood vessel 91 is incident on the light-receiving device 212IRS.

Here, the light 192 is light having passed through biological tissue 93 and the blood vessel 91 (an artery and a vein). Since an arterial blood pulses by heartbeat, light absorption by the artery fluctuates in accordance with the heartbeat. In contrast, the biological tissue 93 and the vein are not influenced by the heartbeat, and thus light absorption by the biological tissue 93 and light absorption by the vein are constant. Therefore, light transmittance of the artery can be calculated by subtracting the components that are constant over time from the light 192 that is incident on the display apparatus. The red light transmittance of oxygen-unbound hemoglobin (also referred to as reduced hemoglobin) is lower than that of oxygen-bound hemoglobin (also referred to as oxyhemoglobin). Oxyhemoglobin and reduced hemoglobin have substantially the same infrared light transmittance. Measuring the red light transmittance of the artery and the infrared light transmittance of the artery enables the ratio of oxyhemoglobin to the total amount of oxyhemoglobin and reduced hemoglobin, that is, the oxygen saturation (hereinafter, also referred to as percutaneous oxygen saturation (SpO$_2$: Peripheral Oxygen Saturation)), to be calculated. In this way, the display apparatus of one embodiment of the present invention can have a function of a reflective pulse oximeter.

For example, when a finger is in contact with a display portion of a display apparatus, positional information of a region that the finger is in contact with is obtained. Then, red light is emitted from pixels in and around the region that the finger is in contact with to measure the red light transmittance of the artery. After that, infrared light is emitted to measure the infrared light transmittance of the artery, whereby the oxygen saturation can be calculated. Note that the order of measuring the red light transmittance and measuring the infrared light transmittance is not particularly limited. After the infrared light transmittance is measured, the red light transmittance may be measured. Furthermore, although an example of calculating the oxygen saturation using the finger is described here, one embodiment of the present invention is not limited thereto. The oxygen saturation can be calculated using a part other than the finger. For example, the oxygen saturation can be calculated by measuring the red light transmittance of an artery and the infrared light transmittance of the artery while a palm is in contact with the display portion of the display apparatus.

Figures 19A, 19B, 19C:
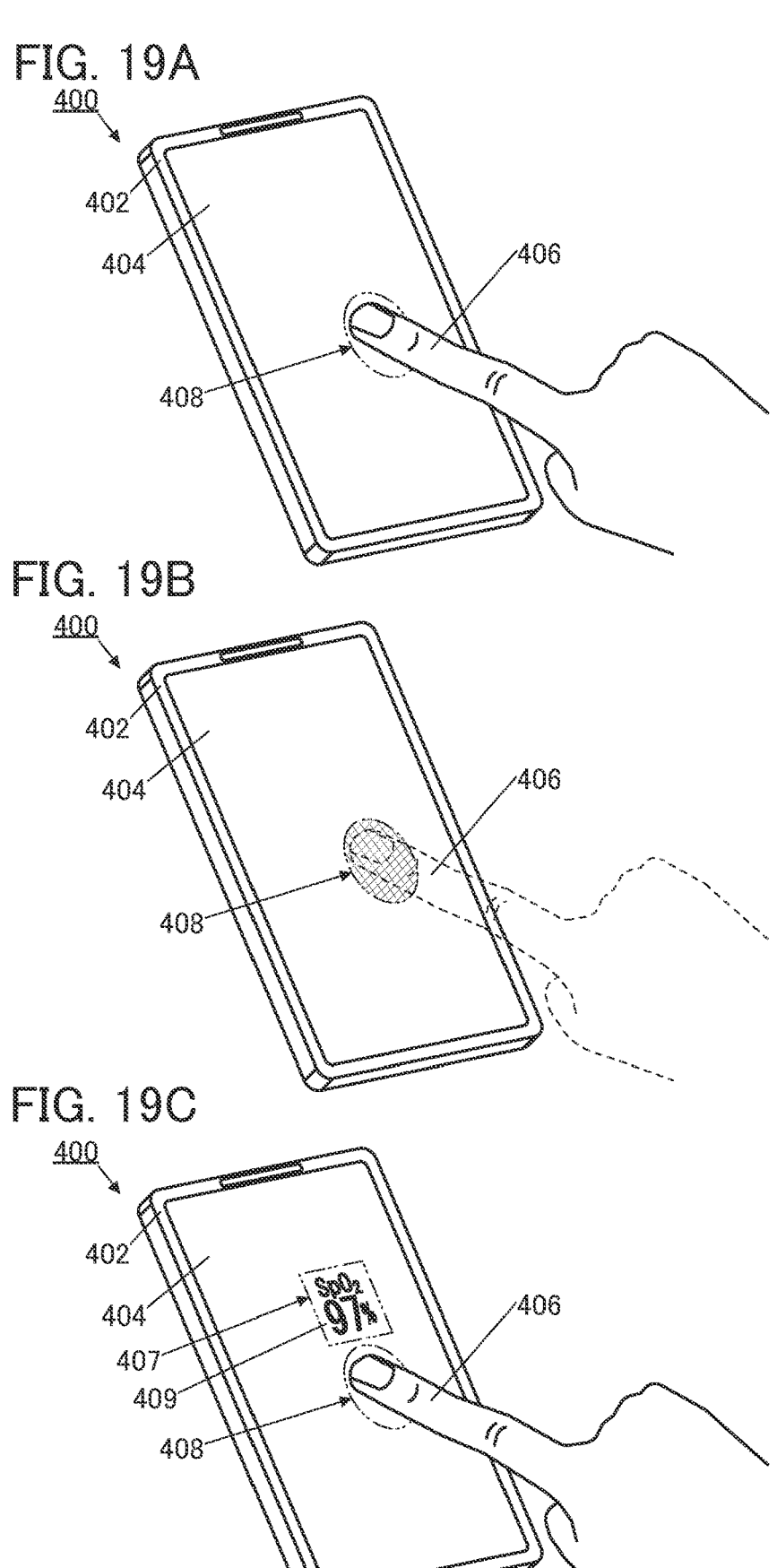
FIG. 19A to FIG. 19C are diagrams illustrating examples of electronic devices.

FIG. 19A illustrates an example of an electronic device including the display apparatus of one embodiment of the present invention. A portable information terminal 400 illustrated in FIG. 19A can be used as a smartphone, for example. The portable information terminal 400 includes a housing 402 and a display portion 404. Any of the above-described display apparatuses can be used for the display portion 404. For example, the above-described display apparatus 200B can be suitably used for the display portion 404.

FIG. 19A illustrates a state where a finger 406 is in contact with the display portion 404 of the portable information terminal 400. In FIG. 19A, a region 408 including a region where a touch is detected and the vicinity thereof is indicated by a dashed double-dotted line.

The portable information terminal 400 emits red light from pixels in the region 408 and detects red light incident on the display portion 404. Similarly, the portable information terminal 400 can measure the oxygen saturation of the finger 406 by emitting infrared light from pixels in the region 408 and detecting infrared light incident on the display portion 404. FIG. 19B illustrates a state where the pixels in the region 408 are in a lighting state. In FIG. 19B, the finger 406 is illustrated to be transparent with only the outline indicated by a dashed line, and the region 408 is shown with a hatch pattern. As illustrated in FIG. 19B, the region 408 in a lighting state is hidden by the finger 406 and thus is less likely to be recognized by a user. Therefore, the oxygen saturation can be measured without causing stress to the user. In addition, the portable information terminal 400 can measure the oxygen saturation at any position in the display portion 404.

The obtained oxygen saturation may be displayed on the display portion 404. FIG. 19C illustrates a state where an image 409 showing the oxygen saturation is displayed in a region 407. FIG. 19C illustrates characters of "SpO$_2$ 97%" as an example of the image 409. Note that the image 409 may be an image or may include an image and a character. The region 407 is provided at a given position in the display portion 404.

This embodiment can be combined with any of the other embodiments as appropriate. In this specification, in the case where a plurality of structure examples are described in one embodiment, the structure examples can be combined as appropriate.

Embodiment 3

In this embodiment, a display apparatus of one embodiment of the present invention and a manufacturing method thereof are described with reference to FIG. 20 to FIG. 27.

In the case of manufacturing a display apparatus including a light-emitting device and a light-receiving device, a light-emitting layer and an active layer each need to be formed into an island-like shape.

For example, an island-shaped light-emitting layer and an island-shaped active layer can be formed by a vacuum evaporation method using a metal mask (also referred to as a shadow mask). However, this method causes a deviation from the designed shape and position of an island-shaped light-emitting layer and an island-shaped active layer due to various influences such as the accuracy of the metal mask, the positional deviation between the metal mask and a substrate, a warp of the metal mask, and expansion of the outline of a deposited film due to vapor scattering or the like; accordingly, it is difficult to achieve high definition and a high aperture ratio of the display apparatus.

In a manufacturing method of a display apparatus of one embodiment of the present invention, an island-shaped pixel electrode (also can be referred to as a lower electrode) is formed, a first layer to be an EL layer is formed over the entire surface, and then a first mask layer is formed over the first layer. After that, a first resist mask is formed over the first mask layer and the first layer and the first mask layer are processed using the first resist mask, whereby an island-shaped EL layer is formed. Similarly, a second layer to be a light-receiving layer is formed into an island-shaped light-receiving layer using a second mask layer and a second resist mask.

As described above, in the manufacturing method of the display apparatus of one embodiment of the present invention, the island-shaped EL layer is formed not by using a pattern of a metal mask but by processing a layer to be an EL layer deposited over the entire surface. Similarly, the island-shaped light-receiving layer is formed by processing the layer to be the light-receiving layer formed over the entire surface, not with a pattern of a metal mask. Accordingly, a display apparatus with high definition or a display apparatus with a high aperture ratio, which has been difficult to achieve so far, can be obtained. Moreover, EL layers can be formed separately for the respective colors, enabling the display apparatus to perform extremely clear display with high contrast and high display quality. Furthermore, a light-receiving device can be provided in the pixel, enabling the display apparatus to have a high-definition image capturing function and a sensing function of a touch sensor, a near touch sensor, or the like. In addition, a mask layer provided over an EL layer and a light-receiving layer can reduce damage to the EL layer and the light-receiving layer in the manufacturing process of the display apparatus, increasing the reliability of the light-emitting device and the light-receiving device.

It is difficult to set the distance between adjacent devices among the light-emitting devices and the light-receiving device to be less than 10 μm with a formation method using a metal mask, for example; however, with the above method, the distance can be decreased to less than or equal to 3 μm, less than or equal to 2 μm, or less than or equal to 1 μm. For example, with the use of a light exposure apparatus for LSI, the distance can be decreased to less than or equal to 500 nm, less than or equal to 200 nm, less than or equal to 100 nm, or less than or equal to 50 nm. Thus, the area of a light-emitting region (hereinafter, also referred to as a light-emitting area) and the light-receiving area in a pixel can be increased and the aperture ratio can be close to 100%. For example, the aperture ratio higher than or equal to 50%, higher than or equal to 60%, higher than or equal to 70%, higher than or equal to 80%, or higher than or equal to 90% and lower than 100% can be achieved.

Furthermore, patterns of the EL layer and the light-receiving layer themselves can be made extremely smaller than those in the case of using a metal mask. For example, in the case of using a metal mask for separate formation of an EL layer and a light-receiving layer, the thickness varies between the center and the edge of the pattern, which causes a reduction in an effective area that can be used as a light-emitting region or a light-receiving region with respect to the whole area of the pattern. In contrast, in the above formation method, a pattern is formed by processing a film deposited to a uniform thickness, which enables a uniform thickness in the pattern; thus, even in a fine pattern, almost the entire area can be used as a light-emitting region or a light-receiving region. Thus, a display apparatus having both high definition and a high aperture ratio can be manufactured.

<Structure Example of Display Apparatus>

Figures 20A, 20B:
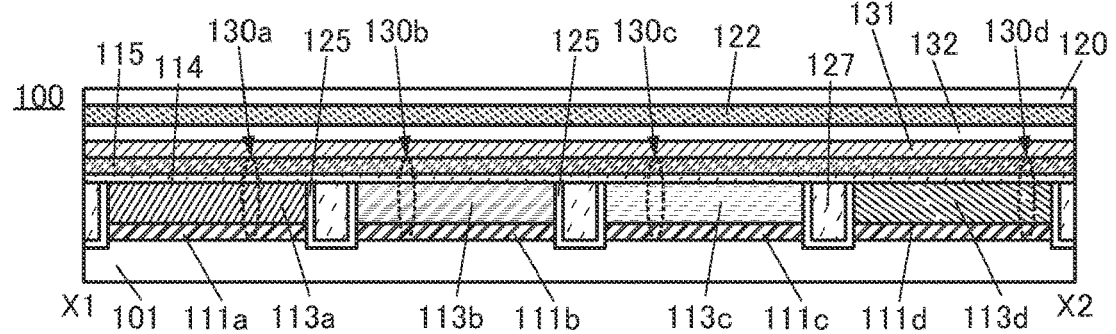
FIG. 20A is a top view illustrating an example of a display apparatus.
FIG. 20B is a cross-sectional view illustrating an example of a display apparatus.

FIG. 20A and FIG. 20B illustrate the display apparatus of one embodiment of the present invention.

FIG. 20A is a top view of the display apparatus 100. The display apparatus 100 includes a display portion in which a plurality of pixels 110 are arranged in a matrix and a connection portion 140 outside the display portion.

The pixel 110 illustrated in FIG. 20A employs stripe arrangement. The pixel 110 illustrated in FIG. 20A is composed of four subpixels: a subpixel 110a, a subpixel 110b, a subpixel 110c, and a subpixel 110d. The subpixel 110a, the subpixel 110b, and the subpixel 110c include light-emitting devices that emit light in different wavelength ranges. Any of the above-described light-emitting devices can be used as the light-emitting device. The subpixel 110a, the subpixel 110b, and the subpixel 110c can be subpixels of three colors of red (R), green (G), and blue (B) or subpixels of three colors of yellow (Y), cyan (C), and magenta (M), for example. The subpixel 110d includes a light-receiving device. Any of the above-described light-receiving devices can be used as the light-receiving device.

FIG. 20A illustrates an example where subpixels are arranged to be aligned in the X direction and subpixels of the same kind are arranged to be aligned in the Y direction. Note that subpixels of different kinds may be arranged to be aligned in the Y direction, and subpixels of the same kind may be arranged to be aligned in the X direction.

Although the top view in FIG. 20A illustrates an example where the connection portion 140 is positioned in the lower side of the display portion, one embodiment of the present invention is not particularly limited thereto. The connection portion 140 is provided in at least one of the upper side, the right side, the left side, and the lower side of the display portion in the top view, or may be provided so as to surround the four sides of the display portion. The number of the connection portions 140 can be one or more.

FIG. 20B is a cross-sectional view along a dashed-dotted line X1-X2 in FIG. 20A.

As illustrated in FIG. 20B, the display apparatus 100 includes a light-emitting device 130a, a light-emitting device 130b, a light-emitting device 130c, and a light-receiving device 130d over a layer 101 including transistors. Furthermore, a protective layer 131 and a protective layer 132 are provided to cover these light-emitting devices and the light-receiving device. A substrate 120 is bonded onto the protective layer 132 with a resin layer 122. In a region between adjacent devices among the light-emitting devices and the light-receiving device, an insulating layer 125 and an insulating layer 127 over the insulating layer 125 are provided.

The display apparatus of one embodiment of the present invention can have any of the following structures: a top-emission structure where light is emitted in a direction opposite to the substrate where the light-emitting device is formed, a bottom-emission structure where light is emitted toward the substrate where the light-emitting device is formed, and a dual-emission structure where light is emitted toward both surfaces.

The layer 101 including transistors can employ a stacked-layer structure where a plurality of transistors are provided over a substrate and an insulating layer is provided to cover these transistors, for example. The layer 101 including transistors may have a depressed portion between adjacent light-emitting devices. For example, an insulating layer positioned on the outermost surface of the layer 101 including transistors may have a depressed portion.

The light-emitting device 130a, the light-emitting device 130b, and the light-emitting device 130c emit light in different wavelength ranges. The light-emitting device 130a, the light-emitting device 130b, and the light-emitting device 130c preferably emit light of three colors, red (R), green (G), and blue (B) as a combination, for example.

The light-emitting device 130a includes a pixel electrode 111a over the layer 101 including transistors, an island-shaped EL layer 113a over the pixel electrode 111a, a common layer 114 over the island-shaped EL layer 113a, and a common electrode 115 over the common layer 114.

The light-emitting device 130b includes a pixel electrode 111b over the layer 101 including transistors, an island-shaped EL layer 113b over the pixel electrode 111b, the common layer 114 over the island-shaped EL layer 113b, and the common electrode 115 over the common layer 114.

The light-emitting device 130c includes a pixel electrode 111c over the layer 101 including transistors, an island-shaped EL layer 113c over the pixel electrode 111c, the common layer 114 over the island-shaped EL layer 113c, and the common electrode 115 over the common layer 114.

The light-receiving device 130d includes a pixel electrode 111d over the layer 101 including transistors, an island-shaped light-receiving layer 113d over the pixel electrode 111d, the common layer 114 over the island-shaped light-receiving layer 113d, and the common electrode 115 over the common layer 114.

The light-emitting devices of different colors and the light-receiving device share the same film as the common electrode. The common electrode is electrically connected to a conductive layer provided in the connection portion 140. Thus, the same potential is supplied to the common electrode included in the light-emitting devices of different colors and the light-receiving device.

For the pair of electrodes (the pixel electrode and the common electrode) of the light-emitting devices and the light-receiving device, a metal, an alloy, an electrically conductive compound, a mixture thereof, and the like can be used as appropriate. Specific examples include an indium tin oxide (also referred to as an In—Sn oxide or ITO), an In—Si—Sn oxide (also referred to as ITSO), an indium zinc oxide (In—Zn oxide), an In—W—Zn oxide, an alloy containing aluminum (an aluminum alloy) such as an alloy of aluminum, nickel, and lanthanum (Al—Ni-La), and an alloy of silver, palladium, and copper (Ag—Pd—Cu, also referred to as APC). In addition, it is possible to use a metal such as aluminum (Al), titanium (Ti), chromium (Cr), manganese (Mn), iron (Fe), cobalt (Co), nickel (Ni), copper (Cu), gallium (Ga), zinc (Zn), indium (In), tin (Sn), molybdenum (Mo), tantalum (Ta), tungsten (W), palladium (Pd), gold (Au), platinum (Pt), silver (Ag), yttrium (Y), or neodymium (Nd) and an alloy containing an appropriate combination of any of these metals. It is also possible to use an element belonging to Group 1 or Group 2 of the periodic table, which is not mentioned above (e.g., lithium (Li), cesium (Cs), calcium (Ca), or strontium (Sr)), a rare earth metal such as europium (Eu) or ytterbium (Yb), an alloy containing an appropriate combination of any of these, graphene, or the like.

The light-emitting devices preferably employ a microcavity structure. Therefore, one of the pair of electrodes of the light-emitting devices preferably includes an electrode having a transmitting property and a reflecting property with respect to visible light (a semi-transmissive and semi-reflective electrode), and the other is preferably an electrode having a reflecting property with respect to visible light (a reflective electrode). When the light-emitting devices have a microcavity structure, light emitted from the light-emitting layers can be resonated between the electrodes, whereby light emitted from the light-emitting devices can be intensified.

Note that the semi-transmissive and semi-reflective electrode can have a stacked-layer structure of an electrode having a reflecting property with respect to visible light and an electrode having a transmitting property with respect to visible light (also referred to as a transparent electrode).

The transparent electrode has a light transmittance higher than or equal to 40%. For example, an electrode having a visible light transmittance higher than or equal to 40% is preferably used in light-emitting devices. The semi-transmissive and semi-reflective electrode has a visible light reflectance higher than or equal to 10% and lower than or equal to 95%, preferably higher than or equal to 30% and lower than or equal to 80%. The reflective electrode has a visible light reflectance higher than or equal to 40% and lower than or equal to 100%, preferably higher than or equal to 70% and lower than or equal to 100%. These electrodes each preferably have a resistivity lower than or equal to $1\times10^{-2}$ Ωcm. Note that in the case where any of the light-emitting devices emits infrared light, the infrared light transmittance and reflectance of these electrodes preferably satisfy the above-described numerical ranges, like the visible light transmittance and reflectance.

The EL layer 113a, the EL layer 113b, the EL layer 113c, and the light-receiving layer 113d are formed in island-like shapes. The EL layer 113a, the EL layer 113b, and the EL layer 113c include light-emitting layers. The EL layer 113a, the EL layer 113b, and the EL layer 113c preferably include light-emitting layers that emit light in different wavelength ranges. The light-receiving layer 113d includes an active layer.

The light-emitting layer is a layer containing a light-emitting substance. The light-emitting layer can contain one or more kinds of light-emitting substances. As the light-emitting substance, a substance that exhibits an emission color of blue, violet, blue violet, green, yellow green, yellow, orange, red, or the like is appropriately used. As the light-emitting substance, a substance that emits infrared light can also be used.

Examples of the light-emitting substance include a fluorescent material, a phosphorescent material, a TADF material, and a quantum dot material.

Examples of the fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of the phosphorescent material include an organometallic complex (especially, an iridium complex) having a 4H-triazole skeleton, a 1H-triazole skeleton, an imidazole skeleton, a pyrimidine skeleton, a pyrazine skeleton, or a pyridine skeleton; an organometallic complex (especially, an iridium complex) having a phenylpyridine derivative including an electron-withdrawing group as a ligand; a platinum complex; and a rare earth metal complex.

The light-emitting layer may contain one or more kinds of organic compounds (e.g., a host material and an assist material) in addition to the light-emitting substance (a guest material). As one or more kinds of organic compounds, one or both of a hole-transport material and an electron-transport material can be used. Alternatively, as one or more kinds of organic compounds, a bipolar material or a TADF material may be used.

The light-emitting layer preferably contains, for example, a phosphorescent material and a combination of a hole-transport material and an electron-transport material that easily forms an exciplex. With such a structure, light emission can be efficiently obtained by ExTET (Exciplex-Triplet Energy Transfer), which is energy transfer from an exciplex to a light-emitting substance (a phosphorescent material). When a combination of materials is selected to form an exciplex that exhibits light emission having a wavelength overlapping with the wavelength of a lowest-energy-side absorption band of the light-emitting substance, energy can be transferred smoothly and light emission can be obtained efficiently. With this structure, high efficiency, low-voltage driving, and a long lifetime of the light-emitting device can be achieved at the same time.

In the combination of materials for forming an exciplex, the HOMO level (highest occupied molecular orbital level) of the hole-transport material is preferably higher than or equal to the HOMO level of the electron-transport material. The LUMO level (lowest unoccupied molecular orbital level) of the hole-transport material is preferably higher than or equal to the LUMO level of the electron-transport material. The LUMO levels and the HOMO levels of the materials can be derived from the electrochemical characteristics (reduction potentials and oxidation potentials) of the materials that are measured by cyclic voltammetry (CV).

The formation of an exciplex can be confirmed, for example, in the following manners: when the emission spectrum of the hole-transport material, the emission spectrum of the electron-transport material, and the emission spectrum of a mixed film of these materials are compared, it is observed that the emission spectrum of the mixed film is shifted to the longer wavelength than the emission spectrum of each of the materials (or has another peak on the longer wavelength side). Alternatively, when the transient photoluminescence (PL) of the hole-transport material, the transient PL of the electron-transport material, and the transient PL of the mixed film of the materials are compared, a difference in transient response is observed, for example, the transient PL lifetime of the mixed film has a longer lifetime component or has a delayed component at a higher proportion than that of each of the materials. The transient PL can be rephrased as transient electroluminescence (EL). That is, the formation of an exciplex can also be confirmed by a difference in transient response observed in comparison between the transient EL of the hole-transport material, the transient EL of the electron-transport material and the transient EL of the mixed film of these materials.

In addition to the light-emitting layer, the EL layer 113a, the EL layer 113b, and the EL layer 113c may further include a layer containing any of a substance with a high hole-injection property, a substance with a high hole-transport property, a hole-blocking material, a substance with a high electron-transport property, a substance with a high electron-injection property, an electron-blocking material, a substance with a bipolar property (a substance with a high electron-transport property and a high hole-transport property), and the like.

Either a low molecular compound or a high molecular compound can be used for the light-emitting device, and an inorganic compound may also be included. Each layer included in the light-emitting device can be formed by an evaporation method (including a vacuum evaporation method), a transfer method, a printing method, an inkjet method, a coating method, or the like.

For example, the EL layer 113a, the EL layer 113b, and the EL layer 113c may each include one or more of a hole-injection layer, a hole-transport layer, a hole-blocking layer, an electron-blocking layer, an electron-transport layer, and an electron-injection layer.

In the EL layer, one or more of a hole-injection layer, a hole-transport layer, a hole-blocking layer, an electron-blocking layer, an electron-transport layer, and an electron-injection layer can be formed as a layer common to the light-emitting devices of the respective colors. For example, a carrier-injection layer (a hole-injection layer or an electron-injection layer) may be formed as the common layer 114. Note that all the layers in the EL layer may be separately formed for the respective colors. That is, the EL layer does not necessarily include a layer common to the light-emitting devices of the respective colors.

The EL layer 113a, the EL layer 113b, and the EL layer 113c each preferably include a light-emitting layer and a carrier-transport layer over the light-emitting layer. Accordingly, the light-emitting layer is inhibited from being exposed on the outermost surface in the manufacturing process of the display apparatus 100, so that damage to the light-emitting layer can be reduced. Thus, the reliability of the light-emitting device can be increased.

The hole-injection layer is a layer injecting holes from an anode to the hole-transport layer, and a layer containing a material with a high hole-injection property. Examples of the material with a high hole-injection property include an aromatic amine compound and a composite material containing a hole-transport material and an acceptor material (electron-accepting material).

The hole-transport layer is a layer transporting holes, which are injected from the anode by the hole-injection layer, to the light-emitting layer. The hole-transport layer is a layer containing a hole-transport material. As the hole-transport material, a substance having a hole mobility greater than or equal to $1 \times 10^{-6}$ cm$^2$/Vs is preferable. Note that other substances can also be used as long as they have a property of transporting more holes than electrons. As the hole-transport material, a material with a high hole-transport property, such as a π-electron rich heteroaromatic compound (e.g., a carbazole derivative, a thiophene derivative, or a furan derivative) or an aromatic amine (a compound having an aromatic amine skeleton), is preferable.

The electron-transport layer is a layer transporting electrons, which are injected from a cathode by the electron-injection layer, to the light-emitting layer. The electron-transport layer is a layer containing an electron-transport material. As the electron-transport material, a material having an electron mobility greater than or equal to $1 \times 10^{-6}$ cm$^2$/Vs is preferable. Note that other substances can also be used as long as they have a property of transporting more electrons than holes. For the electron-transport material, it is possible to use a substance having a high electron-transport property, such as an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound such as a nitrogen-containing heteroaromatic compound, as well as a metal complex having a quinoline skeleton, a metal complex having a benzoquinoline skeleton, a metal complex having an oxazole skeleton, or a metal complex having a thiazole skeleton.

The electron-injection layer is a layer injecting electrons from the cathode to the electron-transport layer, and a layer containing a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

For the electron-injection layer, for example, an alkali metal, an alkaline earth metal, or a compound thereof, such as lithium, cesium, ytterbium, lithium fluoride (LiF), cesium fluoride (CsF), calcium fluoride (CaF$_x$, X is a given number), 8-(quinolinolato)lithium (abbreviation: Liq), 2-(2-pyridyl)phenolatolithium (abbreviation: LiPP), 2-(2-pyridyl)-3-pyridinolatolithium (abbreviation: LiPPy), 4-phenyl-2-(2-pyridyl)phenolatolithium (abbreviation: LiPPP), lithium oxide (LiO$_x$), or cesium carbonate can be used. The electron-injection layer may have a stacked-layer structure of two or more layers. The stacked-layer structure can be, for example, a structure where lithium fluoride is used for a first layer and ytterbium is provided for a second layer.

Alternatively, for the electron-injection layer, an electron-transport material may be used. For example, a compound having an unshared electron pair and an electron deficient heteroaromatic ring can be used as the electron-transport material. Specifically, a compound having at least one of a pyridine ring, a diazine ring (a pyrimidine ring, a pyrazine ring, and a pyridazine ring), and a triazine ring can be used.

Note that the lowest unoccupied molecular orbital (LUMO) level of the organic compound having an unshared electron pair is preferably greater than or equal to $-3.6$ eV and less than or equal to $-2.3$ eV. In general, the highest occupied molecular orbital (HOMO) level and the LUMO level of an organic compound can be estimated by CV (cyclic voltammetry), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino<2,3-a:2',3'-c>phenazine (abbreviation: HATNA), 2,4,6-tris<3'-(pyridin-3-yl)biphenyl-3-yl>-1,3,5-triazine (abbreviation: TmPPPyTz), or the like can be used as the organic compound having an unshared electron pair. Note that NBPhen has a higher glass transition temperature (Tg) than BPhen and thus has high heat resistance.

In the case of manufacturing a light-emitting device with a tandem structure, an intermediate layer is provided between two light-emitting units. The intermediate layer has a function of injecting electrons into one of the two light-emitting units and injecting holes to the other when a voltage is applied between the pair of electrodes.

For the intermediate layer, for example, a material that can be used for the electron-injection layer, such as lithium, can be suitably used. For the intermediate layer, for example, a material that can be used for the hole-injection layer can be suitably used. For the intermediate layer, a layer containing a hole-transport material and an acceptor material (electron-accepting material) can be used. For the intermediate layer, a layer containing an electron-transport material and a donor material can be used. Forming the intermediate layer including such a layer can suppress an increase in the driving voltage that would be caused by stacking light-emitting units.

The active layer includes a semiconductor. Examples of the semiconductor include an inorganic semiconductor such as silicon and an organic semiconductor including an organic compound. This embodiment shows an example where an organic semiconductor is used as the semiconductor contained in the active layer. The use of an organic semiconductor is preferable because the light-emitting layer and the active layer can be formed by the same method (e.g., a vacuum evaporation method) and thus a common manufacturing apparatus can be used.

Examples of an n-type semiconductor material contained in the active layer include electron-accepting organic semiconductor materials such as fullerene (e.g., $C_{60}$ and $C_{70}$) and fullerene derivatives. Fullerene has a soccer ball-like shape, which is energetically stable. Both the HOMO level and the LUMO level of fullerene are deep (low). Having a deep LUMO level, fullerene has an extremely high electron-accepting property (acceptor property). In general, when π-electron conjugation (resonance) spreads in a plane as in benzene, an electron-donating property (donor property) becomes high; however, since fullerene has a spherical shape, fullerene has a high electron-accepting property even when π-electron conjugation widely spreads. The high electron-accepting property efficiently causes rapid charge separation and thus is useful for a light-receiving device. Both $C_{60}$ and $C_{70}$ have a wide absorption band in the visible light region, and $C_{70}$ is especially preferable because of having a larger π-electron conjugation system and a wider absorption band in the long wavelength region than $C_{60}$. Other examples of the fullerene derivative include [6,6]-phenyl-C71-butyric acid methyl ester (abbreviation: PC70BM), [6,6]-phenyl-C61-butyric acid methyl ester (abbreviation: PC60BM), and 1',1'',4',4''-tetrahydro-di[1,4]methanonaphthaleno[1,2:2',3',56,60:2'',3'' ][5,6]fullerene-C60 (abbreviation: ICBA).

Another example of an n-type semiconductor material includes a perylenetetracarboxylic derivative such as N,N-dimethyl-3,4,9,10-perylenetetracarboxylic diimide (abbreviation: Me-PTCDI) and 2,2'-(5,5'-(thieno[3,2-b]thiophene-2,5-diyl)bis(thiophene-5,2-diyl))bis(methan-1-yl-1-ylidene) dimalononitrile (abbreviation: FT2TDMN).

Examples of an n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer include electron-donating organic semiconductor materials such as copper(II) phthalocyanine (CuPc), tetraphenyldibenzoperiflanthene (DBP), zinc phthalocyanine (ZnPc), tin phthalocyanine (SnPc), quinacridone, and rubrene.

Examples of a p-type semiconductor material include a carbazole derivative, a thiophene derivative, a furan derivative, and a compound having an aromatic amine skeleton. Other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can improve the carrier-transport property.

For example, the active layer is preferably formed by co-evaporation of an n-type semiconductor and a p-type semiconductor. Alternatively, the active layer may be formed by stacking an n-type semiconductor and a p-type semiconductor.

Either a low molecular compound or a high molecular compound can be used for the light-emitting device and the light-receiving device, and an inorganic compound may be contained. Each layer included in the light-emitting device and the light-receiving device can be formed by an evaporation method (including a vacuum evaporation method), a transfer method, a printing method, an inkjet method, a coating method, or the like.

As the hole-transport material, a high molecular compound such as poly(3,4-ethylenedioxythiophene)/poly(styrenesulfonic acid) (PEDOT/PSS), or an inorganic compound such as a molybdenum oxide or copper iodide (CuI) can be used, for example. As the electron-transport material, an inorganic compound such as zinc oxide (ZnO) can be used.

For the active layer, a high molecular compound such as poly[[4,8-bis[5-(2-ethylhexyl)-2-thienyl]benzo[1,2-b:4,5-b']dithiophene-2,6-diyl]-2,5-thiophenediyl[5,7-bis(2-ethylhexyl)-4,8-dioxo-4H,8H-benzo[1,2-c:4,5-c']dithiophene-1,3-diyl]] polymer (abbreviation: PBDB-T) or a PBDB-T derivative, which functions as a donor, can be used. For example, a method in which an acceptor material is dispersed to PBDB-T or a PBDB-T derivative can be used.

The active layer may contain a mixture of three or more kinds of materials. For example, a third material may be mixed with an n-type semiconductor material and a p-type semiconductor material in order to extend the wavelength range. In this case, the third material may be a low molecular compound or a high molecular compound.

The side surfaces of the pixel electrode 111a, the pixel electrode 111b, the pixel electrode 111c, the pixel electrode 111d, the EL layer 113a, the EL layer 113b, the EL layer 113c, and the light-receiving layer 113d are covered with the insulating layer 125 and the insulating layer 127. This can inhibit contact between the common layer 114 (or the common electrode 115) and the side surface of any of the pixel electrode 111a, the pixel electrode 111b, the pixel electrode 111c, the pixel electrode 111d, the EL layer 113a, the EL layer 113b, the EL layer 113c, and the light-receiving layer 113d, thereby inhibiting a short circuit of the light-emitting devices and the light-receiving device.

The insulating layer 125 preferably covers at least the side surfaces of the pixel electrode 111a, the pixel electrode 111b, the pixel electrode 111c, and the pixel electrode 111d. It is further preferable that the insulating layer 125 cover the side surfaces of the EL layer 113a, the EL layer 113b, the EL layer 113c, and the light-receiving layer 113d. The insulating layer 125 can be in contact with the side surfaces of the pixel electrode 111a, the pixel electrode 111b, the pixel electrode 111c, the pixel electrode 111d, the EL layer 113a, the EL layer 113b, the EL layer 113c, and the light-receiving layer 113d.

The insulating layer 127 is provided over the insulating layer 125 to fill a depressed portion formed by the insulating layer 125. The insulating layer 127 can overlap with the side surfaces of the pixel electrode 111a, the pixel electrode 111b, the pixel electrode 111c, the pixel electrode 111d, the EL layer 113a, the EL layer 113b, the EL layer 113c, and the light-receiving layer 113d with the insulating layer 125 therebetween.

Note that one of the insulating layer 125 and the insulating layer 127 is not necessarily provided. For example, in the case where the insulating layer 125 is not provided, the insulating layer 127 can be in contact with the side surfaces of the EL layer 113a, the EL layer 113b, the EL layer 113c, and the light-receiving layer 113d. The insulating layers 127 can be provided over the layer 101 so as to fill spaces between the EL layers included in the light-emitting devices and the light-receiving layer included in the light-receiving device.

The common layer 114 and the common electrode 115 are provided over the EL layer 113a, the EL layer 113b, the EL layer 113c, the light-receiving layer 113d, the insulating layer 125, and the insulating layer 127. Before the insulating layer 125 and the insulating layer 127 are provided, a level difference is generated between a region where the pixel electrode is provided and a region where the pixel electrode is not provided (a region between the light-emitting devices and the light-receiving device). In the display apparatus of one embodiment of the present invention, the level difference can be eliminated with use of the insulating layer 125 and the insulating layer 127, and the coverage with the common layer 114 and the common electrode 115 can be improved. Consequently, a connection defect due to disconnection of the common electrode 115 can be inhibited. Alternatively, an increase in electric resistance due to local thinning of the common electrode 115 by the level difference can be inhibited.

In order to improve the planarity of the formation surfaces of the common layer 114 and the common electrode 115, the levels of the top surface of the insulating layer 125 and the top surface of the insulating layer 127 are each preferably the same or substantially the same as the level of the top surface of at least one of the EL layer 113a, the EL layer 113b, the EL layer 113c, and the light-receiving layer 113d. The top surface of the insulating layer 127 preferably has a flat shape and may have a projected portion or a depressed portion.

The insulating layer 125 includes regions in contact with the side surfaces of the EL layer 113a, the EL layer 113b, the EL layer 113c, and the light-receiving layer 113d, and functions as a protective insulating layer for the EL layer 113a, the EL layer 113b, the EL layer 113c, and the light-receiving layer 113d. With the insulating layer 125, entry of impurities (e.g., oxygen or moisture) through the side surfaces of the EL layer 113a, the EL layer 113b, the EL layer 113c, and the light-receiving layer 113d into their insides can be inhibited, and thus a highly reliable display apparatus can be obtained.

When the width (thickness) of the insulating layer 125 in the regions in contact with the side surfaces of the EL layer 113a, the EL layer 113b, the EL layer 113c, and the light-receiving layer 113d is large in a cross-sectional view, spaces between the EL layer 113a, the EL layer 113b, the EL layer 113c, and the light-receiving layer 113d increase, which might result in a lower aperture ratio. In addition, when the width (thickness) of the insulating layer 125 is small, the effect of inhibiting entry of impurities through the side surfaces of the EL layer 113a, the EL layer 113b, the EL layer 113c, and the light-receiving layer 113d into their insides might be weakened.

The width (thickness) of the insulating layer 125 in the regions in contact with the side surfaces of the EL layer 113a, the EL layer 113b, the EL layer 113c, and the light-receiving layer 113d is preferably greater than or equal to 3 nm and less than or equal to 200 nm, further preferably greater than or equal to 3 nm and less than or equal to 150 nm, further preferably greater than or equal to 5 nm and less than or equal to 150 nm, still further preferably greater than or equal to 5 nm and less than or equal to 100 nm, still further preferably greater than or equal to 10 nm and less than or equal to 100 nm, yet further preferably greater than or equal to 10 nm and less than or equal to 50 nm. When the width (thickness) of the insulating layer 125 is within the above-described range, a highly reliable display apparatus with a high aperture ratio can be obtained.

The insulating layer 125 can contain an inorganic material. As the insulating layer 125, an inorganic insulating film such as an oxide insulating film, a nitride insulating film, an oxynitride insulating film, or a nitride oxide insulating film can be used, for example. The insulating layer 125 may have a single-layer structure or a stacked-layer structure.

The insulating layer 125 can be formed by a sputtering method, a chemical vapor deposition (CVD) method, a vacuum evaporation method, a pulsed laser deposition (PLD) method, an atomic layer deposition (ALD) method, or the like. The insulating layer 125 is preferably formed by an ALD method that can provide good coverage. An ALD method causes less deposition damage to a formation surface, and thus can be suitably used.

Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, aluminum oxide is preferable because it has high selectivity with respect to the EL layer in etching and has a function of protecting the EL layer in forming the insulating layer 127 which is to be described later. In particular, when an inorganic insulating film such as an aluminum oxide film, a hafnium oxide film, or a silicon oxide film formed by an ALD method is used as the insulating layer 125, the insulating layer 125 including few pinholes and having an excellent function of protecting the EL layer can be formed.

Note that in this specification and the like, oxynitride refers to a material that contains more oxygen than nitrogen in its composition, and nitride oxide refers to a material that contains more nitrogen than oxygen in its composition. For example, in the case where silicon oxynitride is described, it refers to a material that contains more oxygen than nitrogen in its composition. In the case where silicon nitride oxide is described, it refers to a material that contains more nitrogen than oxygen in its composition.

The insulating layer 127 provided over the insulating layer 125 has a planarization function for the depressed portion of the insulating layer 125, which is formed between adjacent light-emitting devices. In other words, the insulating layer 127 has an effect of improving the planarity of the formation surface of the common electrode 115. An insulating layer containing an organic material can be suitably used as the insulating layer 127. For the insulating layer 127, an acrylic resin, a polyimide resin, an epoxy resin, an imide resin, a polyamide resin, a polyimide-amide resin, a silicone resin, a siloxane resin, a benzocyclobutene-based resin, a phenol resin, a precursor of any of these resins, or the like can be used, for example. For the insulating layer 127, an organic material such as polyvinyl alcohol (PVA), polyvinylbutyral, polyvinylpyrrolidone, polyethylene glycol, polyglycerin, pullulan, water-soluble cellulose, or an alcohol-soluble polyamide resin may be used. Moreover, a photosensitive resin can be used for the insulating layer 127. A photoresist may be used for the photosensitive resin. As the photosensitive resin, a positive material or a negative material can be used.

A difference between the top surface level of the insulating layer 127 and the top surface level of any of the EL layer 113a, the EL layer 113b, the EL layer 113c, and the light-receiving layer 113d is preferably less than or equal to 0.5 times, further preferably less than or equal to 0.3 times the thickness of the insulating layer 127, for example. As another example, the insulating layer 127 may be provided such that the top surface level of any of the EL layer 113a, the EL layer 113b, the EL layer 113c, and the light-receiving layer 113d is higher than the top surface level of the insulating layer 127. As another example, the insulating layer 127 may be provided such that the top surface level of the insulating layer 127 is higher than the top surface levels of the light-emitting layers included in the EL layer 113a, the EL layer 113b, and the EL layer 113c, and higher than the top surface level of the active layer included in the light-receiving layer 113d.

The protective layer 131 and the protective layer 132 are preferably provided over the light-emitting device 130a, the light-emitting device 130b, the light-emitting device 130c, and the light-receiving device 130d. Providing the protective layer 131 and the protective layer 132 can improve the reliability of the light-emitting devices and the light-receiving device.

There is no limitation on the conductivity of the protective layer 131 and the protective layer 132. As the protective layer 131 and the protective layer 132, at least one kind of insulating films, semiconductor films, and conductive films can be used.

The protective layer 131 and the protective layer 132 each including an inorganic film can inhibit deterioration of the light-emitting devices and the light-receiving device by preventing oxidation of the common electrode 115 and inhibiting entry of impurities (e.g., moisture and oxygen) into the light-emitting device 130a, the light-emitting device 130b, the light-emitting device 130c, and the light-receiving device 130d, for example; thus, the reliability of the display apparatus can be improved.

For each of the protective layer 131 and the protective layer 132, an inorganic insulating film such as an oxide insulating film, a nitride insulating film, an oxynitride insulating film, or a nitride oxide insulating film can be used, for example. Examples of the oxide insulating film include a silicon oxide film, an aluminum oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film.

Each of the protective layers 131 and 132 preferably includes a nitride insulating film or a nitride oxide insulating film, and further preferably includes a nitride insulating film.

For each of the protective layer 131 and the protective layer 132, an inorganic film containing an In—Sn oxide (also referred to as ITO), an In—Zn oxide, a Ga—Zn oxide, an Al—Zn oxide, an indium gallium zinc oxide (In—Ga—Zn oxide, also referred to as IGZO), or the like can also be used. The inorganic film preferably has high resistance, specifically, higher resistance than the common electrode 115. The inorganic film may further contain nitrogen.

When extraction of light emitted from the light-emitting device and incidence of light on the light-receiving device are performed through the protective layer 131 and the protective layer 132, the protective layer 131 and the protective layer 132 each preferably have a high transmitting property with respect to visible light. For example, ITO, IGZO, and aluminum oxide are preferable because they are each an inorganic material having a high property of transmitting visible light.

The protective layer 131 and the protective layer 132 can each have, for example, a stacked-layer structure of an aluminum oxide film and a silicon nitride film over the aluminum oxide film, or a stacked-layer structure of an aluminum oxide film and an IGZO film over the aluminum oxide film. Such a stacked-layer structure can inhibit entry of impurities (e.g., water and oxygen) into the EL layer.

Furthermore, the protective layer 131 and the protective layer 132 may each include an organic film. For example, the protective layer 132 may include both an organic film and an inorganic film.

The protective layer 131 and the protective layer 132 may be formed by different deposition methods. Specifically, the protective layer 131 may be formed by an ALD method, and the protective layer 132 may be formed by a sputtering method.

The end portions of the top surfaces of the pixel electrode 111*a*, the pixel electrode 111*b*, the pixel electrode 111*c*, and the pixel electrode 111*d* are not covered with an insulating layer. This allows the distance between adjacent devices among the light-emitting devices and the light-emitting device to be extremely short. Accordingly, the display apparatus can have high definition or high resolution.

In this specification and the like, a device manufactured using a metal mask or an FMM (fine metal mask or a high-resolution mask) may be referred to as a device having an MM (metal mask) structure. In this specification and the like, a device manufactured without using a metal mask or an FMM may be referred to as a device having an MML (metal maskless) structure.

In this specification and the like, a structure where light-emitting layers in light-emitting devices of different colors (here, blue (B), green (G), and red (R)) are separately formed or separately patterned is sometimes referred to as an SBS (Side By Side) structure. The SBS structure can optimize materials and structures of light-emitting devices and thus can extend freedom of choice of materials and structures, whereby the luminance and the reliability can be easily improved.

In this specification and the like, a light-emitting device capable of emitting white light is sometimes referred to as a white-light-emitting device. Note that a combination of white-light-emitting devices with coloring layers (e.g., color filters) enables a full-color display apparatus.

Note that structures of light-emitting devices can be classified roughly into a single structure and a tandem structure. A device having a single structure includes one light-emitting unit between a pair of electrodes, and the light-emitting unit preferably includes one or more light-emitting layers. To obtain white light emission, two or more of light-emitting layers are selected such that their emission colors are complementary. For example, when an emission color of a first light-emitting layer and an emission color of a second light-emitting layer are complementary, the light-emitting device can be configured to emit white light as a whole. In the case of a light-emitting device including three or more light-emitting layers, white light emission can be obtained by mixing emission colors of the light-emitting layers.

A device having a tandem structure includes two or more light-emitting units between a pair of electrodes, and each light-emitting unit preferably includes one or more light-emitting layers. To obtain white light emission, the structure is made so that light from light-emitting layers of the plurality of light-emitting units can be combined to be white light. Note that the structure for obtaining white light emission is similar to that in the case of a single structure. In the device having a tandem structure, an intermediate layer such as a charge generation layer is suitably provided between the plurality of light-emitting units.

When the white-light-emitting device (having a single structure or a tandem structure) and a light-emitting device having an SBS structure are compared to each other, the light-emitting device having an SBS structure can have lower power consumption than the white-light-emitting device. To reduce power consumption, a light-emitting device having an SBS structure is suitably used. Meanwhile, the white-light-emitting device is preferable in terms of lower manufacturing cost or higher manufacturing yield because the manufacturing process of the white-light-emitting device is simpler than that of the light-emitting device having an SBS structure.

In the display apparatus of this embodiment, the distance between the light-emitting devices can be short. Specifically, the distance between the light-emitting devices, the distance between the EL layers, or the distance between the pixel electrodes can be less than 10 μm, less than or equal to 5 μm, less than or equal to 3 μm, less than or equal to 2 μm, less than or equal to 1 μm, less than or equal to 500 nm, less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the display apparatus includes a region where the distance between the side surface of the EL layer 113*a* and the side surface of the EL layer 113*b* or the distance between the side surface of the EL layer 113*b* and the side surface of the EL layer 113*c* is less than or equal to 1 μm, preferably less than or equal to 0.5 μm (500 nm), further preferably less than or equal to 100 nm.

Similarly, in the display apparatus of this embodiment, the distance between the light-receiving devices can be short. Specifically, the distance between the light-receiving devices, the distance between the light-receiving layers, or the distance between the pixel electrodes can be less than 10 μm, less than or equal to 5 μm, less than or equal to 3 μm, less than or equal to 2 μm, less than or equal to 1 μm, less than or equal to 500 nm, less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the display apparatus includes a region where a distance between a side surface of a light-receiving layer and a side surface of a light-receiving layer that are adjacent to each other is less than or equal to 1 μm, preferably less than or equal to 0.5 μm (500 nm), further preferably less than or equal to 100 nm.

In the display apparatus of this embodiment, the distance between the light-emitting device and the light-receiving device can be short. Specifically, the distance between the light-emitting device and the light-receiving device, the distance between the EL layer and the light-receiving layer, or the distance between the pixel electrodes can be less than 20 μm, less than or equal to 10 μm, less than or equal to 5 μm, less than or equal to 3 μm, less than or equal to 2 μm, less than or equal to 1 μm, less than or equal to 500 nm, less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the display apparatus includes a region where the distance between the side surface of the EL layer 113*a* and the side surface of the light-receiving layer 113*d*, the distance between the side surface of the EL layer 113*b* and the side surface of the light-receiving layer 113*d*, or the distance between the side surface of the EL layer 113*c* and the light-receiving layer 113*d* is less than or equal to 1 μm, preferably less than or equal to 0.5 μm (500 nm), further preferably less than or equal to 100 nm.

A light-blocking layer may be provided on the surface of the substrate 120 on the resin layer 122 side. A variety of optical members can be arranged on the outer surface of the substrate 120. Examples of the optical members include a polarizing plate, a retardation plate, a light diffusion layer (a diffusion film or the like), an anti-reflective layer, and a light-condensing film. Furthermore, an antistatic film to inhibit attachment of dust, a water repellent film to reduce attachment of stain, a hard coat film to inhibit generation of a scratch caused by the use, an impact-absorbing layer, or the like may be arranged on the outer side of the substrate 120.

For the substrate 120, glass, quartz, ceramics, sapphire, a resin, a metal, an alloy, a semiconductor, or the like can be used. The substrate on the side from which light from the light-emitting device is extracted is formed using a material that transmits the light. When the substrate 120 is formed using a flexible material, the flexibility of the display apparatus can be increased. Furthermore, a polarizing plate may be used as the substrate 120.

For the substrate 120, any of the following can be used: polyester resins such as polyethylene terephthalate (PET) and polyethylene naphthalate (PEN), a polyacrylonitrile resin, an acrylic resin, a polyimide resin, a polymethyl methacrylate resin, a polycarbonate (PC) resin, a polyether-sulfone (PES) resin, polyamide resins (e.g., nylon and aramid), a polysiloxane resin, a cycloolefin resin, a poly-styrene resin, a polyamide-imide resin, a polyurethane resin, a polyvinyl chloride resin, a polyvinylidene chloride resin, a polypropylene resin, a polytetrafluoroethylene (PTFE) resin, an ABS resin, and cellulose nanofiber. Glass that is thin enough to have flexibility may be used for the substrate 120.

In the case where a circularly polarizing plate overlaps with the display apparatus, a highly optically isotropic substrate is preferably used as the substrate included in the display apparatus. A highly optically isotropic substrate has a low birefringence (in other words, a small amount of birefringence).

The absolute value of a retardation (phase difference) of a highly optically isotropic substrate is preferably less than or equal to 30 nm, further preferably less than or equal to 20 nm, still further preferably less than or equal to 10 nm.

Examples of a highly optically isotropic film include a triacetyl cellulose (TAC, also referred to as cellulose triac-etate) film, a cycloolefin polymer (COP) film, a cycloolefin copolymer (COC) film, and an acrylic resin film.

When a film is used for the substrate and the film absorbs water, the shape of the display panel might be changed, e.g., creases are generated. Thus, for the substrate, a film with a low water absorption rate is preferably used. For example, the water absorption rate of the film to be used is preferably lower than or equal to 1%, further preferably lower than or equal to 0.1%, still further preferably lower than or equal to 0.01%.

For the resin layer 122, any of a variety of curable adhesives such as a reactive curable adhesive, a thermoset-ting curable adhesive, an anaerobic adhesive, and a photo-curable adhesive such as an ultraviolet curable adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferable. Alternatively, a two-component resin may be used. An adhesive sheet or the like may be used.

As materials that can be used for a gate, a source, and a drain of a transistor and conductive layers such as a variety of wirings and electrodes included in a display apparatus, metals such as aluminum, titanium, chromium, nickel, cop-per, yttrium, zirconium, molybdenum, silver, tantalum, or tungsten, an alloy containing any of these metals as its main component, and the like can be given. A single layer or a stacked-layer structure including a film containing any of these materials can be used.

As a light-transmitting conductive material, a conductive oxide such as indium oxide, indium tin oxide, indium zinc oxide, zinc oxide, or zinc oxide containing gallium, or graphene can be used. Alternatively, a metal material such as gold, silver, platinum, magnesium, nickel, tungsten, chro-mium, molybdenum, iron, cobalt, copper, palladium, or titanium, or an alloy material containing the metal material can be used. Further alternatively, a nitride of the metal material (e.g., titanium nitride) or the like may be used. Note that in the case of using the metal material or the alloy material (or the nitride thereof), it is preferably thinned so as to have a light-transmitting property. A stacked film of any of the above materials can be used as a conductive layer. For example, a stacked film of indium tin oxide and an alloy of silver and magnesium, or the like is preferably used to increase the conductivity. Such materials can also be used for conductive layers such as wirings and electrodes included in the display apparatus, and conductive layers (e.g., a conductive layer functioning as a pixel electrode or a common electrode) included in a light-emitting device.

As an insulating material that can be used for each insulating layer, for example, a resin such as an acrylic resin or an epoxy resin, and an inorganic insulating material such as silicon oxide, silicon oxynitride, silicon nitride oxide, silicon nitride, or aluminum oxide can be given.

Note that the display apparatus of one embodiment of the present invention can have a structure including the OS transistor and the light-emitting device having a metal maskless (MML) structure. With this structure, the leakage current that might flow through the transistor and the leak-age current that might flow between adjacent light-emitting devices (also referred to as a lateral leakage current, a side leakage current, or the like) can become extremely low. With the structure, a viewer can notice any one or more of the image crispness, the image sharpness, and a high contrast ratio in an image displayed on the display apparatus. Note that when the leakage current that might flow through the transistor and the lateral leakage current between the light-emitting devices are extremely low, light leakage or the like that might occur in black display can be reduced as much as possible (such display is also referred to as completely black display).

<Pixel Layout>

Pixel layouts will be described below. There is no par-ticular limitation on the arrangement of subpixels, and a variety of methods can be employed. Examples of the arrangement of subpixels include stripe arrangement, S stripe arrangement, matrix arrangement, delta arrangement, Bayer arrangement, and PenTile arrangement.

Examples of a top surface shape of the subpixel include polygons such as a triangle, a quadrangle (including a rectangle and a square), and a pentagon; polygons with rounded corners; an ellipse; and a circle. Here, the top surface shape of the subpixel corresponds to the top surface shape of a light-emitting region of a light-emitting device or a light-receiving region of a light-receiving device.

Figures 21A, 21B, 21C, 21D, 21E, 21F, 21G, 21H, 21I:
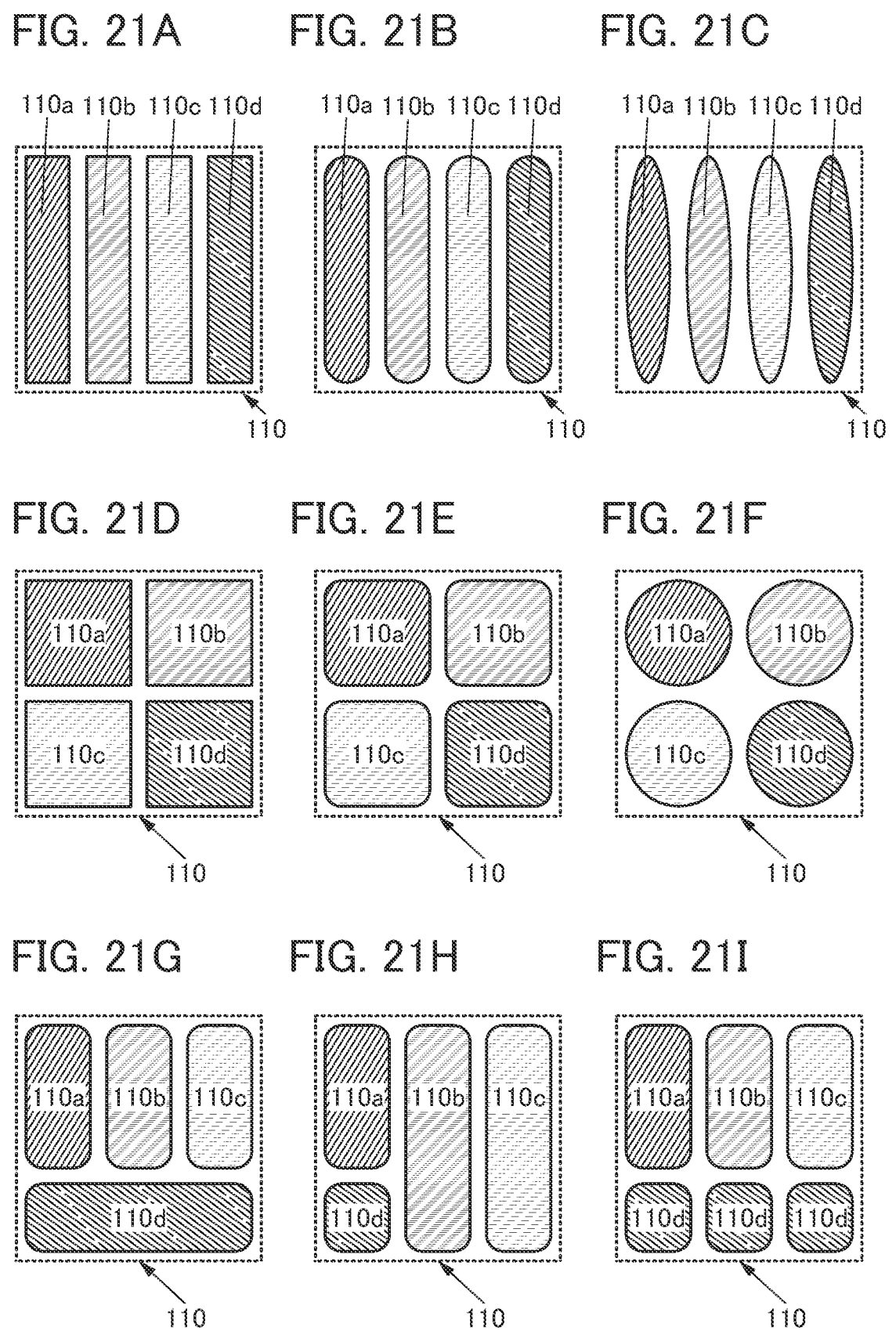

The pixels 110 illustrated in FIG. 21A to FIG. 21C employ stripe arrangement.

The display portion of the display apparatus of one embodiment of the present invention includes a plurality of pixels, and the pixels are arranged in the row direction and the column direction in a matrix. A display portion employ-ing the pixel layout illustrated in FIG. 21A to FIG. 21C includes a first arrangement where the subpixels 110a, the subpixels 110*b*, the subpixel 110*c*, and the subpixels 110*d* are repeatedly arranged in this order in the row direction. Furthermore, the first arrangement is repeated in the column direction.

The display portion includes a second arrangement where the subpixels 110*a* are repeatedly arranged in the column direction, a third arrangement where the subpixels 110*b* are repeatedly arranged in the column direction, a fourth arrangement where the subpixels 110*c* are repeatedly arranged in the column direction, and a fifth arrangement where the subpixels 110*d* are repeatedly arranged in the column direction. Furthermore, the second arrangement, the third arrangement, the fourth arrangement, and the fifth arrangement are repeated in this order in the row direction.

In this embodiment and the like, for clear explanation of the pixel layout, the horizontal direction is the row direction and the vertical direction is the column direction in the drawing; however, one embodiment of the present invention is not limited thereto and the row direction and the column direction can be interchangeable with each other. Thus, in this specification and the like, one of the row direction and the column direction is referred to as a first direction and the other of the row direction and the column direction is referred to as a second direction in some cases. The second direction is orthogonal to the first direction. Note that in the case where the top surface shape of the display portion is a rectangular shape, each of the first direction and the second direction is not necessarily parallel to a straight line portion of the outline of the display portion. The top surface shape is not limited to a rectangular shape, and may be a polygonal shape or a shape with curve (e.g., circle or ellipse). The first direction and the second direction may be a given direction with respect to the display portion.

In this specification and the like, for clear explanation of pixel layout, the subpixels are illustrated in the order from the left of a diagram; however, without limitation thereto, the order can be changed into the order from the right. Similarly, the subpixels are illustrated in the order from the top of a diagram; however, without limitation thereto, the order can be changed into the order from the bottom.

In this specification and the like, "repeatedly arranged" means that a minimum unit of ordered subpixels is arranged twice or more.

FIG. 21A illustrates an example where each subpixel has a rectangular top surface shape, FIG. 21B illustrates an example where each subpixel has a top surface shape formed by combining two half circles and a rectangle, and FIG. 21C illustrates an example where each subpixel has an elliptical top surface shape.

In a photolithography method, as a pattern to be processed becomes finer, the influence of light diffraction becomes more difficult to ignore; thus, the fidelity in transferring a photomask pattern by light exposure is degraded, and it becomes difficult to process a resist mask into a desired shape. Thus, a pattern with rounded corners is likely to be formed even with use of a rectangular photomask pattern. Consequently, the top surface shape of a subpixel becomes a polygon with rounded corners, an ellipse, a circle, or the like in some cases.

Furthermore, in the manufacturing method of the display apparatus of one embodiment of the present invention, the EL layer or the light-receiving layer is processed into an island-like shape with the use of a resist mask. A resist film formed over the EL layer or the light-receiving layer needs to be cured at a temperature lower than the upper temperature limit of the EL layer or the light-receiving layer. Thus, the resist film is insufficiently cured in some cases depending on the upper temperature limit of the material of the EL layer, the upper temperature limit of the material of the light-receiving layer, or the curing temperature of the resist material. An insufficiently cured resist film may have a shape different from a desired shape at the time of processing. As a result, the top surface shapes of the EL layer and the light-receiving layer each become a polygon with rounded corners, an ellipse, a circle, or the like in some cases. For example, when a resist mask with a square top surface shape is intended to be formed, a resist mask with a circular top surface shape may be formed, and the EL layer and the light-receiving layer each have a circular top surface shape in some cases.

To obtain a desired top surface shapes of the EL layer and the light-receiving layer, a technique of correcting a mask pattern in advance so that a transferred pattern agrees with a design pattern (an OPC (Optical Proximity Correction) technique) may be used. Specifically, with the OPC technique, a pattern for correction is added to a corner portion or the like of a figure on a mask pattern.

The pixels 110 illustrated in FIG. 21D to FIG. 21F employ matrix arrangement.

A display portion of a display apparatus employing the pixel layout illustrated in FIG. 21D to FIG. 21F includes a first arrangement where the subpixel 110*a* and the subpixel 110*b* are alternately arranged repeatedly in the row direction and a second arrangement where the subpixel 110*c* and the subpixel 110*d* are alternately arranged repeatedly in the row direction. Furthermore, the first arrangement and the second arrangement are repeated in this order in the column direction.

The display portion includes a third arrangement where the subpixel 110*a* and the subpixel 110*c* are alternately arranged repeatedly in the column direction and a fourth arrangement where the subpixel 110*b* and the subpixel 110*d* are alternately arranged repeatedly in the column direction. Furthermore, the third arrangement and the fourth arrangement are alternately repeated in the row direction.

FIG. 21D illustrates an example where each subpixel has a square top surface shape, FIG. 21E illustrates an example where each subpixel has a substantially square top surface shape with rounded corners, and FIG. 21F illustrates an example where each subpixel has a circular top surface shape.

FIG. 21G illustrates an example where one the pixel 110 is composed of two rows and three columns. The pixel 110 includes three subpixels (the subpixels 110*a*, 110*b*, and 110*c*) in the upper row (first row) and one subpixel (the subpixel 110*d*) in the lower row (second row). In other words, the pixel 110 includes the subpixel 110*a* in the left column (first column), the subpixel 110*b* in the center column (second column), the subpixel 110*c* in the right column (third column), and the subpixel 110*d* across these three columns.

As illustrated in FIG. 21G, the subpixels may have different sizes. FIG. 21G illustrates a structure where the subpixel 110*d* is larger than the subpixel 110*a* to the subpixel 110*c*. FIG. 21H illustrates a structure where the subpixel 110*b* and the subpixel 110*c* are larger than the subpixel 110*a*, and the subpixel 110*a* is larger than the subpixel 110*d*. The pixel 110 illustrated in FIG. 21H includes two subpixels (the subpixels 110*a* and 110*d*) in the left column (first column), the subpixel 110*b* in the center column (second column), and the subpixel 110*c* in the right column (third column).

A display portion of a display apparatus employing the pixel layout illustrated in FIG. 21G includes a first arrangement where the subpixels 110*a*, the subpixels 110*b*, and the subpixels 110*c* are repeatedly arranged in this order in the row direction and a second arrangement where the subpixels 110*d* are repeatedly arranged in the row direction. Furthermore, the first arrangement and the second arrangement are alternately repeated in the column direction.

The display portion includes a third arrangement where the subpixels 110*a* and the subpixels 110*d* are alternately arranged repeatedly in the column direction, a fourth arrangement where the subpixels 110*b* and the subpixels 110*d* are alternately arranged repeatedly in the column direction, and a fifth arrangement where the subpixels 110*c* and the subpixels 110*d* are alternately arranged repeatedly in the column direction. Furthermore, the third arrangement, the fourth arrangement, and the fifth arrangement are repeated in this order in the row direction.

A display portion of a display apparatus employing the pixel layout illustrated in FIG. 21H includes a first arrangement where the subpixels 110*a*, the subpixels 110*b*, and the subpixels 110*c* are repeatedly arranged in this order in the row direction and a second arrangement where the subpixels 110*d*, the subpixels 110*b*, and the subpixels 110*c* are repeatedly arranged in this order in the row direction. Furthermore, the first arrangement and the second arrangement are alternately repeated in the column direction.

The display portion includes a third arrangement where the subpixels 110*a* and the subpixels 110*d* are alternately arranged repeatedly in the column direction, a fourth arrangement where the subpixels 110*b* are repeatedly arranged in the column direction, and a fifth arrangement where the subpixels 110*c* are repeatedly arranged in the column direction. Furthermore, the third arrangement, the fourth arrangement, and the fifth arrangement are repeated in this order in the row direction.

FIG. 21I illustrates an example where one pixel 110 is composed of two rows and three columns. The pixel 110 includes the subpixel 110*a*, the subpixel 110*b*, the subpixel 110*c*, and three subpixels 110*d*. The pixel 110 includes three subpixels (the subpixels 110*a*, 110*b*, and 110*c*) in the upper row (first row) and three subpixels (the three subpixels 110*d*) in the lower row (second row). In other words, the pixel 110 includes two subpixels (the subpixels 110*a* and 110*d*) in the left column (first column), two subpixels (the subpixels 110*b* and 110*d*) in the center column (second column), and two subpixels (the subpixels 110*c* and 110*d*) in the right column (third column).

A display portion of a display apparatus employing the pixel layout illustrated in FIG. 21I includes a first arrangement where the subpixels 110*a*, the subpixels 110*b*, and the subpixels 110*c* are repeatedly arranged in this order in the row direction and a second arrangement where the subpixels 110*d* are repeatedly arranged in the row direction. Furthermore, the first arrangement and the second arrangement are alternately repeated in the column direction.

The display portion includes a third arrangement where the subpixels 110*a* and the subpixels 110*d* are alternately arranged repeatedly in the column direction, a fourth arrangement where the subpixels 110*b* and the subpixels 110*d* are alternately arranged repeatedly in the column direction, and a fifth arrangement where the subpixels 110*c* and the subpixels 110*d* are alternately arranged repeatedly in the column direction. Furthermore, the third arrangement, the fourth arrangement, and the fifth arrangement are repeated in this order in the row direction.

The pixels 110 illustrated in FIG. 21A to FIG. 21I are each composed of four subpixels: the subpixel 110*a*, the subpixel 110*b*, the subpixel 110*c*, and the subpixel 110*d*. The subpixels 110*a*, 110*b*, 110*c*, and 110*d* each include a light-emitting device emitting light in a different wavelength range or a light-receiving device. For example, as illustrated in FIG. 22A to FIG. 22E, the subpixel 110*a* can be a subpixel (R) having a function of emitting red light, the subpixel 110*b* can be a subpixel (G) having a function of emitting green light, the subpixel 110*c* can be a subpixel (B) having a function of emitting blue light, and the subpixel 110*d* can be a subpixel (PS) having a light-receiving function.

Figures 22A, 22B, 22C, 22D, 22E:
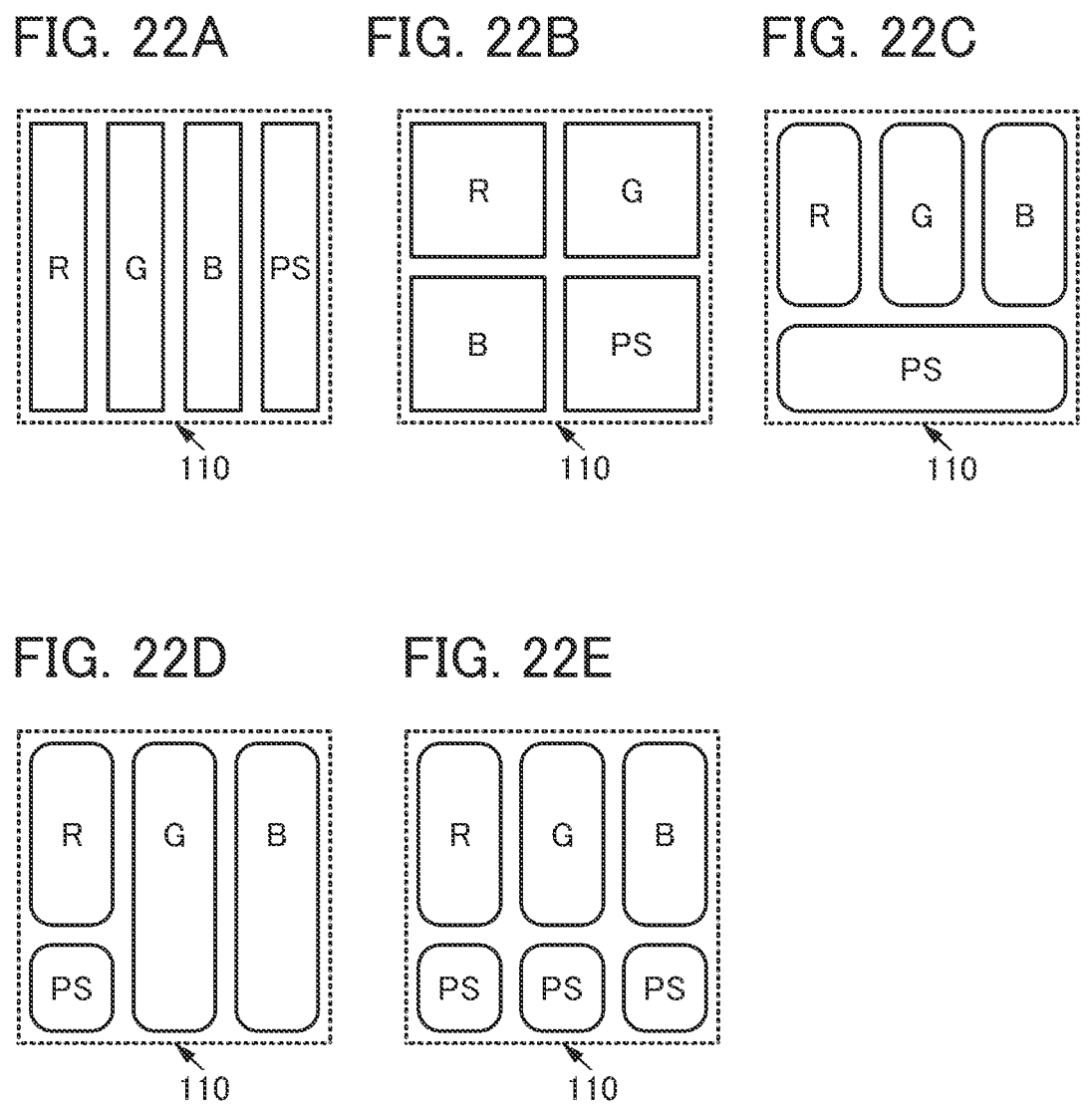

A pixel portion employing the pixel layout illustrated in FIG. 22A includes a first arrangement where the subpixel (R), the subpixel (G), the subpixel (B), and the subpixel (PS) are repeatedly arranged in this order in the row direction. Furthermore, the first arrangement is repeated in the column direction.

The display portion includes a second arrangement where the subpixels (R) are repeatedly arranged in the column direction, a third arrangement where the subpixels (G) are repeatedly arranged in the column direction, a fourth arrangement where the subpixels (B) are repeatedly arranged in the column direction, and a fifth arrangement where the subpixels (PS) are repeatedly arranged in the column direction. Furthermore, the second arrangement, the third arrangement, the fourth arrangement, and the fifth arrangement are repeated in this order in the row direction.

A display portion of a display apparatus employing the pixel layout illustrated in FIG. 22B includes a first arrangement where the subpixels (R) and the subpixels (G) are alternately arranged repeatedly in the row direction and a second arrangement where the subpixels (B) and the subpixels (PS) are alternately arranged repeatedly in the row direction. Furthermore, the first arrangement and the second arrangement are repeated in this order in the column direction.

The display portion includes a third arrangement where the subpixels (R) and the subpixels (B) are alternately arranged repeatedly in the column direction and a fourth arrangement where the subpixels (G) and the subpixels (PS) are alternately arranged repeatedly in the column direction. Furthermore, the third arrangement and the fourth arrangement are alternately repeated in the row direction.

A display portion of a display apparatus employing the pixel layout illustrated in FIG. 22C includes a first arrangement where the subpixels (R), the subpixels (G), and the subpixels (B) are repeatedly arranged in this order in the row direction and a second arrangement where the subpixels (PS) are repeatedly arranged in the row direction. Furthermore, the first arrangement and the second arrangement are alternately repeated in the column direction.

The display portion includes a third arrangement where the subpixels (R) and the subpixels (PS) are alternately arranged repeatedly in the column direction, a fourth arrangement where the subpixels (G) and the subpixels (PS) are alternately arranged repeatedly in the column direction, and a fifth arrangement where the subpixels (B) and the subpixels (PS) are alternately arranged repeatedly in the column direction. Furthermore, the third arrangement, the fourth arrangement, and the fifth arrangement are repeated in this order in the row direction.

A display portion of a display apparatus employing the pixel layout illustrated in FIG. 22D includes a first arrangement where the subpixels (R), the subpixels (G), and the subpixels (B) are repeatedly arranged in this order in the row direction, and a second arrangement where the subpixels (PS), the subpixels (G), and the subpixels (B) are repeatedly arranged in this order in the row direction. Furthermore, the first arrangement and the second arrangement are alternately repeated in the column direction.

The display portion includes a third arrangement where the subpixels (R) and the subpixels (PS) are alternately arranged repeatedly in the column direction, a fourth arrangement where the subpixels (G) are repeatedly arranged in the column direction, and a fifth arrangement where the subpixels (B) are repeatedly arranged in the column direction. Furthermore, the third arrangement, the fourth arrangement, and the fifth arrangement are repeated in this order in the row direction.

A display portion of a display apparatus employing the pixel layout illustrated in FIG. 22E includes a first arrangement where the subpixels (R), the subpixels (G), and the subpixels (B) are repeatedly arranged in this order in the row direction, and a second arrangement where the subpixels (PS) are repeatedly arranged in the row direction. Furthermore, the first arrangement and the second arrangement are alternately repeated in the column direction.

The display portion includes a third arrangement where the subpixels (R) and the subpixels (PS) are alternately arranged repeatedly in the column direction, a fourth arrangement where the subpixels (G) and the subpixels (PS) are alternately arranged repeatedly in the column direction, and a fifth arrangement where the subpixels (B) and the subpixels (PS) are alternately arranged repeatedly in the column direction. Furthermore, the third arrangement, the fourth arrangement, and the fifth arrangement are repeated in this order in the row direction.

The light-emitting areas of the subpixel (R), the subpixel (G), and the subpixel (B) including the light-emitting devices may be the same or different from each other. For example, the light-emitting area of the subpixel including the light-emitting device can be determined depending on the lifetime of the light-emitting device. The light-emitting area of a subpixel including the light-emitting device with a short lifetime is preferably made larger than the light-emitting areas of the other subpixels.

FIG. 22D illustrates an example where the light-emitting areas of the subpixel (G) and the subpixel (B) are larger than the light-emitting area of the subpixel (R). This structure can be suitably used in the case where the lifetimes of the light-emitting device emitting green light and the light-emitting device emitting blue light are shorter than the lifetime of the light-emitting device emitting red light. In the subpixel (G) and the subpixel (B) each having a large light-emitting area, the current densities of the light-emitting device emitting green light and the light-emitting device emitting blue light included in the subpixels are low, enabling longer lifetimes of the light-emitting devices. That is, the display apparatus can have high reliability.

Figure 23A:
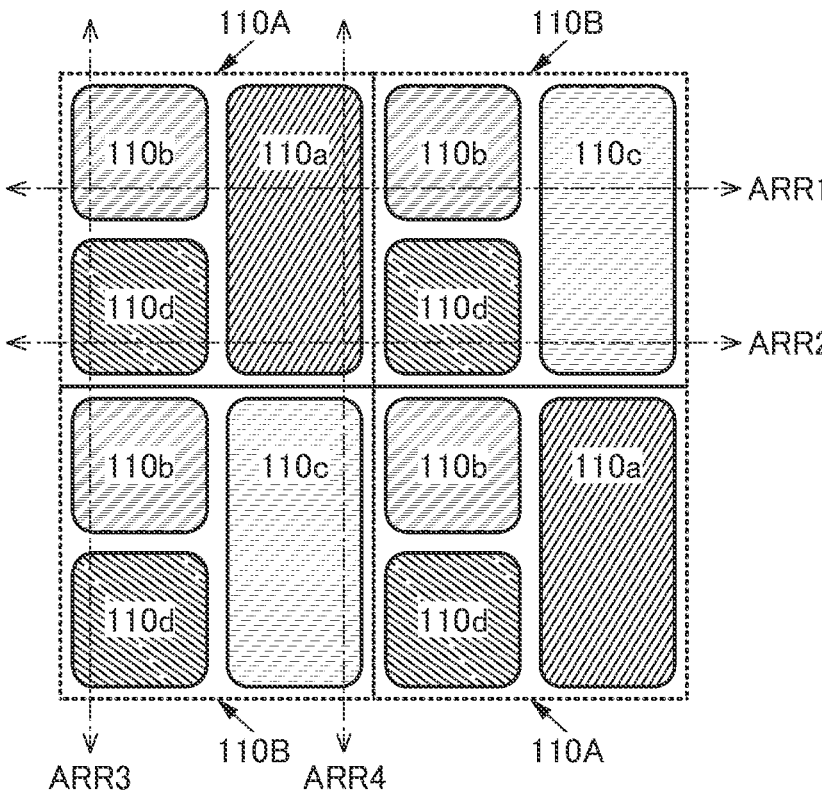
FIG. 23A and FIG. 23B are top views illustrating examples of pixels.
Figure 23B:
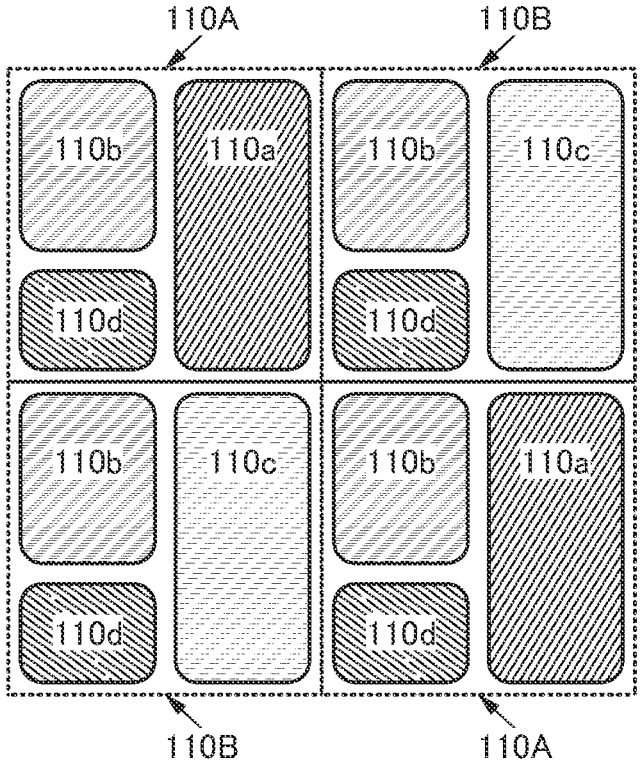

FIG. 23A and FIG. 23B illustrate pixel layout examples different from those in FIG. 21A to FIG. 21I and FIG. 22A to FIG. 22E.

FIG. 23A illustrates four pixels; in the illustrated structure, two adjacent pixels, a pixel 110A and a pixel 110B, include different subpixels. The pixel 110A includes three subpixels of the subpixel 110a, the subpixel 110b, and the subpixel 110d, and the pixel 110B adjacent to the pixel 110A includes the subpixel 110b, the subpixel 110c, and the subpixel 110d. That is, the pixels 110A including the subpixel 110a and the pixel 110B not including the subpixels 110a are alternately arranged repeatedly in the column direction and the row direction. Similarly, the pixels 110A not including the subpixel 110c and the pixels 110B including the subpixel 110c are alternately arranged repeatedly in the column direction and the row direction.

The pixel 110A is composed of two rows and two columns, and includes two subpixels (the subpixels 110b and 110d) in the left column (first column) and one subpixel (the subpixel 110a) in the right column (second column). In other words, the pixel 110A includes two subpixels (the subpixels 110a and 110b) in the upper row (first row), two subpixels (the subpixels 110a and 110d) in the lower row (second row), and the subpixel 110a across these two rows.

The pixel 110B is composed of two rows and two columns, and includes two subpixels (the subpixels 110b and 110d) in the left column (first column) and one subpixel (the subpixel 110c) in the right column (second column). In other words, the pixel 110A includes two subpixels (the subpixels 110b and 110c) in the upper row (first row), two subpixels (the subpixels 110c and 110d) in the lower row (second row), and the subpixel 110c across these two rows.

The pixels illustrated in FIG. 23A have a structure where two pixels of the pixel 110A and the pixel 110B include four kinds of subpixels of the subpixel 110a, the subpixel 110b, the subpixel 110c, and the subpixel 110d. The two pixels of the pixel 110A and the pixel 110B include one subpixel 110a, two subpixels 110b, one subpixel 110c, and two subpixels 110d. Such a structure can increase the areas of the subpixels while maintaining a pseudo-high definition, thereby lowering the required processing accuracy. That is, when comparison is made with the same processing accuracy, a display apparatus having a higher definition can be manufactured. In addition, the number of transistors per area can be reduced, whereby the productivity can be increased. Accordingly, a display apparatus having a pseudo-high definition can be manufactured with high productivity.

A display portion of a display apparatus employing the pixel layout illustrated in FIG. 23A includes a first arrangement ARR1 where the subpixels 110b, the subpixels 110a, the subpixels 110b, and the subpixels 110c are repeatedly arranged in this order in the row direction, and a second arrangement ARR2 where the subpixels 110d, the subpixels 110a, the subpixels 110d, and the subpixels 110c are repeatedly arranged in this order in the row direction. Furthermore, the first arrangement ARR1 and the second arrangement ARR2 are alternately repeated in the column direction.

The display portion includes a third arrangement ARR3 where the subpixels 110b and the subpixels 110d are alternately arranged repeatedly in the column direction, and a fourth arrangement ARR4 where the subpixels 110a and the subpixels 110c are alternately arranged repeatedly in the column direction. Furthermore, the third arrangement ARR3 and the fourth arrangement ARR4 are alternately repeated in the row direction.

It is preferable that the subpixel 110a have a larger area than both the subpixel 110b and the subpixel 110d in the pixel 110A, and the subpixel 110c have a larger area than both the subpixel 110b and the subpixel 110d in the pixel 110B. Furthermore, the subpixel having the largest area in the pixel 110A (here, the subpixel 110a) is preferably different from the subpixel having the largest area in the pixel 110B (here, the subpixel 110c).

Note that in this specification and the like, the light-emitting area in a subpixel including a light-emitting device is sometimes referred to as an area of the subpixel. Similarly, the light-receiving area in a subpixel including a light-receiving device is sometimes referred to as an area of the subpixel.

Although FIG. 23A illustrates the subpixel 110a and the subpixel 110c having the same area and the subpixel 110b and the subpixel 110d having the same area, one embodiment of the present invention is not limited thereto. The subpixel 110a and the subpixel 110c may have different areas. The subpixel 110b and the subpixel 110d may have different areas. FIG. 23B illustrates an example where the area of the subpixel 110*b* is larger than the area of the subpixel 110*d*. Note that between the pixel 110A and the pixel 110B, the area of the subpixel 110*b* may be different or the area of the subpixel 110*d* may be different.

It is preferable that the subpixel 110*a*, the subpixel 110*b*, and the subpixel 110*c* include light-emitting devices emitting light in different wavelength ranges, and the subpixel 110*d* include alight-receiving device. For example, as illustrated in FIG. 24A and FIG. 24B, the subpixel 110*a* can be the subpixel (R) having a function of emitting red light, the subpixel 110*b* can be the subpixel (G) having a function of emitting green light, the subpixel 110*c* can be the subpixel (B) having a function of emitting blue light, and the subpixel 110*d* can be the subpixel (PS) having a light-receiving function.

One pixel can include light-emitting devices of two colors among the light-emitting devices of three colors of red (R), green (G), and blue (B). The light-receiving device can be provided in any of the pixels. FIG. 24A and FIG. 24B each illustrate a structure where the pixel 110A includes the subpixel (R) having a function of emitting red light, the subpixel (G) having a function of emitting green light, and the subpixel (PS) having a light-receiving function, and the pixel 110B includes the subpixel (B) having a function of emitting blue light, the subpixel (G) having a function of emitting green light, and the subpixel (PS) having a light-receiving function.

Figure 24A:
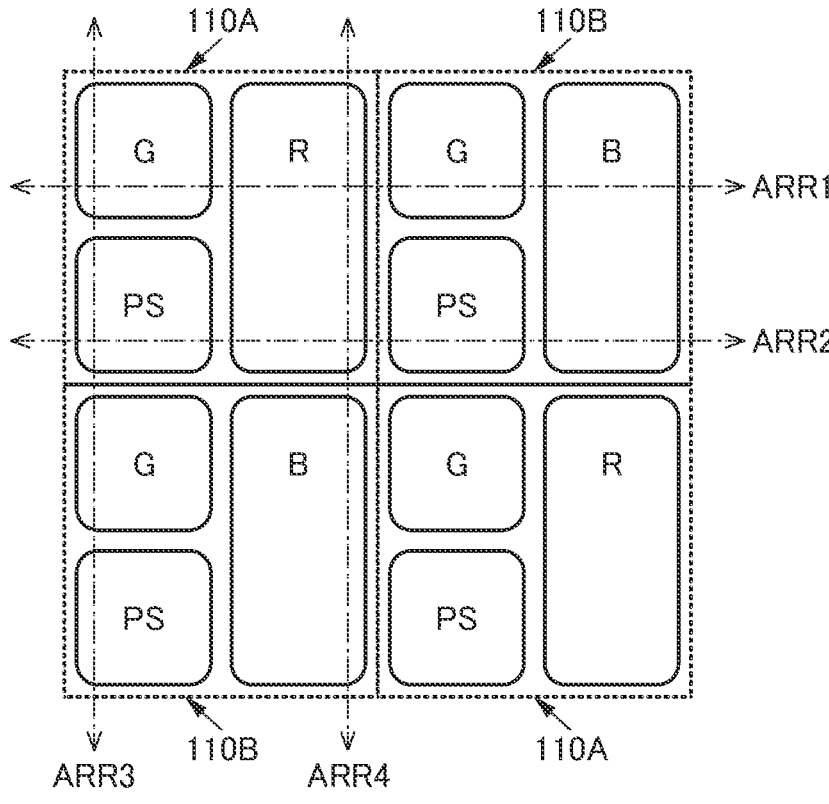
FIG. 24A and FIG. 24B are top views illustrating examples of pixels.
Figure 24B:
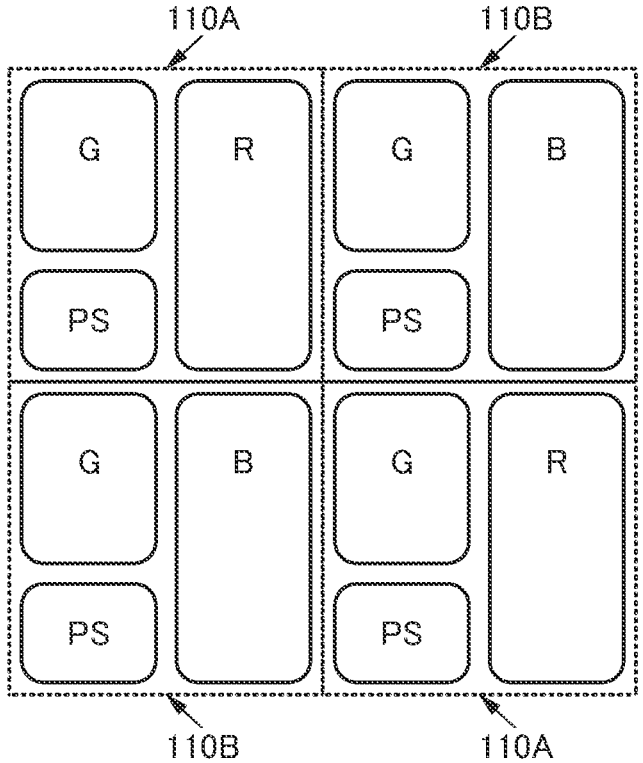

A display portion of a display apparatus employing the pixel layout illustrated in FIG. 24A and FIG. 24B includes the first arrangement ARR1 where the subpixels (G), the subpixels (R), the subpixels (G), and the subpixels (B) are repeatedly arranged in this order in the row direction, and the second arrangement ARR2 where the subpixel (PS), the subpixel (R), the subpixel (PS), and the subpixel (B) are repeatedly arranged in this order in the row direction. Furthermore, the first arrangement ARR1 and the second arrangement ARR2 are alternately repeated in the column direction.

The display portion includes the third arrangement ARR3 where the subpixels (G) and the subpixels (PS) are alternately arranged repeatedly in the column direction, and the fourth arrangement ARR4 where the subpixels (R) and the subpixels (B) are alternately arranged repeatedly in the column direction. Furthermore, the third arrangement ARR3 and the fourth arrangement ARR4 are alternately repeated in the row direction.

Although FIG. 24A and FIG. 24B each illustrate an example where the pixel 110A and the pixel 110B are each provided with the subpixel (PS) including the light-receiving device, one embodiment of the present invention is not limited thereto. In the case where the light-receiving function does not need high accuracy, a pixel not including the subpixel (PS) may be provided. That is, a structure may be employed where a pixel including the subpixel (PS) and a pixel not including the subpixel (PS) are provided.

As illustrated in FIG. 24A and FIG. 24B, the area of the subpixel (G) having a function of emitting green light is preferably smaller than the areas of both the subpixel (R) having a function of emitting red light and the subpixel (B) having a function of emitting blue light. The luminous efficiency function of human with respect to green is higher than that with respect to red and blue; thus, when the area of the subpixel (G) is smaller than the areas of the subpixel (R) and the subpixel (B), a display apparatus with high visibility and a good balance of red (R), green (G), and blue (B) can be obtained.

Although FIG. 24A and FIG. 24B each illustrate a structure where the area of the subpixel (G) is smaller than the areas of the subpixel (R) and the subpixel (B), one embodiment of the present invention is not limited thereto. For example, a structure may be employed where the area of the subpixel (R) is smaller than the areas of the subpixel (G) and the subpixel (B). Note that as described above, the areas of the subpixels including the light-emitting devices may be determined depending on the lifetimes of the light-emitting devices of different colors.

Figure 25A:
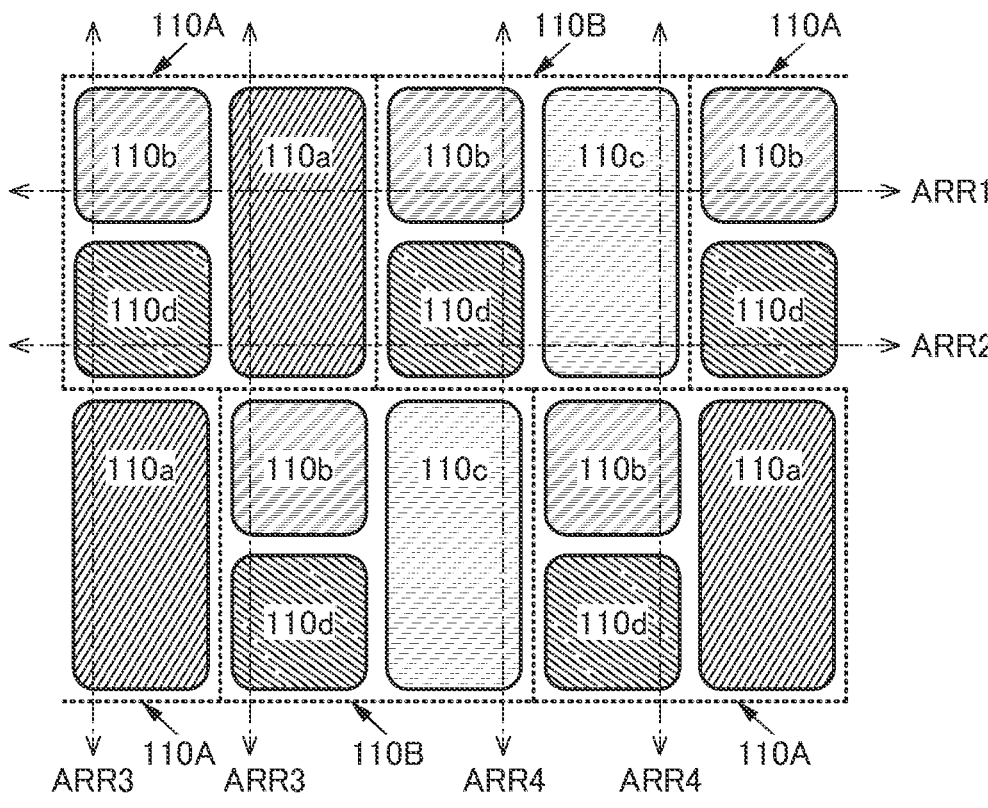
FIG. 25A and FIG. 25B are top views illustrating examples of pixels.
Figure 25B:
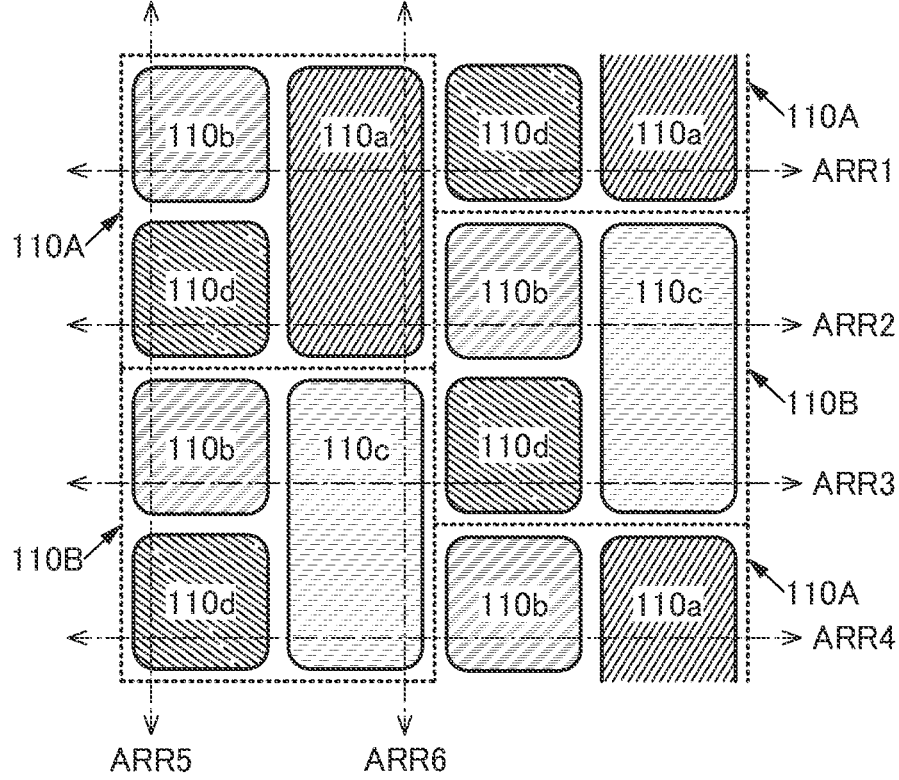

FIG. 25A and FIG. 25B illustrate modification examples of FIG. 23A.

A display portion of a display apparatus employing the pixel layout illustrated in FIG. 25A includes the first arrangement ARR1 where the subpixels 110*b*, the subpixels 110*a*, the subpixels 110*b*, and the subpixels 110*c* are repeatedly arranged in this order in the row direction, and the second arrangement ARR2 where the subpixels 110*d*, the subpixels 110*a*, the subpixels 110*d*, and the subpixels 110*c* are repeatedly arranged in this order in the row direction. Furthermore, the first arrangement ARR1 and the second arrangement ARR2 are alternately repeated in the column direction.

The display portion includes the third arrangement ARR3 where the subpixels 110*b*, the subpixels 110*d*, and the subpixels 110*a* are repeatedly arranged in this order in the column direction, and the fourth arrangement ARR4 where the subpixels 110*b*, the subpixels 110*d*, and the subpixels 110*c* are repeatedly arranged in this order in the column direction. Furthermore, the third arrangement ARR3, the third arrangement ARR3, the fourth arrangement ARR4, and the fourth arrangement ARR4 are repeated in this order in the row direction.

A display portion of a display apparatus employing the pixel layout illustrated in FIG. 25B includes the first arrangement ARR1 where the subpixels 110*b*, the subpixels 110*a*, the subpixels 110*d*, and the subpixels 110*a* are repeatedly arranged in this order in the row direction, the second arrangement ARR2 where the subpixels 110*d*, the subpixels 110*a*, the subpixels 110*b*, and the subpixels 110*c* are repeatedly arranged in this order in the row direction, the third arrangement ARR3 where the subpixels 110*b*, the subpixels 110*c*, the subpixels 110*d*, and the subpixels 110*c* are repeatedly arranged in this order in the row direction, and the fourth arrangement ARR4 where the subpixels 110*d*, the subpixels 110*c*, the subpixels 110*b*, and the subpixels 110*a* are repeatedly arranged in this order in the row direction. Furthermore, the first arrangement ARR1, the second arrangement ARR2, the third arrangement ARR3, and the fourth arrangement ARR4 are repeated in this order in the column direction.

The display portion includes a fifth arrangement ARR5 where the subpixels 110*b* and the subpixels 110*d* are alternately arranged repeatedly in the column direction, and a sixth arrangement ARR6 where the subpixels 110*a* and the subpixels 110*c* are alternately arranged repeatedly in the column direction. Furthermore, the fifth arrangement ARR5 and the sixth arrangement ARR6 are alternately repeated in the row direction.

Figure 26A:
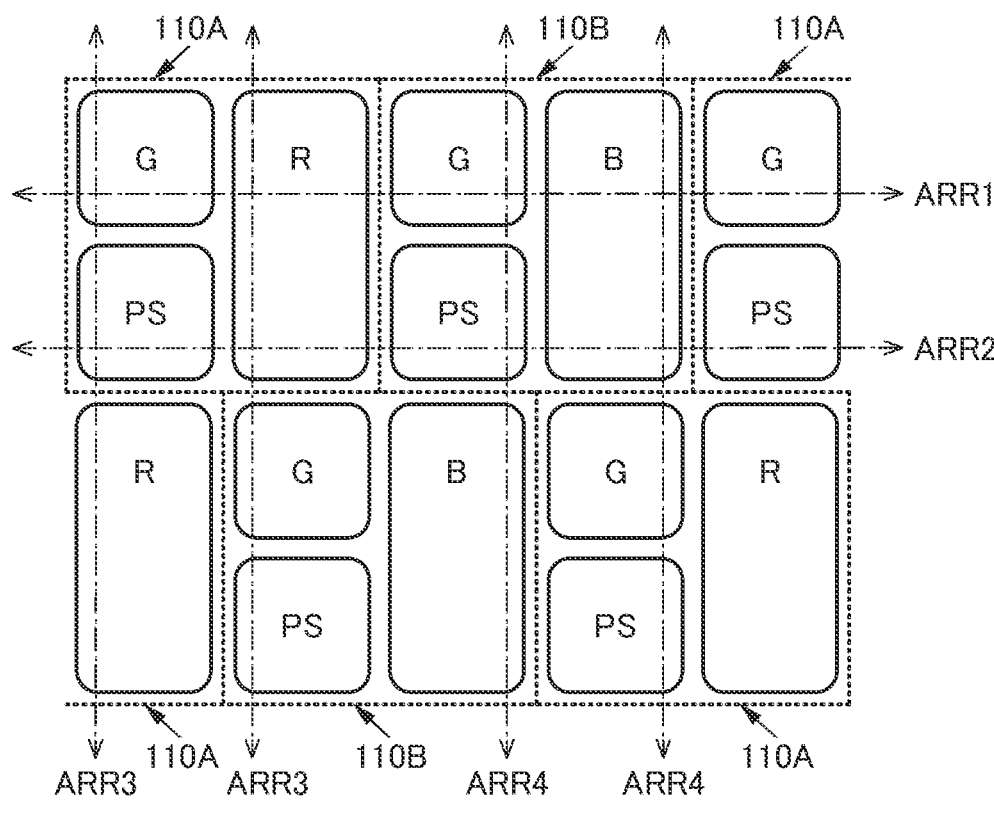
FIG. 26A and FIG. 26B are top views illustrating examples of pixels.
Figure 26B:
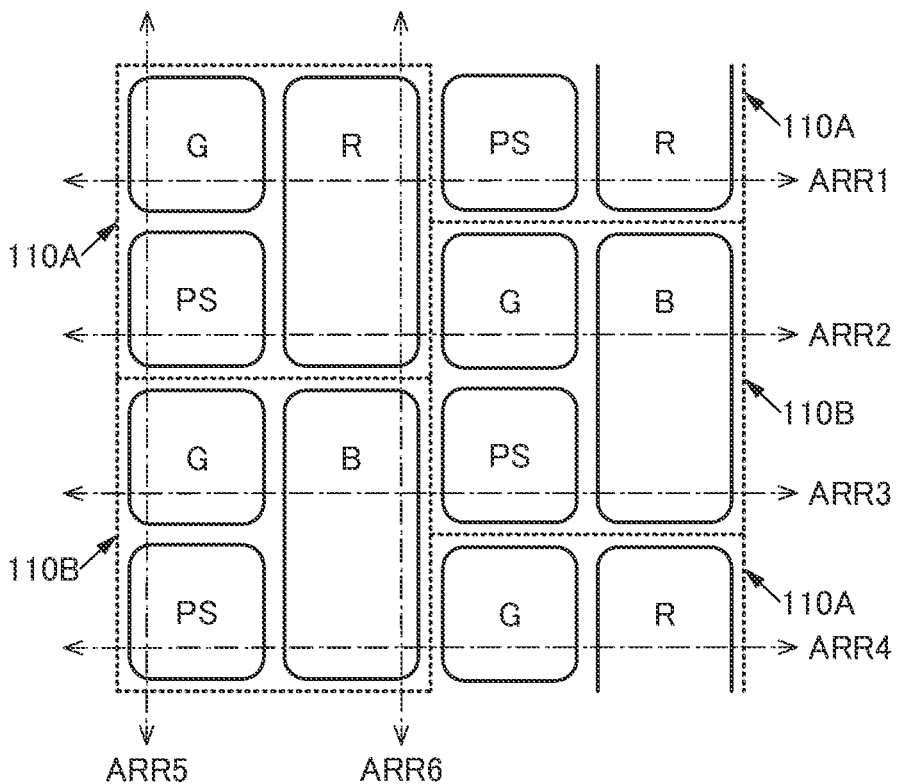

FIG. 26A and FIG. 26B illustrate structure examples where the subpixel (R) having a function of emitting red light is used as the subpixel 110*a*, the subpixel (G) having a function of emitting green light is used as the subpixel 110*b*, the subpixel (B) having a function of emitting blue light is used as the subpixel 110*c*, and the subpixel (PS) having a light-receiving function is used as the subpixel 110*d* in FIG. 25A and FIG. 25B.

A display portion of a display apparatus employing the pixel layout illustrated in FIG. 26A includes the first arrangement ARR1 where the subpixels (G), the subpixels (R), the subpixels (G), and the subpixels (B) are repeatedly arranged in this order in the row direction, and the second arrangement ARR2 where the subpixels (PS), the subpixels (R), the subpixels (PS), and the subpixels (B) are repeatedly arranged in this order in the row direction. Furthermore, the first arrangement ARR1 and the second arrangement ARR2 are alternately repeated in the column direction.

The display portion includes the third arrangement ARR3 where the subpixels (G), the subpixels (PS), and the subpixels (R) are repeatedly arranged in this order in the column direction, and the fourth arrangement ARR4 where the subpixels (G), the subpixels (PS), and the subpixels (B) are repeatedly arranged in this order in the column direction. Furthermore, the third arrangement ARR3, the third arrangement ARR3, the fourth arrangement ARR4, and the fourth arrangement ARR4 are repeated in this order in the row direction.

A display portion of a display apparatus employing the pixel layout illustrated in FIG. 26B includes the first arrangement ARR1 where the subpixels (G), the subpixels (R), the subpixels (PS), and the subpixels (R) are repeatedly arranged in this order in the row direction, the second arrangement ARR2 where the subpixels (PS), the subpixels (R), the subpixels (G), and the subpixels (B) are repeatedly arranged in this order in the row direction, the third arrangement ARR3 where the subpixels (G), the subpixels (B), the subpixels (PS), and the subpixels (B) are repeatedly arranged in this order in the row direction, and the fourth arrangement ARR4 where the subpixels (PS), the subpixels (B), the subpixels (G), and the subpixels (R) are repeatedly arranged in this order in the row direction. Furthermore, the first arrangement ARR1, the second arrangement ARR2, the third arrangement ARR3, and the fourth arrangement ARR4 are repeated in this order in the column direction.

The display portion includes the fifth arrangement ARR5 where the subpixels (G) and the subpixels (PS) are alternately arranged repeatedly in the column direction, and the sixth arrangement ARR6 where the subpixels (R) and the subpixels (B) are alternately arranged repeatedly in the column direction. Furthermore, the fifth arrangement ARR5 and the sixth arrangement ARR6 are alternately repeated in the row direction.

Figure 27A:
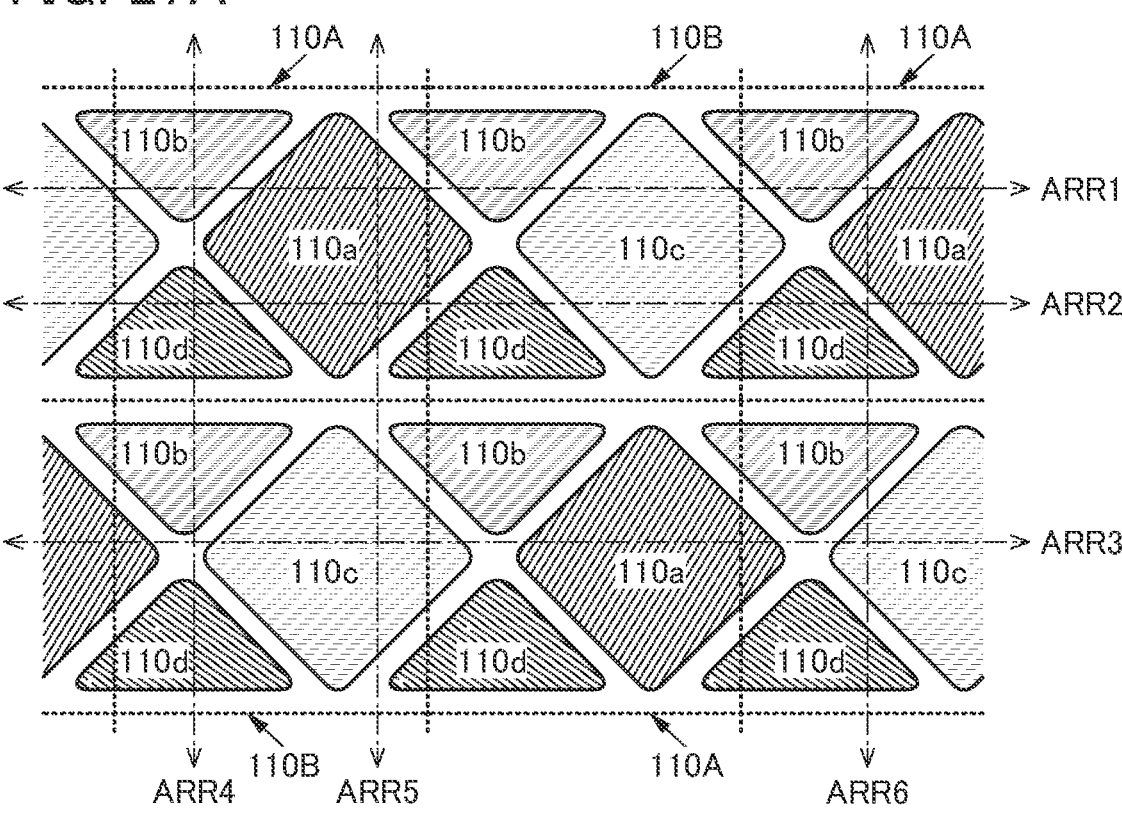
FIG. 27A and FIG. 27B are top views illustrating examples of pixels.

FIG. 27A illustrates a modification example of FIG. 26A.

A display portion of a display apparatus employing the pixel layout illustrated in FIG. 27A includes the first arrangement ARR1 where the subpixels 110*b*, the subpixels 110*a*, the subpixels 110*b*, and the subpixels 110*c* are repeatedly arranged in this order in the row direction and the second arrangement ARR2 where the subpixels 110*d*, the subpixels 110*a*, the subpixels 110*d*, and the subpixels 110*c* are repeatedly arranged in this order in the row direction. Furthermore, the first arrangement ARR1 and the second arrangement ARR2 are alternately repeated in the column direction. The display portion may further include the third arrangement ARR3 where the subpixels 110*a* and the subpixels 110*c* are alternately arranged repeatedly in the row direction. Note that the pixel layout illustrated in FIG. 27A may be referred to as a diamond layout.

The display portion includes the fourth arrangement ARR4 where the subpixels 110*b* and the subpixels 110*d* are alternately arranged repeatedly in the column direction, and the fifth arrangement ARR5 where the subpixels 110*a* and the subpixels 110*c* are alternately arranged repeatedly in the column direction. Furthermore, the fourth arrangement ARR4 and the fifth arrangement ARR5 are alternately repeated in the row direction. The display portion may further include the sixth arrangement ARR6 where the subpixels 110*b*, the subpixels 110*a*, the subpixels 110*d*, the subpixels 110*b*, the subpixels 110*c*, and the subpixels 110*d* are repeatedly arranged in this order in the column direction.

Although FIG. 27A illustrates a structure where the top surface shapes of the subpixel 110*a* and the subpixel 110*c* are quadrangles with rounded corners and the top surface shapes of the subpixel 110*b* and the subpixel 110*d* are triangles with rounded corners, there is no particular limitation on the top surface shapes of the subpixels. For example, the top surface shapes of the subpixel 110*b* and the subpixel 110*d* may be quadrangles with rounded corners or may be circles.

Figure 27B:
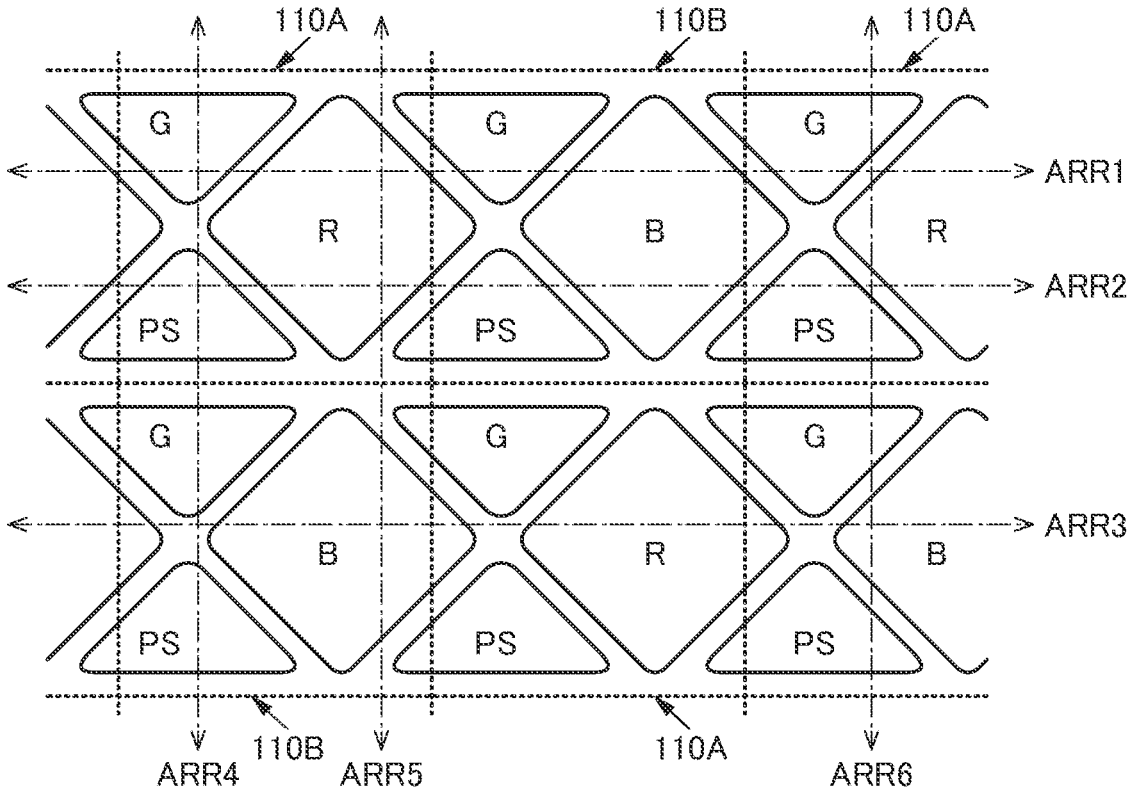

FIG. 27B illustrates a structure example where the subpixel (R) having a function of emitting red light is used as the subpixel 110*a*, the subpixel (G) having a function of emitting green light is used as the subpixel 110*b*, the subpixel (B) having a function of emitting blue light is used as the subpixel 110*c*, and the subpixel (PS) having a light-receiving function is used as the subpixel 110*d* in FIG. 27A.

A display portion of a display apparatus employing the pixel layout illustrated in FIG. 27B includes the first arrangement ARR1 where the subpixels (G), the subpixels (R), the subpixels (G), and the subpixels (B) are repeatedly arranged in this order in the row direction, and the second arrangement ARR2 where the subpixels (PS), the subpixels (R), the subpixels (PS), and the subpixels (B) are repeatedly arranged in this order in the row direction. The display portion may include the third arrangement ARR3 where the subpixels (R) and the subpixels (B) are alternately arranged repeatedly in the row direction.

The display portion includes the fourth arrangement ARR4 where the subpixels (G), the subpixels (R), the subpixels (PS), the subpixels (G), the subpixels (B), and the subpixels (PS) are repeatedly arranged in this order in the column direction. The display portion may include the fifth arrangement ARR5 where the subpixels (R) and the subpixels (B) are alternately arranged repeatedly in the column direction, and may include the sixth arrangement ARR6 where the subpixels (G) and the subpixels (PS) are alternately arranged repeatedly in the column direction.

This embodiment can be combined with any of the other embodiments as appropriate. In this specification, in the case where a plurality of structure examples are described in one embodiment, the structure examples can be combined as appropriate.

Embodiment 4

In this embodiment, a display apparatus of one embodiment of the present invention is described with reference to FIG. 28 to FIG. 30.

The display apparatus of this embodiment can be a high-resolution display apparatus or large-sized display apparatus. Accordingly, the display apparatus of this embodiment can be used for display portions of electronic devices such as a digital camera, a digital video camera, a digital photo frame, a mobile phone, a portable game console, a portable information terminal, and an audio reproducing device, in addition to display portions of electronic devices with a relatively large screen, such as a television device, a desktop or notebook personal computer, a monitor of a computer or the like, digital signage, and a large game machine such as a pachinko machine.

In this specification and the like, a display panel that is one embodiment of a display apparatus has a function of displaying (outputting) an image or the like on (to) a display surface. Therefore, the display panel is one mode of an output device.

In this specification and the like, a display apparatus to which a connector such as a flexible printed circuit (FPC) or a TCP (Tape Carrier Package) is attached, or a display apparatus on which an integrated circuit (IC) is mounted by a COG (Chip On Glass) method, a COF (Chip On Film) method, or the like is referred to as a display panel module, a display module, or simply a display panel or the like in some cases.

<Display Apparatus 100A>

Figure 28:
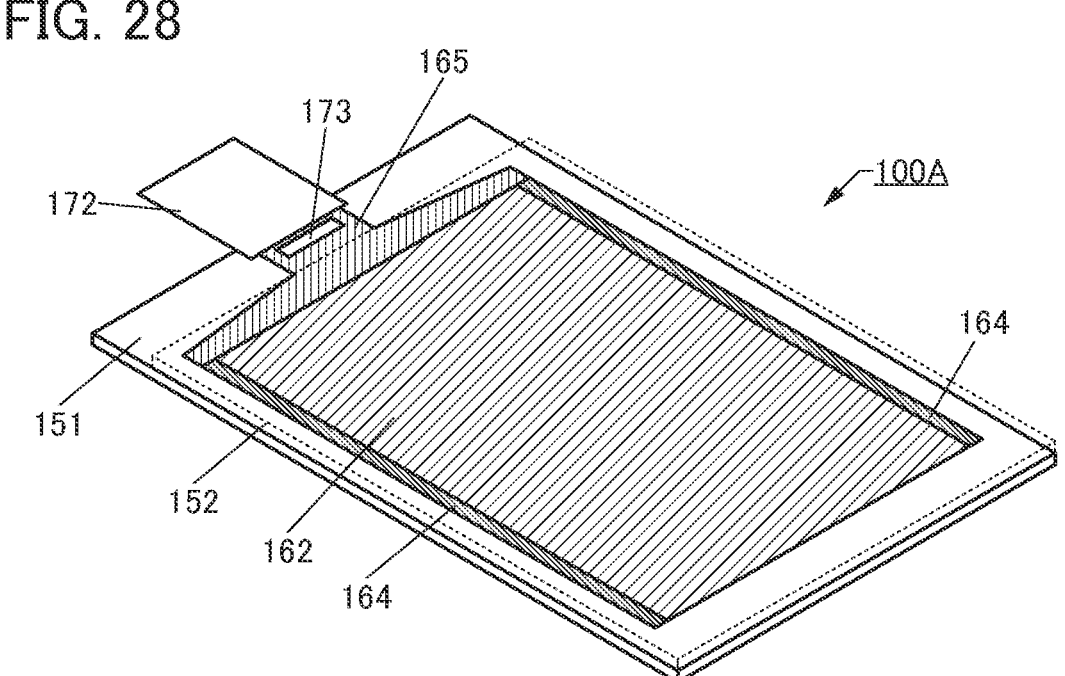
FIG. 28 is a perspective view illustrating an example of a display apparatus.
Figures 29A, 29B, 29C:
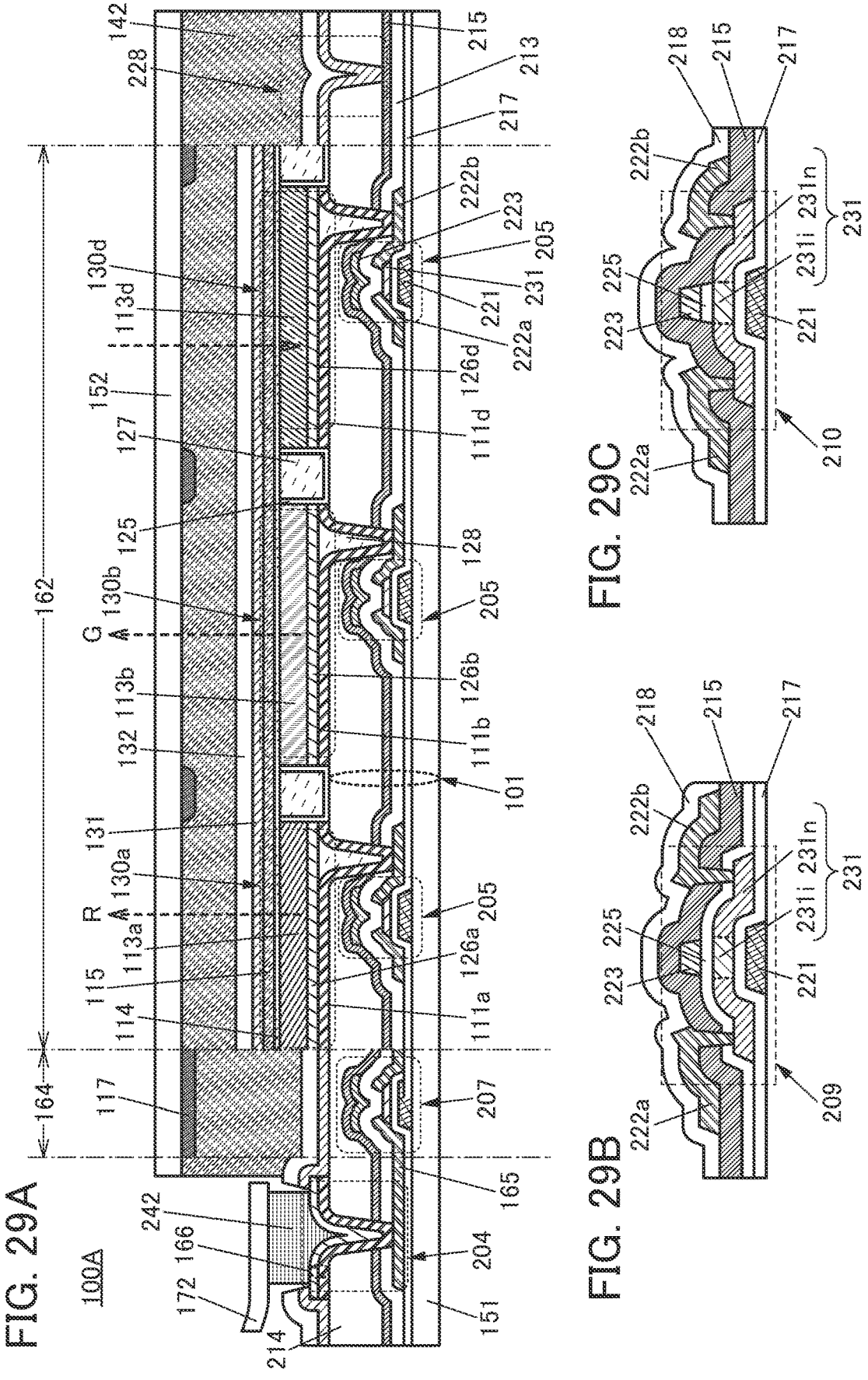
FIG. 29A is a cross-sectional view illustrating an example of a display apparatus.
FIG. 29B and FIG. 29C are cross-sectional views illustrating an example of a transistor.

FIG. 28 illustrates a perspective view of the display apparatus 100A, and FIG. 29A illustrates a cross-sectional view of the display apparatus 100A.

The display apparatus 100A has a structure where a substrate 152 and a substrate 151 are bonded to each other. In FIG. 28, the substrate 152 is denoted by a dashed line.

The display apparatus 100A includes a display portion 162, a circuit 164, a wiring 165, and the like. FIG. 28 illustrates an example where an IC 173 and an FPC 172 are mounted on the display apparatus 100A. Thus, the structure illustrated in FIG. 28 can be regarded as a display module including the display apparatus 100A, the IC (integrated circuit), and the FPC.

As the circuit 164, for example, a scan line driver circuit can be used.

The wiring 165 has a function of supplying a signal and power to the display portion 162 and the circuit 164. The signal and power are input to the wiring 165 from the IC 173 or from the outside through the FPC 172.

FIG. 28 illustrates an example where the IC 173 is provided over the substrate 151 by a COG (Chip On Glass) method, a COF (Chip on Film) method, or the like. An IC including a scan line driver circuit, a signal line driver circuit, or the like can be used as the IC 173, for example. Note that the display apparatus 100A and the display module are not necessarily provided with an IC. The IC may be mounted on the FPC by a COF method or the like.

FIG. 29A illustrates an example of cross sections of part of a region including the FPC 172, part of the circuit 164, part of the display portion 162, and part of a region including an end portion of the display apparatus 100A.

The display apparatus 100A includes light-emitting devices, a light-receiving device, a transistor 207, a transistor 205, and the like between the substrate 151 and the substrate 152. FIG. 29A illustrates, as the light-emitting devices and the light-receiving device, the light-emitting device 130a emitting red light, the light-emitting device 130b emitting green light, and the light-receiving device 130d.

In the case where a pixel of the display apparatus includes three kinds of subpixels including light-emitting devices emitting different colors, the three subpixels can be subpixels of three colors of R, G, and B or subpixels of three colors of yellow (Y), cyan (C), and magenta (M). In the case where four subpixels are included, the four subpixels can be subpixels of four colors of R, G, B, and white (W) or subpixels of four colors of R, G, B, and Y, for example.

The light-emitting device 130a and the light-emitting device 130b each include an optical adjustment layer between a pixel electrode and an EL layer, and the light-receiving device 130d includes an optical adjustment layer between a pixel electrode and a light-receiving layer. As the optical adjustment layer, the light-emitting device 130a includes a conductive layer 126a, the light-emitting device 130b includes a conductive layer 126b, and the light-receiving device 130d includes a conductive layer 126d. Embodiment 1 can be referred to for the details of the light-emitting devices and the light-receiving device. The side surfaces of the pixel electrode 111a, the pixel electrode 111b, the pixel electrode 111d, the conductive layers 126a, 126b, and 126d, the EL layer 113a, the EL layer 113b, and the light-receiving layer 113d are covered with the insulating layers 125 and 127. The common layer 114 is provided over the EL layer 113a, the EL layer 113b, the light-receiving layer 113d, and the insulating layers 125 and 127, and the common electrode 115 is provided over the common layer 114. The protective layer 131 is provided over the light-emitting device 130a, the light-emitting device 130b, and the light-receiving device 130d. The protective layer 132 is provided over the protective layer 131.

The protective layer 132 and the substrate 152 are bonded to each other with an adhesive layer 142. A solid sealing structure, a hollow sealing structure, or the like can be employed to seal the light-emitting devices. In FIG. 29A, a solid sealing structure is employed in which a space between the substrate 152 and the substrate 151 is filled with the adhesive layer 142. Alternatively, a hollow sealing structure where the space is filled with an inert gas (e.g., nitrogen or argon) may be employed. The adhesive layer 142 may be provided not to overlap with the light-emitting device. The space may be filled with a resin different from that of the frame-like adhesive layer 142.

The pixel electrode 111a, the pixel electrode 111b, and the pixel electrode 111d are each connected to a conductive layer 222b included in the transistor 205 through an opening provided in an insulating layer 214.

Depressed portions are formed in the pixel electrode 111a, the pixel electrode 111b, and the pixel electrode 111d to cover the openings provided in the insulating layer 214. A layer 128 is preferably embedded in the depressed portion. It is preferable that the conductive layer 126a be formed over the pixel electrode 111a and the layer 128, the conductive layer 126b be formed over the pixel electrode 111b and the layer 128, and the conductive layer 126d be formed over the pixel electrode 111d and the layer 128. The conductive layer 126a, the conductive layer 126b, and the conductive layer 126d can also be referred to as pixel electrodes.

The layer 128 has a planarization function for the depressed portions of the pixel electrode 111a, the pixel electrode 111b, and the pixel electrode 111d. The formation of the layer 128 can reduce unevenness of the formation surfaces of the EL layers and the light-receiving layer, and accordingly can improve the coverage. When the conductive layer 126a, the conductive layer 126b, and the conductive layer 126d electrically connected to the pixel electrode 111a, the pixel electrode 111b, and the pixel electrode 111d are provided over the pixel electrode 111a, the pixel electrode 111b, the pixel electrode 111d, and the layer 128, regions overlapping with the depressed portions of the pixel electrode 111a, the pixel electrode 111b, and the pixel electrode 111d can also be used as the light-emitting regions in some cases. Thus, the aperture ratio of a pixel can be increased.

The layer 128 may be an insulating layer or a conductive layer. Any of a variety of inorganic insulating materials, organic insulating materials, and conductive materials can be used for the layer 128 as appropriate. In particular, the layer 128 is preferably formed using an insulating material.

An insulating layer containing an organic material can be suitably used for the layer 128. As the layer 128, an acrylic resin, a polyimide resin, an epoxy resin, a polyamide resin, a polyimide-amide resin, a siloxane resin, a benzocyclobutene-based resin, a phenol resin, a precursor of any of these resins, or the like can be used, for example. A photosensitive resin can also be used for the layer 128. As the photosensitive resin, a positive photosensitive material or a negative photosensitive material can be used.

When a photosensitive resin is used, the layer 128 can be formed through only light-exposure and development steps, reducing the influence of dry etching, wet etching, or the like on the surfaces of the pixel electrode 111a, the pixel electrode 111b, and the pixel electrode 111d. When the layer 128 is formed using a negative photosensitive resin, the layer 128 can sometimes be formed using the photomask (light-exposure mask) used for forming the opening in the insulating layer 214.

The conductive layer 126a is provided over the pixel electrode 111a and the layer 128. The conductive layer 126a includes a first region in contact with the top surface of the pixel electrode 111a and a second region in contact with the top surface of the layer 128. The top surface level of the pixel electrode 111a in contact with the first region and the top surface level of the layer 128 in contact with the second region are preferably the same or substantially the same.

Similarly, the conductive layer 126b is provided over the pixel electrode 111b and the layer 128. The conductive layer 126b includes a first region in contact with the top surface of the pixel electrode 111b and a second region in contact with the top surface of the layer 128. The top surface level of the pixel electrode 111b in contact with the first region and the top surface level of the layer 128 in contact with the second region are preferably the same or substantially the same.

The conductive layer 126d is provided over the pixel electrode 111d and the layer 128. The conductive layer 126d includes a first region in contact with the top surface of the pixel electrode 111d and a second region in contact with the top surface of the layer 128. The top surface level of the pixel electrode 111d in contact with the first region and the top surface level of the layer 128 in contact with the second region are preferably the same or substantially the same.

The pixel electrode contains a material reflecting visible light, and a counter electrode contains a material transmitting visible light.

The display apparatus 100A is of a top emission type. Light from the light-emitting device is emitted toward the substrate 152 side. For the substrate 152, a material having a high transmitting property with respect to visible light is preferably used. For the substrate 152, a material having a high transmitting property with respect to visible light and infrared light is further preferably used. Light is incident on the light-receiving device through the substrate 152.

A stacked-layer structure from the substrate 151 to the insulating layer 214 corresponds to the layer 101 including transistors described in Embodiment 2 and the like.

The transistor 207 and the transistor 205 are each formed over the substrate 151. These transistors can be manufactured using the same materials through the same process.

An insulating layer 217, an insulating layer 213, an insulating layer 215, and the insulating layer 214 are provided in this order over the substrate 151. Parts of the insulating layer 217 function as gate insulating layers of the transistors. Parts of the insulating layer 213 function as gate insulating layers of the transistors. The insulating layer 215 is provided to cover the transistors. The insulating layer 214 is provided to cover the transistors and has a function of a planarization layer. Note that there is no limitation on the number of gate insulating layers and the number of insulating layers covering the transistors, and each insulating layer may be a single layer or include two or more layers.

A material through which impurities such as water and hydrogen do not easily diffuse is preferably used for at least one of the insulating layers covering the transistors. Thus, such an insulating layer can function as a barrier layer. Such a structure can effectively inhibit diffusion of impurities into the transistors from the outside and increase the reliability of the display apparatus.

An inorganic insulating film is preferably used as each of the insulating layer 217, the insulating layer 213, and the insulating layer 215. As the inorganic insulating film, for example, a silicon nitride film, a silicon oxynitride film, a silicon oxide film, a silicon nitride oxide film, an aluminum oxide film, or an aluminum nitride film, or the like can be used. A hafnium oxide film, an yttrium oxide film, a zirconium oxide film, a gallium oxide film, a tantalum oxide film, a magnesium oxide film, a lanthanum oxide film, a cerium oxide film, a neodymium oxide film, or the like may also be used. A stack including two or more of the above insulating films may also be used.

Here, an organic insulating film often has a lower barrier property than an inorganic insulating film. Therefore, the organic insulating film preferably has an opening in the vicinity of an end portion of the display apparatus 100A. This can inhibit entry of impurities from the end portion of the display apparatus 100A through the organic insulating film. Alternatively, the organic insulating film may be formed so that its end portion is positioned inward from the end portion of the display apparatus 100A, to prevent the organic insulating film from being exposed at the end portion of the display apparatus 100A.

An organic insulating film is suitable for the insulating layer 214 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins. Alternatively, the insulating layer 214 may have a stacked-layer structure of an organic insulating film and an inorganic insulating film. The outermost layer of the insulating layer 214 preferably functions as an etching protective film. Accordingly, a depressed portion can be inhibited from being formed in the insulating layer 214 at the time of processing the pixel electrode 111a, the conductive layer 126a, or the like. Alternatively, a depressed portion may be formed in the insulating layer 214 at the time of processing the pixel electrode 111a, the conductive layer 126a, or the like.

In a region 228 illustrated in FIG. 29A, an opening is formed in the insulating layer 214. This can inhibit entry of impurities into the display portion 162 from the outside through the insulating layer 214 even when an organic insulating film is used as the insulating layer 214. Consequently, the reliability of the display apparatus 100A can be increased.

Each of the transistor 207 and the transistors 205 includes a conductive layer 221 functioning as a gate, the insulating layer 217 functioning as the gate insulating layer, a conductive layer 222a and the conductive layer 222b functioning as a source and a drain, a semiconductor layer 231, the insulating layer 213 functioning as the gate insulating layer, and a conductive layer 223 functioning as a gate. Here, a plurality of layers obtained by processing the same conductive film are shown with the same hatching pattern. The insulating layer 217 is positioned between the conductive layer 221 and the semiconductor layer 231. The insulating layer 213 is positioned between the conductive layer 223 and the semiconductor layer 231.

There is no particular limitation on the structure of the transistors included in the display apparatus of this embodiment. For example, a planar transistor, a staggered transistor, an inverted staggered transistor, or the like can be used. A top-gate or a bottom-gate transistor structure may be employed. Alternatively, gates may be provided above and below the semiconductor layer where a channel is formed.

The structure where the semiconductor layer where a channel is formed is interposed between two gates is used for the transistor 207 and the transistors 205. The two gates may be connected to each other and supplied with the same signal to drive the transistor. Alternatively, a potential for controlling the threshold voltage may be supplied to one of the two gates and a potential for driving may be supplied to the other to control the threshold voltage of the transistor.

There is no particular limitation on the crystallinity of a semiconductor material used for the transistors, and any of an amorphous semiconductor and a semiconductor having crystallinity (a microcrystalline semiconductor, a polycrystalline semiconductor, a single crystal semiconductor, or a semiconductor partly including crystal regions) may be used. It is preferable to use a semiconductor having crystallinity, in which case degradation of the transistor characteristics can be reduced.

The semiconductor layer of the transistor preferably includes a metal oxide (also referred to as an oxide semiconductor). That is, a transistor including a metal oxide in its channel formation region (hereinafter, also referred to as an OS transistor) is preferably used for the display apparatus of this embodiment. Alternatively, the semiconductor layer of the transistor may contain silicon. Examples of silicon include amorphous silicon and crystalline silicon (e.g., low-temperature polysilicon or single crystal silicon).

The semiconductor layer preferably contains indium, M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. Specifically, M is preferably one or more kinds selected from aluminum, gallium, yttrium, and tin.

It is particularly preferable that an oxide containing indium (In), gallium (Ga), and zinc (Zn) (also referred to as IGZO) be used as the semiconductor layer. Alternatively, an oxide containing indium (In), aluminum (Al), and zinc (Zn) (also referred to as IAZO) may be used for the semiconductor layer. Alternatively, an oxide containing indium (In), aluminum (Al), gallium (Ga), and zinc (Zn) (IAGZO) may be used for the semiconductor layer.

In the case where the semiconductor layer is an In-M-Zn oxide, the atomic proportion of In is preferably greater than or equal to the atomic proportion of M in the In-M-Zn oxide. Examples of the atomic ratio of the metal elements in such an In-M-Zn oxide include In:M:Zn=1:1:1 or a composition in the neighborhood thereof, In:M:Zn=1:1:1.2 or a composition in the neighborhood thereof, In:M:Zn=1:3:2 or a composition in the neighborhood thereof, In:M:Zn=1:3:4 or a composition in the neighborhood thereof, In:M:Zn=2:1:3 or a composition in the neighborhood thereof, In:M:Zn=3:1:2 or a composition in the neighborhood thereof, In:M:Zn=4:2:3 or a composition in the neighborhood thereof, In:M:Zn=4:2:4.1 or a composition in the neighborhood thereof, In:M:Zn=5:1:3 or a composition in the neighborhood thereof, In:M:Zn=5:1:6 or a composition in the neighborhood thereof, In:M:Zn=5:1:7 or a composition in the neighborhood thereof, In:M:Zn=5:1:8 or a composition in the neighborhood thereof, In:M:Zn=6:1:6 or a composition in the neighborhood thereof, and In:M:Zn=5:2:5 or a composition in the neighborhood thereof. Note that a composition in the neighborhood includes the range of ±30% of an intended atomic ratio.

For example, when the atomic ratio is described as In:Ga:Zn=4:2:3 or a composition in the neighborhood thereof, the case is included where the atomic ratio of Ga is greater than or equal to 1 and less than or equal to 3 and the atomic ratio of Zn is greater than or equal to 2 and less than or equal to 4 with the atomic ratio of In being 4. When the atomic ratio is described as In:Ga:Zn=5:1:6 or a composition in the neighborhood thereof, the case is included where the atomic ratio of Ga is greater than 0.1 and less than or equal to 2 and the atomic ratio of Zn is greater than or equal to 5 and less than or equal to 7 with the atomic ratio of In being 5. When the atomic ratio is described as In:Ga:Zn=1:1:1 or a composition in the neighborhood thereof, the case is included where the atomic ratio of Ga is greater than 0.1 and less than or equal to 2 and the atomic ratio of Zn is greater than 0.1 and less than or equal to 2 with the atomic ratio of In being 1.

The transistor included in the circuit 164 and the transistor included in the display portion 162 may have the same structure or different structures. The same structure or two or more types of structures may be employed for a plurality of transistors included in the circuit 164. Similarly, the same structure or two or more types of structures may be employed for a plurality of transistors included in the display portion 162.

FIG. 29B and FIG. 29C illustrate other structure examples of transistors.

Each of a transistor 209 and a transistor 210 includes the conductive layer 221 functioning as a gate, the insulating layer 217 functioning as a gate insulating layer, the semiconductor layer 231 including a channel formation region 231i and a pair of low-resistance regions 231n, the conductive layer 222a connected to one of the pair of low-resistance regions 231n, the conductive layer 222b connected to the other of the pair of low-resistance regions 231n, the insulating layer 225 functioning as a gate insulating layer, the conductive layer 223 functioning as a gate, and the insulating layer 215 covering the conductive layer 223. The insulating layer 217 is positioned between the conductive layer 221 and the channel formation region 231i. The insulating layer 225 is positioned at least between the conductive layer 223 and the channel formation region 231i. Furthermore, an insulating layer 218 covering the transistor may be provided.

FIG. 29B illustrates an example of the transistor 209 where the insulating layer 225 covers the top and side surfaces of the semiconductor layer 231. The conductive layer 222a and the conductive layer 222b are connected to the respective low-resistance regions 231n through openings provided in the insulating layer 225 and the insulating layer 215. One of the conductive layer 222a and the conductive layer 222b functions as a source, and the other functions as a drain.

In the transistor 210 illustrated in FIG. 29C, the insulating layer 225 overlaps with the channel formation region 231i of the semiconductor layer 231 and does not overlap with the low-resistance regions 231n. The structure illustrated in FIG. 29C can be manufactured by processing the insulating layer 225 using the conductive layer 223 as a mask, for example. In FIG. 29C, the insulating layer 215 is provided to cover the insulating layer 225 and the conductive layer 223, and the conductive layer 222a and the conductive layer 222b are connected to the respective low-resistance regions 231n through the openings in the insulating layer 215.

A connection portion 204 is provided in a region of the substrate 151 which does not overlap with the substrate 152. In the connection portion 204, the wiring 165 is electrically connected to the FPC 172 through a conductive layer 166 and a connection layer 242. An example is illustrated where the conductive layer 166 has a stacked-layer structure of a conductive film obtained by processing the same conductive film as the pixel electrode 111a, the pixel electrode 111b, and the pixel electrode 111d and a conductive film obtained by processing the same conductive film as the conductive layer 126a, the conductive layer 126b, and the conductive layer 126d. On the top surface of the connection portion 204, the conductive layer 166 is exposed. Thus, the connection portion 204 and the FPC 172 can be electrically connected to each other through the connection layer 242.

A light-blocking layer 117 is preferably provided on the surface of the substrate 152 on the substrate 151 side. A variety of optical members can be arranged on the outer surface of the substrate 152. Examples of the optical members include a polarizing plate, a retardation plate, a light diffusion layer (a diffusion film or the like), an anti-reflective layer, and a light-condensing film. Furthermore, an antistatic film to inhibit attachment of dust, a water repellent film to reduce attachment of stain, a hard coat film to inhibit generation of a scratch caused by the use, an impact-absorbing layer, or the like may be arranged on the outer side of the substrate 152.

The protective layer 131 and the protective layer 132 provided to cover the light-emitting device can inhibit an impurity such as water from entering the light-emitting device. As a result, the reliability of the light-emitting device can be enhanced.

In the region 228 in the vicinity of the end portion of the display apparatus 100A, the insulating layer 215 and the protective layer 131 or the protective layer 132 are preferably in contact with each other through an opening in the insulating layer 214. In particular, the inorganic insulating films are preferably in contact with each other. This can inhibit entry of impurities into the display portion 162 from the outside through the organic insulating film. Consequently, the reliability of the display apparatus 100A can be increased.

For each of the substrate 151 and the substrate 152, glass, quartz, ceramics, sapphire, a resin, a metal, an alloy, a semiconductor, or the like can be used. The substrate on the side where light from the light-emitting device is extracted is formed using a material transmitting the light. When the substrate 151 and the substrate 152 are formed using flexible materials, the flexibility of the display apparatus can be increased. Furthermore, a polarizing plate may be used as the substrate 151 or the substrate 152.

For each of the substrate 151 and the substrate 152, a polyester resin such as polyethylene terephthalate (PET) or polyethylene naphthalate (PEN), a polyacrylonitrile resin, an acrylic resin, a polyimide resin, a polymethyl methacrylate resin, a polycarbonate (PC) resin, a polyether sulfone (PES) resin, a polyamide resin (e.g., nylon or aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, or cellulose nanofiber can be used, for example. Glass that is thin enough to have flexibility may be used for one or both of the substrate 151 and the substrate 152.

In the case where a circularly polarizing plate overlaps with the display apparatus, a highly optically isotropic substrate is preferably used as the substrate included in the display apparatus. A highly optically isotropic substrate has a low birefringence (in other words, a small amount of birefringence).

The absolute value of a retardation (phase difference) of a highly optically isotropic substrate is preferably less than or equal to 30 nm, further preferably less than or equal to 20 nm, still further preferably less than or equal to 10 nm.

Examples of a highly optically isotropic film include a triacetyl cellulose (TAC, also referred to as cellulose triacetate) film, a cycloolefin polymer (COP) film, a cycloolefin copolymer (COC) film, and an acrylic resin film.

In the case where a film is used for the substrate and the film absorbs water, the shape of the display panel might be changed, e.g., creases are generated. Thus, for the substrate, a film with a low water absorption rate is preferably used. For example, the water absorption rate of the film to be used is preferably lower than or equal to 1%, further preferably lower than or equal to 0.1%, still further preferably lower than or equal to 0.01%.

As the adhesive layer, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferable. Alternatively, a two-component resin may be used. An adhesive sheet or the like may be used.

As the connection layer 242, an anisotropic conductive film (ACF), an anisotropic conductive paste (ACP), or the like can be used.

As materials that can be used for a gate, a source, and a drain of a transistor and conductive layers such as a variety of wirings and electrodes included in a display apparatus, metals such as aluminum, titanium, chromium, nickel, copper, yttrium, zirconium, molybdenum, silver, tantalum, or tungsten, an alloy containing any of these metals as its main component, and the like can be given. A film containing any of these materials can be used as a single layer or a stacked-layer structure.

As a light-transmitting conductive material, a conductive oxide such as indium oxide, indium tin oxide, indium zinc oxide, zinc oxide, or zinc oxide containing gallium, or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Further alternatively, a nitride of the metal material (e.g., titanium nitride) or the like may be used. Note that in the case of using the metal material or the alloy material (or the nitride thereof), it is preferably thinned so as to have a light-transmitting property. A stacked film of any of the above materials can be used as a conductive layer. For example, a stacked film of indium tin oxide and an alloy of silver and magnesium, or the like is preferably used to increase the conductivity. Such materials can also be used for conductive layers such as wirings and electrodes included in the display apparatus, and conductive layers (e.g., a conductive layer functioning as a pixel electrode or a common electrode) included in a light-emitting device.

As an insulating material that can be used for each insulating layer, for example, a resin such as an acrylic resin or an epoxy resin, and an inorganic insulating material such as silicon oxide, silicon oxynitride, silicon nitride oxide, silicon nitride, or aluminum oxide can be given.

<Display Apparatus 100B>

Figure 30:
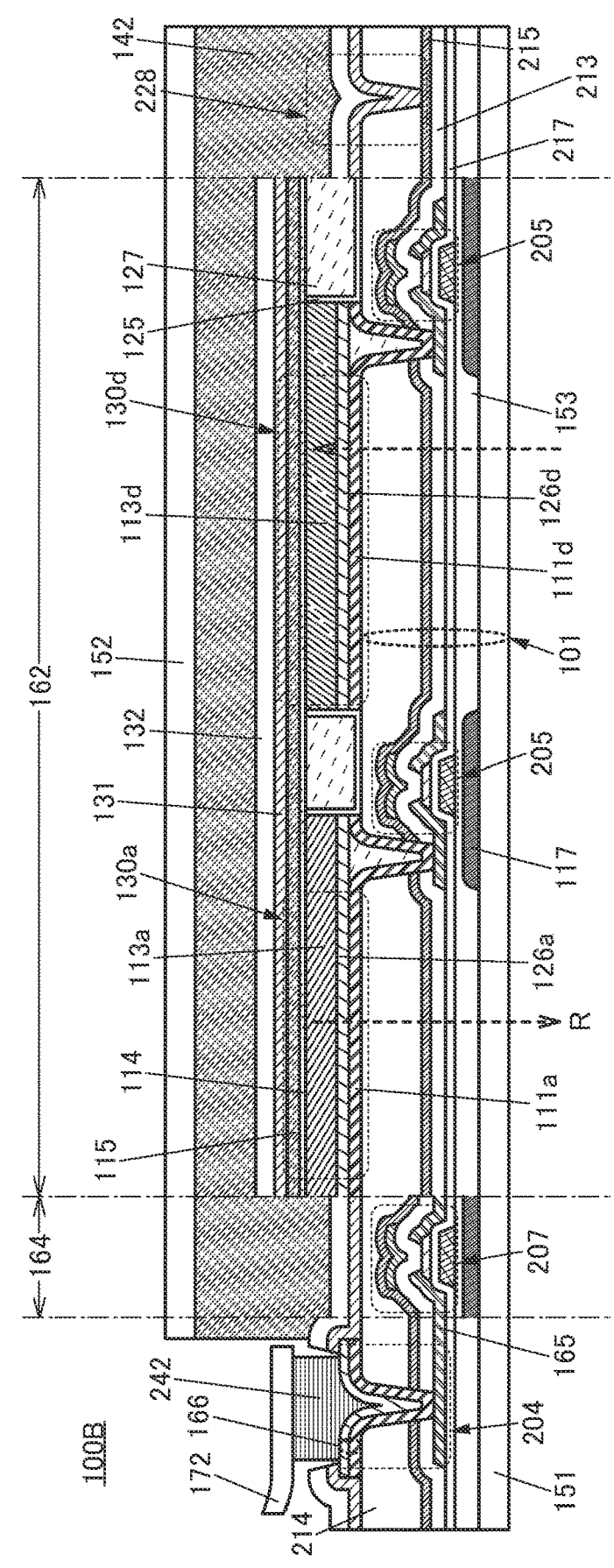
FIG. 30 is a cross-sectional view illustrating an example of a display apparatus.

A display apparatus 100B illustrated in FIG. 30 is different from the display apparatus 100A mainly in having a bottom-emission structure. Note that portions similar to those in the display apparatus 100A are not described in some cases.

Light from the light-emitting device is emitted toward the substrate 151 side. For the substrate 151, a material having a high transmitting property with respect to visible light is preferably used. For the substrate 151, a material having a high transmitting property with respect to visible light and infrared light is further preferably used. By contrast, there is no limitation on the light-transmitting property of a material used for the substrate 152. Light is incident on the light-receiving device through the substrate 151.

The light-blocking layer 117 is preferably formed between the substrate 151 and the transistor 207 and between the substrate 151 and the transistor 205. FIG. 30 illustrates an example where the light-blocking layer 117 is provided over the substrate 151, an insulating layer 153 is provided over the light-blocking layer 117, and the transistors 207 and 205 and the like are provided over the insulating layer 153.

This embodiment can be combined with any of the other embodiments as appropriate.

Embodiment 5

In this embodiment, display apparatuses of one embodiment of the present invention are described with reference to FIG. 31 to FIG. 38.

The display apparatus of this embodiment can be a high-definition display apparatus. Accordingly, the display apparatus of this embodiment can be used for display portions of information terminals (wearable devices) such as watch-type and bracelet-type information terminals and display portions of wearable devices capable of being worn on the head, such as a VR (Virtual Reality) device like a head mounted display and a glasses-type AR (Augmented Reality) device.

<Display Module>

Figure 31A:
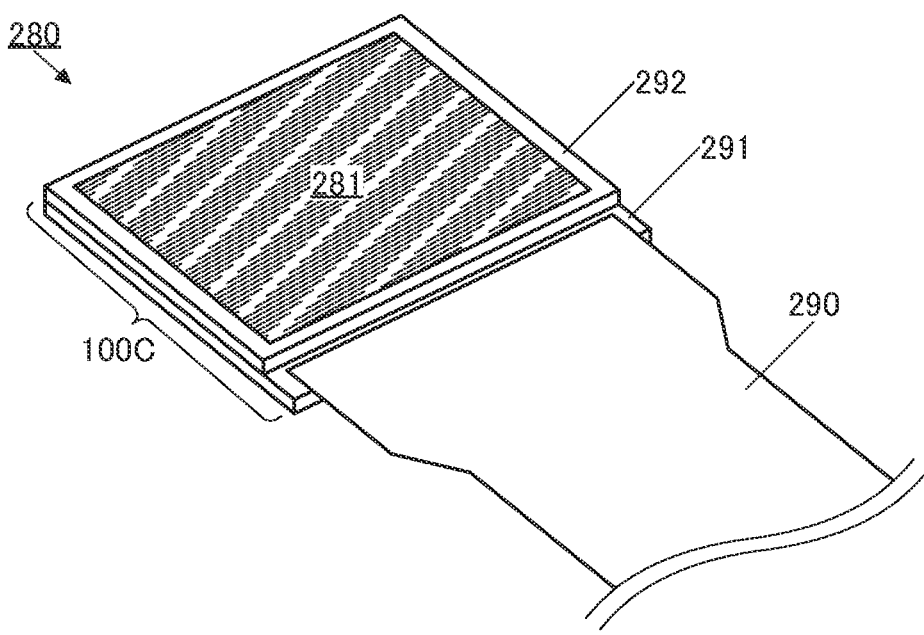
FIG. 31A and FIG. 31B are perspective views illustrating an example of a display module.

FIG. 31A is a perspective view of a display module 280. The display module 280 includes a display apparatus 100C and an FPC 290. Note that the display apparatus included in the display module 280 is not limited to the display apparatus 100C and may be a display apparatus 100D or a display apparatus 100E described later.

The display module 280 includes a substrate 291 and a substrate 292. The display module 280 includes a display portion 281. The display portion 281 is a region of the display module 280 where an image is displayed, and is a region where light from pixels provided in a pixel portion 284 described later can be seen.

Figure 31B:
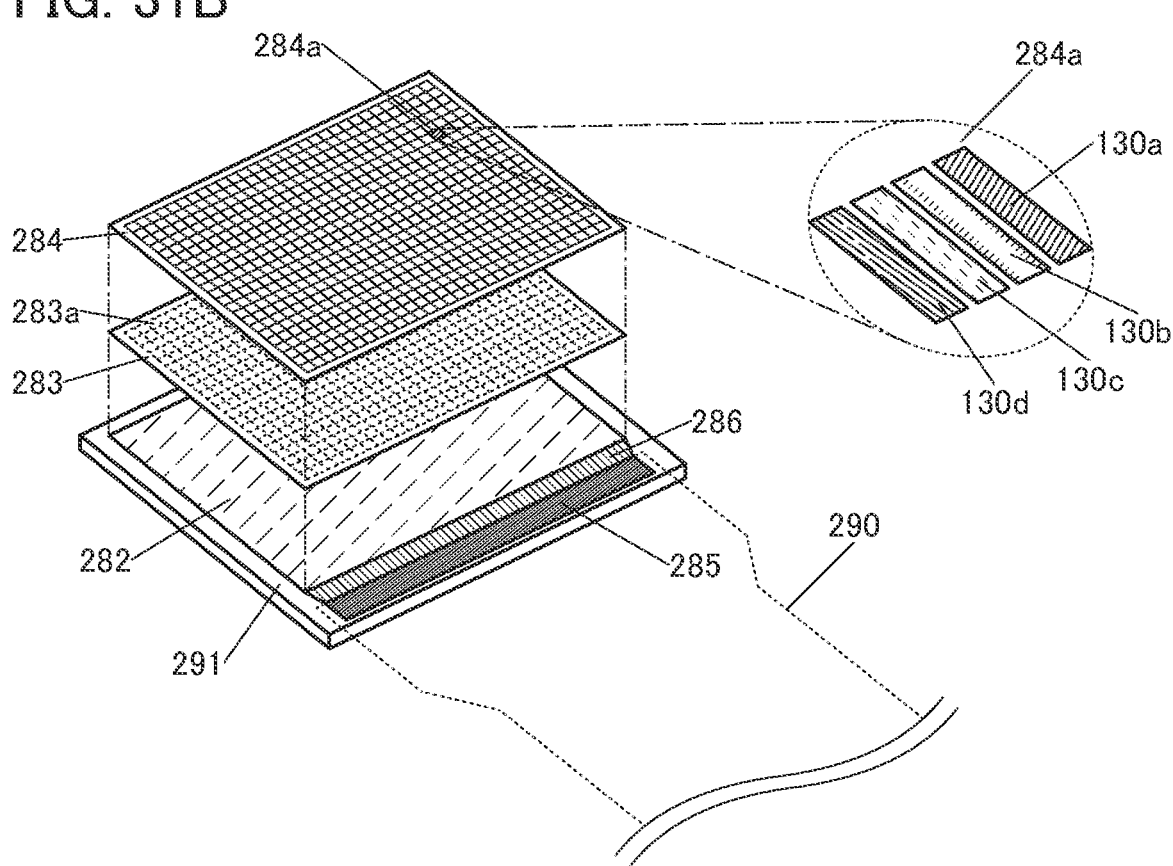

FIG. 31B is a perspective view schematically illustrating a structure on the substrate 291 side. Over the substrate 291, a circuit portion 282, a pixel circuit portion 283 over the circuit portion 282, and the pixel portion 284 over the pixel circuit portion 283 are stacked. In addition, a terminal portion 285 for connection to the FPC 290 is provided in a portion not overlapping with the pixel portion 284 over the substrate 291. The terminal portion 285 and the circuit portion 282 are electrically connected to each other through a wiring portion 286 formed of a plurality of wirings.

The pixel portion 284 includes a plurality of pixels 284a arranged periodically. An enlarged view of one pixel 284a is illustrated on the right side of FIG. 31B. The pixel 284a includes the light-emitting device 130a, the light-emitting device 130b, and the light-emitting device 130c emitting light of different colors and the light-receiving device 130d. The light-emitting devices and the light-receiving device can be arranged in a stripe pattern as illustrated in FIG. 31B. Alternatively, a variety of arrangement methods of light-emitting devices, such as delta arrangement or PenTile arrangement can be employed.

The pixel circuit portion 283 includes a plurality of pixel circuits 283a arranged periodically.

One pixel circuit 283a is a circuit that controls light emission of the light-emitting device and light reception of light-receiving device in one pixel 284a. For example, in the case where one pixel 284a includes three light-emitting devices and one light-receiving device, one pixel circuit 283a is a circuit controlling light emission of the three light-emitting devices and light reception of the one light-receiving device. One pixel circuit 283a may have a structure where three circuits each controlling light emission from one light-emitting device are provided and one circuit controlling light reception of one light-receiving device is provided. For example, the pixel circuit 283a can include at least one selection transistor, one current control transistor (driving transistor), and a capacitor for one light-emitting device. A gate signal is input to a gate of the selection transistor, and a source signal is input to one of a source and a drain of the selection transistor. With such a structure, an active-matrix display apparatus is achieved. As the pixel circuit 283a, the pixel circuit described in Embodiment 1 can be used, for example.

The circuit portion 282 includes a circuit for driving the pixel circuits 283a in the pixel circuit portion 283. For example, one or both of a gate line driver circuit and a source line driver circuit are preferably included. In addition, at least one of an arithmetic circuit, a memory circuit, a power supply circuit, and the like may be included.

The FPC 290 functions as a wiring for supplying a video signal, a power supply potential, or the like to the circuit portion 282 from the outside. An IC may be mounted on the FPC 290.

The display module 280 can have a structure where one or both of the pixel circuit portion 283 and the circuit portion 282 are stacked below the pixel portion 284; hence, the aperture ratio (effective display area ratio) of the display portion 281 can be significantly high. For example, the aperture ratio of the display portion 281 can be higher than or equal to 40% and lower than 100%, preferably higher than or equal to 50% and lower than or equal to 95%, further preferably higher than or equal to 60% and lower than or equal to 95%. Furthermore, the pixels 284a can be arranged at very high density and thus the display portion 281 can have an extremely high definition. For example, the pixels 284a are preferably arranged in the display portion 281 with a definition higher than or equal to 500 ppi, preferably higher than or equal to 1000 ppi, further preferably higher than or equal to 2000 ppi, still further preferably higher than or equal to 3000 ppi, yet further preferably higher than or equal to 5000 ppi, yet still further preferably higher than or equal to 6000 ppi, and lower than or equal to 20000 ppi or lower than or equal to 30000 ppi.

Such a display module 280 has an extremely high definition, and thus can be suitably used for a VR device such as ahead mounted display or a glasses-type AR device. For example, even with a structure where the display portion of the display module 280 is seen through a lens, pixels of the extremely-high-definition display portion 281 included in the display module 280 are prevented from being perceived when the display portion is enlarged by the lens, so that display providing a high sense of immersion can be performed. Without being limited thereto, the display module 280 can be suitably used for electronic devices including a relatively small display portion. For example, the display module 280 can be suitably used for a display portion of a wearable electronic device, such as a wrist watch.

<Display Apparatus 100C>

Figure 32:
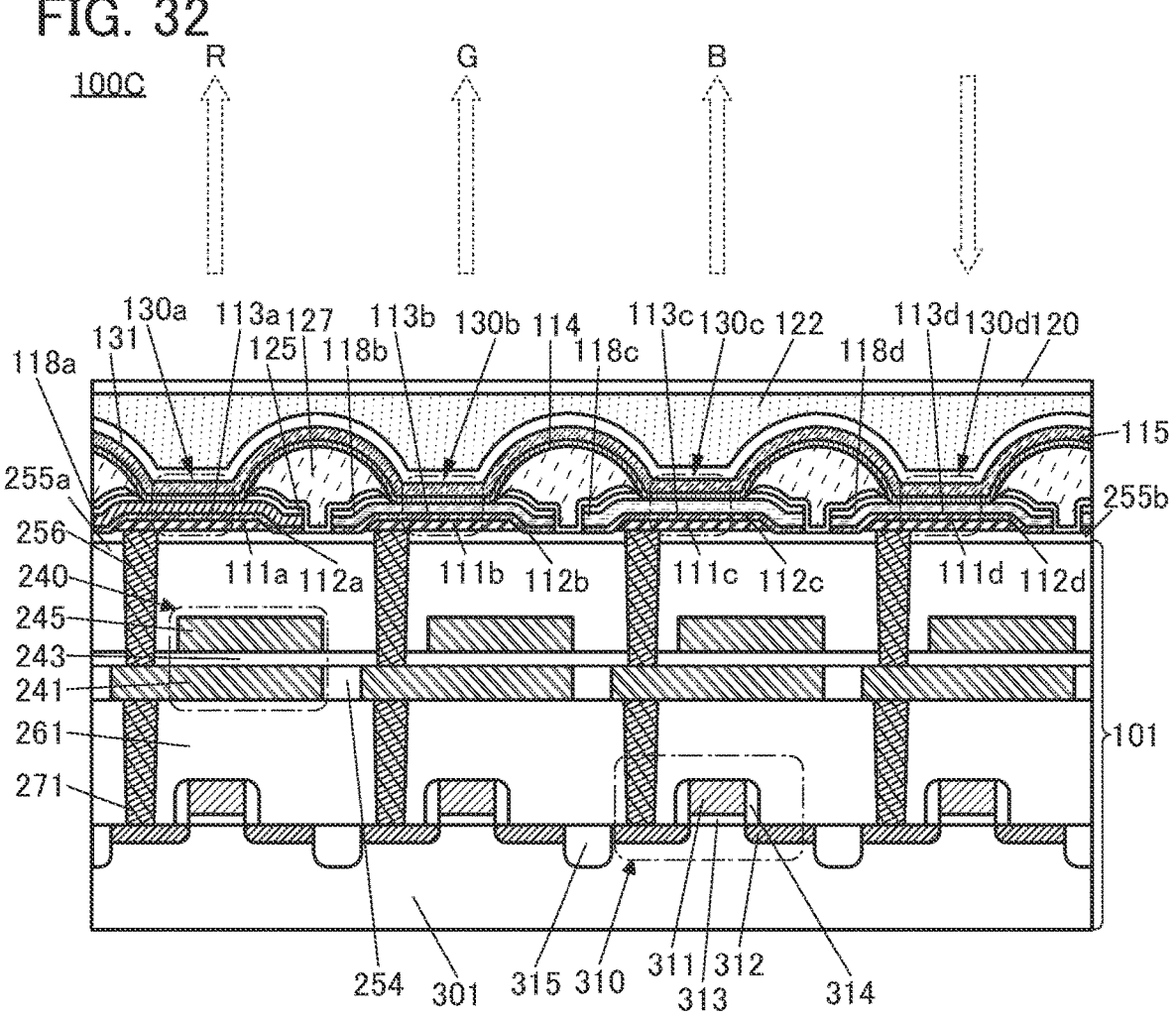
FIG. 32 is a cross-sectional view illustrating an example of a display apparatus.

The display apparatus 100C illustrated in FIG. 32 includes a substrate 301, the light-emitting device 130a, the light-remitting device 130b, the light-emitting device 130c, the light-receiving device 130d, a capacitor 240, and a transistor 310.

The substrate 301 corresponds to the substrate 291 in FIG. 31A and FIG. 31B.

The transistor 310 is a transistor including a channel formation region in the substrate 301. As the substrate 301, a semiconductor substrate such as a single crystal silicon substrate can be used, for example. The transistor 310 includes part of the substrate 301, a conductive layer 311, a low-resistance region 312, an insulating layer 313, and an insulating layer 314. The conductive layer 311 functions as a gate electrode. The insulating layer 313 is positioned between the substrate 301 and the conductive layer 311 and functions as a gate insulating layer. The low-resistance region 312 is a region of the substrate 301 which is doped with an impurity, and functions as one of a source and a drain. The insulating layer 314 is provided to cover a side surface of the conductive layer 311 and serves as an insulating layer.

An element isolation layer 315 is provided between two adjacent transistors 310 to be embedded in the substrate 301.

An insulating layer 261 is provided to cover the transistor 310, and the capacitor 240 is provided over the insulating layer 261.

The capacitor 240 includes a conductive layer 241, a conductive layer 245, and an insulating layer 243 positioned therebetween. The conductive layer 241 functions as one electrode of the capacitor 240, the conductive layer 245 functions as the other electrode of the capacitor 240, and the insulating layer 243 functions as a dielectric of the capacitor 240.

The conductive layer 241 is provided over the insulating layer 261 and embedded in an insulating layer 254. The conductive layer 241 is electrically connected to one of the source and the drain of the transistor 310 through a plug 271 embedded in the insulating layer 261. The insulating layer 243 is provided to cover the conductive layer 241. The conductive layer 245 is provided in a region overlapping with the conductive layer 241 with the insulating layer 243 therebetween.

An insulating layer 255a is provided to cover the capacitor 240, an insulating layer 255b is provided over the insulating layer 255a, and the light-emitting device 130a, the light-emitting device 130b, the light-emitting device 130c, the light-receiving device 130d, and the like are provided over the insulating layer 255b. An insulator is provided in a region between adjacent light-emitting elements. For example, in FIG. 32, the insulating layer 125 and the insulating layer 127 over the insulating layer 125 are provided in the region.

A mask layer 118a is positioned over the EL layer 113a included in the light-emitting device 130a, a mask layer 118b is positioned over the EL layer 113b included in the light-emitting device 130b, a mask layer 118c is positioned over the EL layer 113c included in the light-emitting device 130c, and a mask layer 118d is positioned over the light-receiving layer 113d included in the light-receiving device 130d.

The conductive layer 111a, the conductive layer 111b, the conductive layer 111c, and the conductive layer 111d are each electrically connected to one of the source and the drain of the transistor 310 through a plug 256 embedded in the insulating layer 243, the insulating layer 255a, and the insulating layer 255b, the conductive layer 241 embedded in the insulating layer 254, and the plug 271 embedded in the insulating layer 261. The top surface level of the insulating layer 255b and the top surface level of the plug 256 are the same or substantially the same. Any of a variety of conductive materials can be used for the plugs.

In the display apparatus of one embodiment of the present invention, the pixel electrode of the light-emitting element has a stacked-layer structure of a plurality of layers. For example, in the example illustrated in FIG. 2A, the pixel electrode of the light-emitting device has a stacked-layer structure of the conductive layer 111a, the conductive layer 111b, the conductive layer 111c, and the conductive layer 111d and a conductive layer 112a, a conductive layer 112b, a conductive layer 112c, and a conductive layer 112d. For example, in the case where the display apparatus 100C is of a top-emission type and the pixel electrode of the light-emitting device functions as an anode, the conductive layer 111a, the conductive layer 111b, the conductive layer 111c, and the conductive layer 111d can be layers having visible light reflectance higher than the conductive layer 112a, the conductive layer 112b, the conductive layer 112c, and the conductive layer 112d, and the conductive layer 112a, the conductive layer 112b, the conductive layer 112c, and the conductive layer 112d can be layers having a work function higher than that of the conductive layer 111a, the conductive layer 111b, the conductive layer 111c, and the conductive layer 111d, for example. Higher visible light reflectance of the pixel electrode can suppress transmission of light emitted from the EL layer through the pixel electrode; accordingly, the extraction efficiency of light emitted from the EL layer can be increased in the case where the display apparatus 100C is of a top-emission type. In the case where the pixel electrode functions as an anode, the higher the work function of the pixel electrode is, the higher the emission efficiency of the EL layer is. Thus, the pixel electrode of the light-emitting element has a stacked-layer structure of the conductive layer 111a, the conductive layer 111b, the conductive layer 111c, and the conductive layer 111d having high visible light reflectance and the conductive layer 112a, the conductive layer 112b, the conductive layer 112c, and the conductive layer 112d having a high work function, whereby the light-emitting element can have high light extraction efficiency and high emission efficiency.

In the case where the conductive layer 111a, the conductive layer 111b, the conductive layer 111c, and the conductive layer 111d are layers having visible light reflectance higher than the conductive layer 112a, the conductive layer 112b, the conductive layer 112c, and the conductive layer 112d, the visible light reflectance of the conductive layer 111a, the conductive layer 111b, the conductive layer 111c, and the conductive layer 111d is preferably higher than or equal to 40% and lower than or equal to 100%, higher than or equal to 70% and lower than or equal to 100%, for example. The conductive layer 112a, the conductive layer 112b, the conductive layer 112c, and the conductive layer 112d can be transparent electrodes and have visible light transmittance higher than or equal to 40%, for example.

Note that the conductive layer 111a, the conductive layer 111b, the conductive layer 111c, and the conductive layer 111d included in the light-emitting devices are layers having high reflectance with respect to light emitted from the EL layer. For example, in the case where the EL layer emits infrared light, the conductive layer 111a, the conductive layer 111b, the conductive layer 111c, and the conductive layer 111d can be layers having high reflectance with respect to infrared light. In the case where the pixel electrode of the light-emitting device functions as a cathode, the conductive layer 112a, the conductive layer 112b, the conductive layer 112c, and the conductive layer 112d can be, for example, layers having a lower work function than the conductive layer 111a, the conductive layer 111b, the conductive layer 111c, and the conductive layer 111d.

Meanwhile, in the case where the pixel electrode has a stacked-layer structure of a plurality of layers, the quality of the pixel electrode might change by e.g., a reaction between the plurality of layers. For example, in the case where a film formed after formation of the pixel electrode is removed by a wet etching method in manufacturing of the display apparatus 100C, a chemical solution is in contact with the pixel electrode in some cases. In the case where the pixel electrode has a stacked-layer structure of a plurality of layers, the plurality of layers are in contact with the chemical solution, so that galvanic corrosion might occur. Accordingly, the quality of at least one of the layers included in the pixel electrode is changed in some cases. Thus, the yield of the display apparatus is lowered, and the manufacturing cost of the display apparatus is increased in some cases. In addition, the reliability of the display apparatus is decreased in some cases.

Thus, in the display apparatus 100C, the conductive layer 112a, the conductive layer 112b, the conductive layer 112c, and the conductive layer 112d are formed to cover top surfaces and side surfaces of the conductive layer 111a, the conductive layer 111b, the conductive layer 111c, and the conductive layer 111d. In this manner, even in the case where a film formed after the formation of the pixel electrode including the conductive layer 111a, the conductive layer 111b, the conductive layer 111c, the conductive layer 111d, the conductive layer 112a, the conductive layer 112b, the conductive layer 112c, and the conductive layer 112d is removed by a wet etching method, it is possible to inhibit the chemical solution from being in contact with the conductive layer 111a, the conductive layer 111b, the conductive layer 111c, and the conductive layer 111d. Thus, generation of galvanic corrosion to the pixel electrode can be suppressed, for example. Thus, since the display apparatus 100C can be manufactured by a method giving a high yield, an inexpensive display apparatus can be provided. Furthermore, generation of defects in the display apparatus 100C can be suppressed, so that the display apparatus 100C can have high reliability.

For the conductive layer 111a, the conductive layer 111b, the conductive layer 111c, and the conductive layer 111d, a metal material can be used, for example. Specifically, it is possible to use a metal such as aluminum (Al), titanium (Ti), chromium (Cr), manganese (Mn), iron (Fe), cobalt (Co), nickel (Ni), copper (Cu), gallium (Ga), zinc (Zn), indium (In), tin (Sn), molybdenum (Mo), tantalum (Ta), tungsten (W), palladium (Pd), gold (Au), platinum (Pt), silver (Ag), yttrium (Y), or neodymium (Nd) and an alloy containing an appropriate combination of any of these metals, for example.

For the conductive layer 112a, the conductive layer 112b, the conductive layer 112c, and the conductive layer 112d, an oxide containing one or more selected from indium, tin, zinc, gallium, titanium, aluminum, and silicon can be used. For example, it is preferable to use a conductive oxide containing one or more of indium oxide, indium tin oxide, indium zinc oxide, zinc oxide, zinc oxide containing gallium, titanium oxide, indium zinc oxide containing gallium, indium zinc oxide containing aluminum, indium tin oxide containing silicon, indium zinc oxide containing silicon, and the like. In particular, indium tin oxide containing silicon can be suitably used for the conductive layer 112a, the conductive layer 112b, the conductive layer 112c, and the conductive layer 112d because of having a high work function, for example, a work function higher than or equal to 4.0 eV.

In the example illustrated in FIG. 32, the mask layer 118a is positioned over the EL layer 113a included in the light-emitting device 130a, the mask layer 118b is positioned over the EL layer 113b included in the light-emitting device 130a, the mask layer 118c is positioned over the EL layer 113c included in the light-emitting device 130c, and the mask layer 118d is positioned over the light-receiving layer 113d included in the light-receiving device 130d. The mask layer 118a is a remaining portion of the mask layer provided in contact with the top surface of the EL layer 113a when the EL layer 113a is processed. The same applies to the mask layer 118b, the mask layer 118c, and the mask layer 118d as to the mask layer 118a. In this manner, the mask layer used to protect the EL layer in manufacturing of the display apparatus 100C may partly remain. Note that hereinafter the mask layer 118a, the mask layer 118b, the mask layer 118c and the mask layer 118d may be collectively referred to as the mask layer 118.

In FIG. 32, one end portion of the mask layer 118a is aligned or substantially aligned with an end portion of the EL layer 113a and an end portion of the conductive layer 112a. That is, the end portion of the conductive layer 112a is aligned or substantially aligned with the end portion of the EL layer 113a. The same applies to the mask layer 118b, the mask layer 118c, and the mask layer 118d as to the mask layer 118a.

The other end portion of the mask layer 118a is positioned over the EL layer 113a. Here, the other end portion of the mask layer 118a preferably overlaps with the conductive layer 111a. In that case, the other end portion of the mask layer 118a is likely to be formed on a substantially flat surface of the EL layer 113a. The same can apply to the mask layer 118b, the mask layer 118c, and the mask layer 118d as to the mask layer 118a.

In the case where end portions are aligned or substantially aligned with each other and the case where top surface shapes are the same or substantially the same, it can be said that outlines of stacked layers at least partly overlap with each other in a top view. For example, the case of processing an upper layer and a lower layer with the use of the same mask pattern or mask patterns that are partly the same is included. However, in some cases, the outlines do not completely overlap with each other and the upper layer is positioned inward from the lower layer or the upper layer is positioned outward from the lower layer; such a case is also represented as "end portions are substantially aligned with each other" or "top surface shapes are substantially the same".

The side surfaces of the EL layer 113R, the EL layer 113G, and the EL layer 113B are covered with the insulating layer 125. The insulating layer 127 overlaps with the side surfaces of the EL layers 113R, 113G, and 113B with the insulating layer 125 therebetween.

Parts of the top surfaces of the EL layer 113a, the EL layer 113b, the EL layer 113c, and the light-receiving layer 113d are covered with the mask layer 118a, the mask layer 118b, the mask layer 118c, and the mask layer 118d, respectively. The insulating layer 125 and the insulating layer 127 overlap with parts of the top surfaces of the EL layer 113a, the EL layer 113b, the EL layer 113c, and the light-receiving layer 113d with the mask layer 118a, the mask layer 118b, the mask layer 118c, and the mask layer 118d therebetween.

Parts of the top surfaces and side surfaces of the EL layer 113a, the EL layer 113b, the EL layer 113c, and the light-receiving layer 113d are covered with at least one of the insulating layer 125, the insulating layer 127, and the mask layer 118 (the mask layer 118a, the mask layer 118b, the mask layer 118c, and the mask layer 118d), thereby inhibiting the contact of the common layer 114 or the common electrode 115 with the side surfaces of the EL layer 113a, the EL layer 113b, the EL layer 113c, and the light-receiving layer 113d to suppress a short circuit of the light-emitting device 130 (the light-emitting device 130a, the light-emitting device 130b, the light-emitting device 130c, and the light-receiving device 130d). As a result, the reliability of the light-emitting device 130 or the like can be increased.

The thicknesses of the EL layer 113a, the EL layer 113b, and the EL layer 113c, and the light-receiving layer 113d can be different from each other. For example, the thicknesses of the EL layer 113R, the EL layer 113G, and the EL layer 113B are preferably set to match optical path lengths that intensifies light emitted from the EL layers. Thus, a microcavity structure is achieved, and the color purity of light emitted from the subpixels 110 can be improved.

The insulating layer 125 is preferably in contact with the side surface of each of the EL layer 113a, the EL layer 113b, and the EL layer 113c, and the light-receiving layer 113d. Thus, peeling of the EL layer 113a, the EL layer 113b, the EL layer 113c, and the light-receiving layer 113d can be prevented. When the insulating layer 125 is closely attached to the EL layer 113a, the EL layer 113b, and the EL layer 113c, and the light-receiving layer 113d, the effect of fixing or bonding the adjacent EL layers 113R or the like by the insulating layer 125 is obtained. Thus, the reliability of the light-emitting device 130 can be increased. Furthermore, the manufacturing yield of the light-emitting device can be increased.

As illustrated in FIG. 32, the insulating layer 125 and the insulating layer 127 cover both the side surface and part of the top surface of each of the EL layer 113a, the EL layer 113b, the EL layer 113c, and the light-receiving layer 113d, whereby film separation of the EL layers 113 can be further prevented and the reliability of the light-emitting devices 130 can be improved. Furthermore, the manufacturing yield of the light-emitting devices 130 (the light-emitting device 130a to 130c and the light-emitting device 130d) can be further increased.

In the example in FIG. 32, a stacked-layer structure of the EL layer 113R, the mask layer 118a, the insulating layer 125, and the insulating layer 127 is positioned over the end portion of the conductive layer 112R. Similarly, a stacked-layer structure of the EL layer 113b, the mask layer 118b, the insulating layer 125, and the insulating layer 127 is positioned over the end portion of the conductive layer 112b, and a stacked-layer structure of the EL layer 113c, the mask layer 118c, the insulating layer 125, and the insulating layer 127 is positioned over the end portion of the conductive layer 112c.

The insulating layer 127 is provided over the insulating layer 125 so as to fill a depressed portion formed in the insulating layer 125. The insulating layer 127 can overlap with the side surfaces and parts of the top surfaces of the EL layer 113a, the EL layer 113b, the EL layer 113c, and the light-receiving layer 113d, with the insulating layer 125 therebetween. The insulating layer 127 preferably covers at least part of the side surface of the insulating layer 125.

The insulating layer 125 and the insulating layer 127 can fill a gap between adjacent island-shaped layers, whereby extreme unevenness in the formation surfaces of layers (e.g., the carrier-injection layer and the common electrode) provided over the island-shaped layers can be reduced to make the surfaces flatter. Consequently, the coverage with the carrier-injection layer, the common electrode, and the like can be increased.

The protective layer 131 is provided over the light-emitting device 130a, the light-emitting device 130b, the light-emitting device 130c, and the light-receiving device 130d. A substrate 120 is bonded onto the protective layer 131 with a resin layer 122. The above description can be referred to for details of the light-emitting devices and the components thereover up to the substrate 120.

As each of the insulating layer 255a and the insulating layer 255b, a variety of inorganic insulating films such as an oxide insulating film, a nitride insulating film, an oxynitride insulating film, and a nitride oxide insulating film can be suitably used. As the insulating layer 255a, an oxide insulating film or an oxynitride insulating film, such as a silicon oxide film, a silicon oxynitride film, or an aluminum oxide film, is preferably used. As the insulating layer 255b, a nitride insulating film or a nitride oxide insulating film, such as a silicon nitride film or a silicon nitride oxide film, is preferably used. Specifically, it is preferable that a silicon oxide film be used as the insulating layer 255a and a silicon nitride film be used as the insulating layer 255b. The insulating layer 255b preferably has a function of an etching protective film. Alternatively, a nitride insulating film or a nitride oxide insulating film may be used as the insulating layer 255a, and an oxide insulating film or an oxynitride insulating film may be used as the insulating layer 255b. Although this embodiment illustrates an example where a depressed portion is provided in the insulating layer 255b, a depressed portion is not necessarily provided in the insulating layer 255b.

The pixel electrode of the light-emitting device is electrically connected to one of the source and the drain of the transistor 310 through the plug 256 embedded in the insulating layers 255a and 255b, the conductive layer 241 embedded in the insulating layer 254, and the plug 271 embedded in the insulating layer 261. The top surface level of the insulating layer 255b and the top surface level of the plug 256 are the same or substantially the same. Any of a variety of conductive materials can be used for the plugs.

Figure 33A:
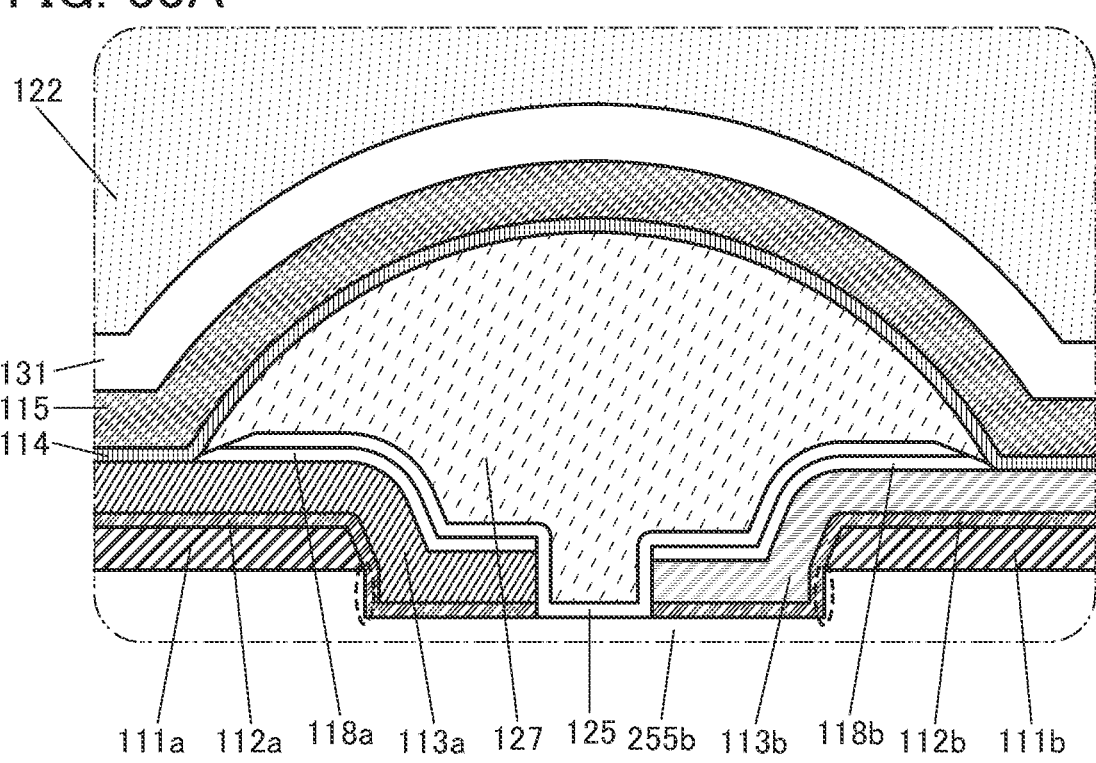
FIG. 33A and FIG. 33B are perspective views illustrating an example of a display module.
Figure 33B:
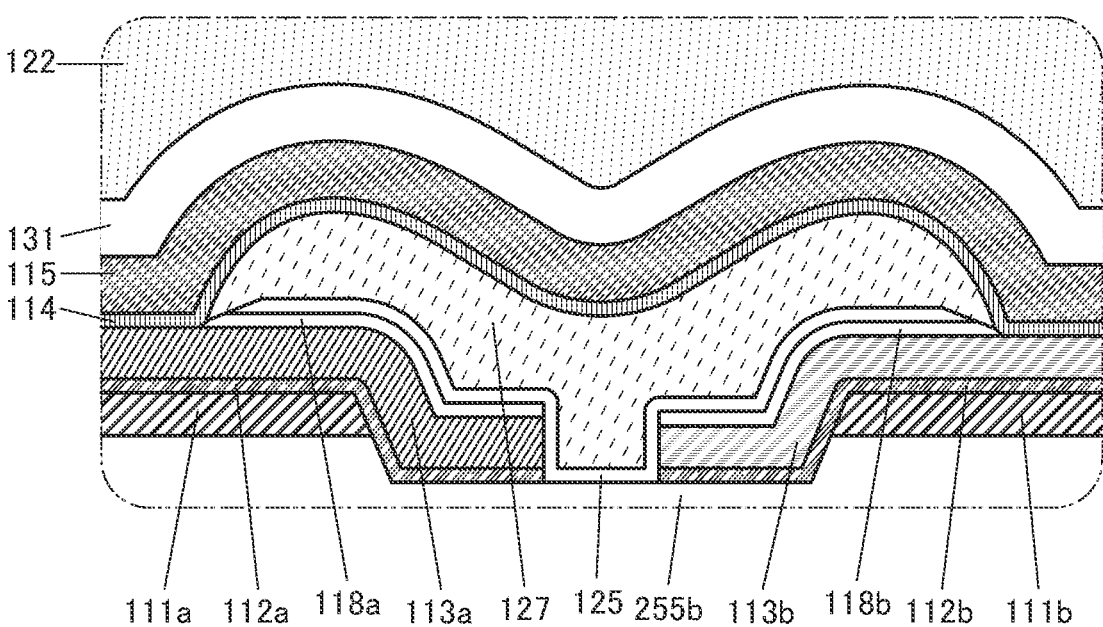

FIG. 33A illustrates an example in which the side surface of the insulating layer 255b (a portion surrounded by a dashed line in FIG. 33A) is perpendicular to a region overlapping with the end portion of the conductive layer 111 (111a to 111d) in FIG. 32. FIG. 33B illustrates an example in which the top surface of the insulating layer 127 has a depression shape in the center and its vicinity, i.e., has a concave surface shape in the cross-sectional view. When the insulating layer 127 has a concave surface in the center portion as illustrated in FIG. 33B, the stress of the insulating layer 127 can be reduced. Specifically, with the structure including a concave surface in the center portion of the insulating layer 127, local stress generated at the end portion of the insulating layer 127 can be reduced, whereby any one or more of film separation between the EL layers 113*a* and 113*b* and the mask layers 118*a* and 118*b*, film separation between the mask layers 118*a* and 118*b* and the insulating layer 125, and film separation between the insulating layer 125 and the insulating layer 127 can be suppressed.

For forming the insulating layer 127 including a concave surface in its center portion as illustrated in FIG. 33B, a light exposure method using a multi-tone mask (typically, a half-tone mask or a gray-tone mask) can be employed. A multi-tone mask is a mask capable of light exposure of three levels to provide an exposed portion, a half-exposed portion, and an unexposed portion, and is a light-exposure mask through which light is transmitted to have a plurality of intensities. The insulating layer 127 including regions with a plurality of (typically two kinds of) thicknesses can be formed with one photomask (one light exposure and development process). Alternatively, in order to form the structure including the concave surface in the center portion of the insulating layer 127, the insulating layer 127 including regions with a plurality of thicknesses can be formed by making the line width of a mask positioned on the concave surface smaller than the line width of the light exposure portion.

Note that a method for forming a concave surface in the center portion of the insulating layer 127 is not limited to the above method. For example, an exposed portion and a half-exposed portion may be formed separately with the use of two photomasks. Alternatively, the viscosity of the resin material used for the insulating layer 127 may be adjusted, specifically to less than or equal to 10 cP, preferably greater than or equal to 1 cP and less than or equal to 5 cP.

Although not illustrated in FIG. 33B, the concave surface in the center portion of the insulating layer 127 is not necessarily continuous, and may be disconnected between adjacent light-emitting elements. In this case, part of the insulating layer 127 in the center portion illustrated in FIG. 33B is eliminated, so that the surface of the insulating layer 125 is exposed. In the case of this structure, the insulating layer 127 preferably has a shape such that the common layer 114 and the common electrode 115 can cover the insulating layer 127.

<Display Apparatus 100D>

Figure 34:
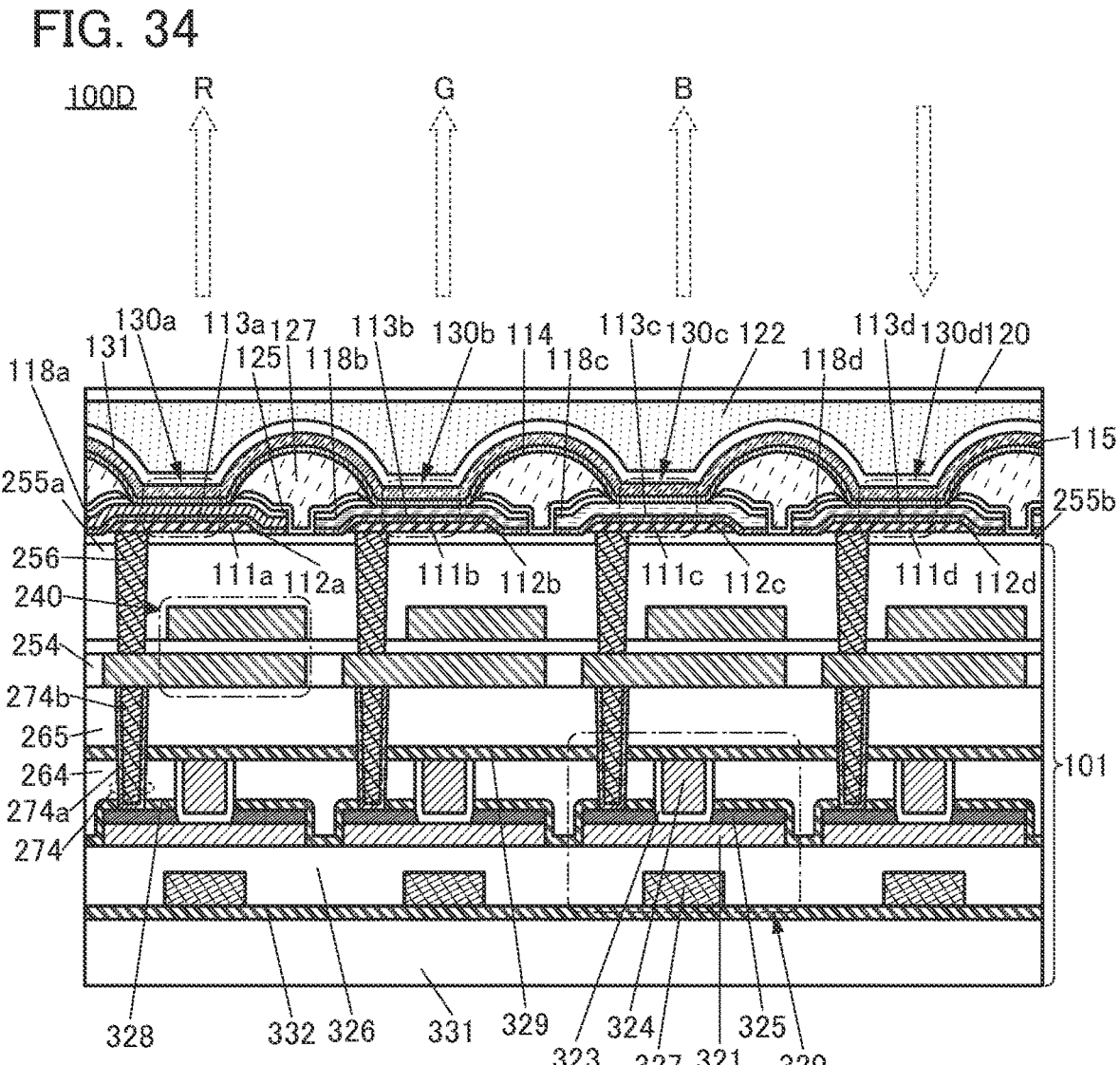
FIG. 34 is a cross-sectional view illustrating an example of a display apparatus.

The display apparatus 100D illustrated in FIG. 34 is different from the display apparatus 100C mainly in a structure of a transistor. Note that description of portions similar to those of the display apparatus 100C is omitted in some cases.

A transistor 320 is a transistor including a metal oxide (also referred to as an oxide semiconductor) in a semiconductor layer where a channel is formed (an OS transistor).

The transistor 320 includes a semiconductor layer 321, an insulating layer 323, a conductive layer 324, a pair of conductive layers 325, an insulating layer 326, and a conductive layer 327.

A substrate 331 corresponds to the substrate 291 in FIG. 31A and FIG. 31B. A stacked-layer structure including the substrate 331 and the components thereover up to the insulating layer 255*b* corresponds to the layer 101 including transistors in Embodiment 1. As the substrate 331, an insulating substrate or a semiconductor substrate can be used.

An insulating layer 332 is provided over the substrate 331. The insulating layer 332 functions as a barrier layer that prevents diffusion of impurities such as water and hydrogen from the substrate 331 into the transistor 320 and release of oxygen from the semiconductor layer 321 to the insulating layer 332 side. As the insulating layer 332, for example, a film, such as an aluminum oxide film, a hafnium oxide film, or a silicon nitride film, in which hydrogen or oxygen is less likely to diffuse than in a silicon oxide film can be used.

The conductive layer 327 is provided over the insulating layer 332, and the insulating layer 326 is provided to cover the conductive layer 327. The conductive layer 327 functions as a first gate electrode of the transistor 320, and part of the insulating layer 326 functions as a first gate insulating layer. An oxide insulating film such as a silicon oxide film is preferably used as at least part of the insulating layer 326 that is in contact with the semiconductor layer 321. The top surface of the insulating layer 326 is preferably planarized.

The semiconductor layer 321 is provided over the insulating layer 326. The semiconductor layer 321 preferably includes a metal oxide (also referred to as an oxide semiconductor) film having semiconductor characteristics.

The pair of conductive layers 325 are provided over and in contact with the semiconductor layer 321 and function as a source electrode and a drain electrode.

An insulating layer 328 is provided to cover the top and side surfaces of the pair of conductive layers 325, the side surface of the semiconductor layer 321, and the like, and an insulating layer 264 is provided over the insulating layer 328. The insulating layer 328 functions as a barrier layer that prevents diffusion of impurities such as water and hydrogen from the insulating layer 264 and the like into the semiconductor layer 321 and release of oxygen from the semiconductor layer 321. As the insulating layer 328, an insulating film similar to the insulating layer 332 can be used.

An opening reaching the semiconductor layer 321 is provided in the insulating layer 328 and the insulating layer 264. The insulating layer 323 that is in contact with the side surfaces of the insulating layer 264, the insulating layer 328, and the conductive layer 325 and the top surface of the semiconductor layer 321, and the conductive layer 324 are embedded in the opening. The conductive layer 324 functions as a second gate electrode, and the insulating layer 323 functions as a second gate insulating layer.

The top surface of the conductive layer 324, the top surface of the insulating layer 323, and the top surface of the insulating layer 264 are planarized so that their levels are the same or substantially the same, and an insulating layer 329 and an insulating layer 265 are provided to cover these layers.

The insulating layer 264 and the insulating layer 265 each function as an interlayer insulating layer. The insulating layer 329 functions as a barrier layer that prevents diffusion of impurities such as water and hydrogen from the insulating layer 265 or the like into the transistor 320. For the insulating layer 329, an insulating film similar to the insulating layer 328 and the insulating layer 332 can be used.

A plug 274 electrically connected to one of the pair of conductive layers 325 is provided to be embedded in the insulating layer 265, the insulating layer 329, and the insulating layer 264. Here, the plug 274 preferably includes a conductive layer 274*a* that covers a side surface of an opening of the insulating layer 265, the insulating layer 329, the insulating layer 264, and the insulating layer 328 and part of the top surface of the conductive layer 325, and a conductive layer 274*b* in contact with the top surface of the conductive layer 274*a*. In this case, a conductive material in which hydrogen and oxygen are less likely to diffuse is preferably used for the conductive layer 274*a*.

The structures of the insulating layer 254 and the components thereover up to the substrate 120 in the display apparatus 100D are similar to those in the display apparatus 100C.

<Display Apparatus 100E>

Figure 35:
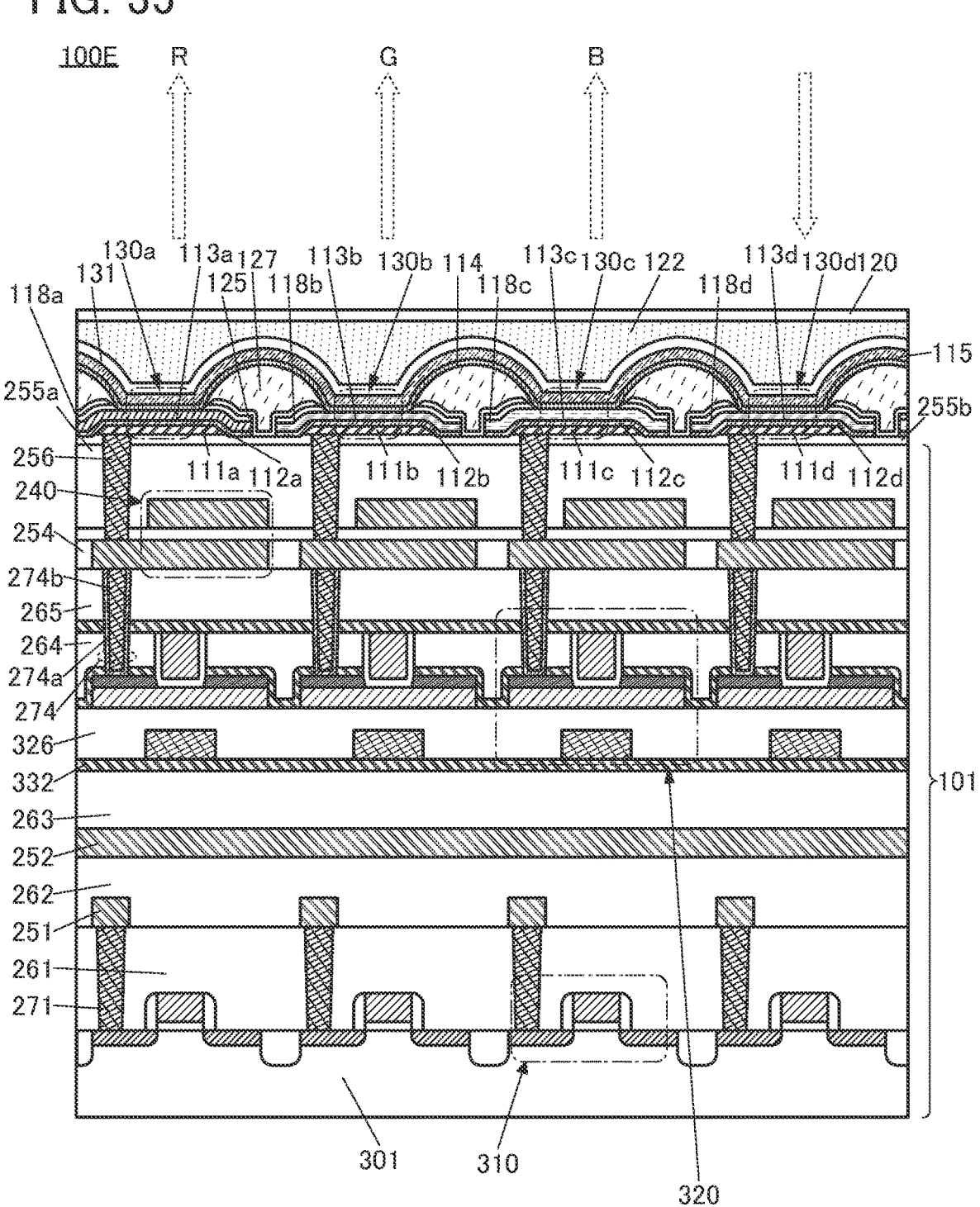
FIG. 35 is a cross-sectional view illustrating an example of a display apparatus.

The display apparatus 100E illustrated in FIG. 35 has a structure where the transistor 310 whose channel is formed in the substrate 301 and the transistor 320 including a metal oxide in the semiconductor layer where the channel is formed are stacked. Note that description of portions similar to those in the display apparatuses 100C and 100D is omitted in some cases.

The insulating layer 261 is provided to cover the transistor 310, and a conductive layer 251 is provided over the insulating layer 261. An insulating layer 262 is provided to cover the conductive layer 251, and a conductive layer 252 is provided over the insulating layer 262. The conductive layer 251 and the conductive layer 252 each function as a wiring. An insulating layer 263 and the insulating layer 332 are provided to cover the conductive layer 252, and the transistor 320 is provided over the insulating layer 332. The insulating layer 265 is provided to cover the transistor 320, and the capacitor 240 is provided over the insulating layer 265. The capacitor 240 and the transistor 320 are electrically connected to each other through the plug 274.

The transistor 320 can be used as a transistor included in the pixel circuit. The transistor 310 can be used as a transistor included in the pixel circuit or a transistor included in a driver circuit for driving the pixel circuit (a gate line driver circuit or a source line driver circuit). The transistor 310 and the transistor 320 can also be used as transistors included in a variety of circuits such as an arithmetic circuit and a memory circuit.

With such a structure, not only the pixel circuit but also the driver circuit and the like can be formed directly under the light-emitting devices; thus, the display apparatus can be downsized as compared with the case where a driver circuit is provided in the periphery of a display region.

<Display Apparatus 100F>

Figure 36:
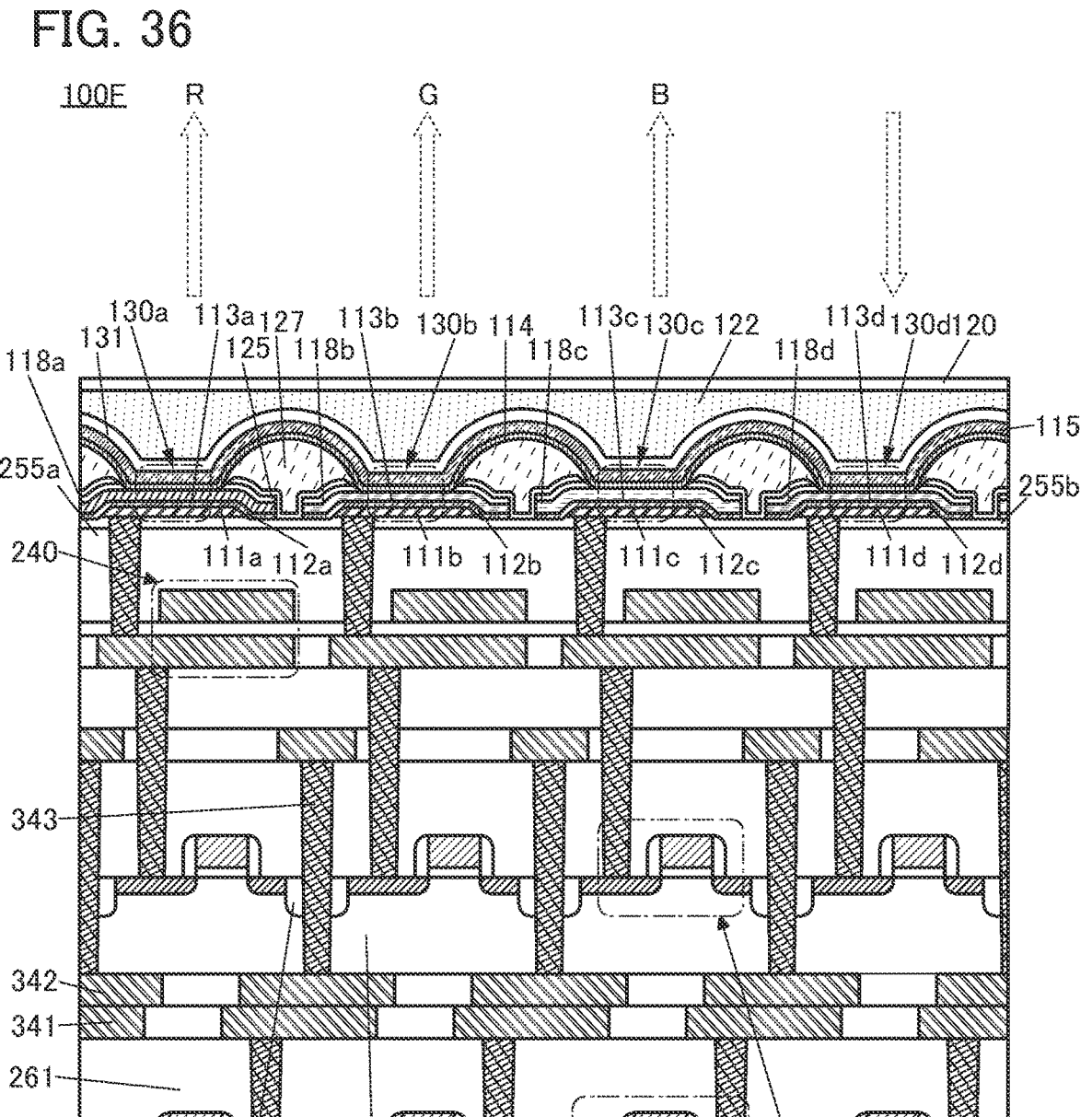
FIG. 36 is a cross-sectional view illustrating an example of a display apparatus.

A display apparatus 100F illustrated in FIG. 36 has a structure where a transistor 310A and a transistor 310B in each of which a channel is formed in a semiconductor substrate are stacked.

In the display apparatus 100F, a substrate 301B provided with the transistor 310B, the capacitor 240, and the light-emitting devices is bonded to a substrate 301A provided with the transistor 310A.

The substrate 301B is provided with a plug 343 that penetrates the substrate 301B. The plug 343 is electrically connected to a conductive layer 342 provided on the rear surface of the substrate 301B (a surface opposite to the substrate 120 side). A conductive layer 341 is provided over the insulating layer 261 over the substrate 301A.

The conductive layer 341 and the conductive layer 342 are bonded to each other, whereby the substrate 301A and the substrate 301B are electrically connected to each other.

The conductive layer 341 and the conductive layer 342 are preferably formed using the same conductive material. For example, a metal film containing an element selected from Al, Cr, Cu, Ta, Ti, Mo, and W, a metal nitride film containing the above element as a component (a titanium nitride film, a molybdenum nitride film, or a tungsten nitride film), or the like can be used. In particular, copper is preferably used for the conductive layer 341 and the conductive layer 342. In that case, it is possible to employ Cu—Cu direct bonding (a technique for establishing electrical continuity by connecting Cu (copper) pads to each other). Note that the conductive layer 341 and the conductive layer 342 may be bonded to each other through a bump.

<Display Apparatus 100G>

Figure 37:
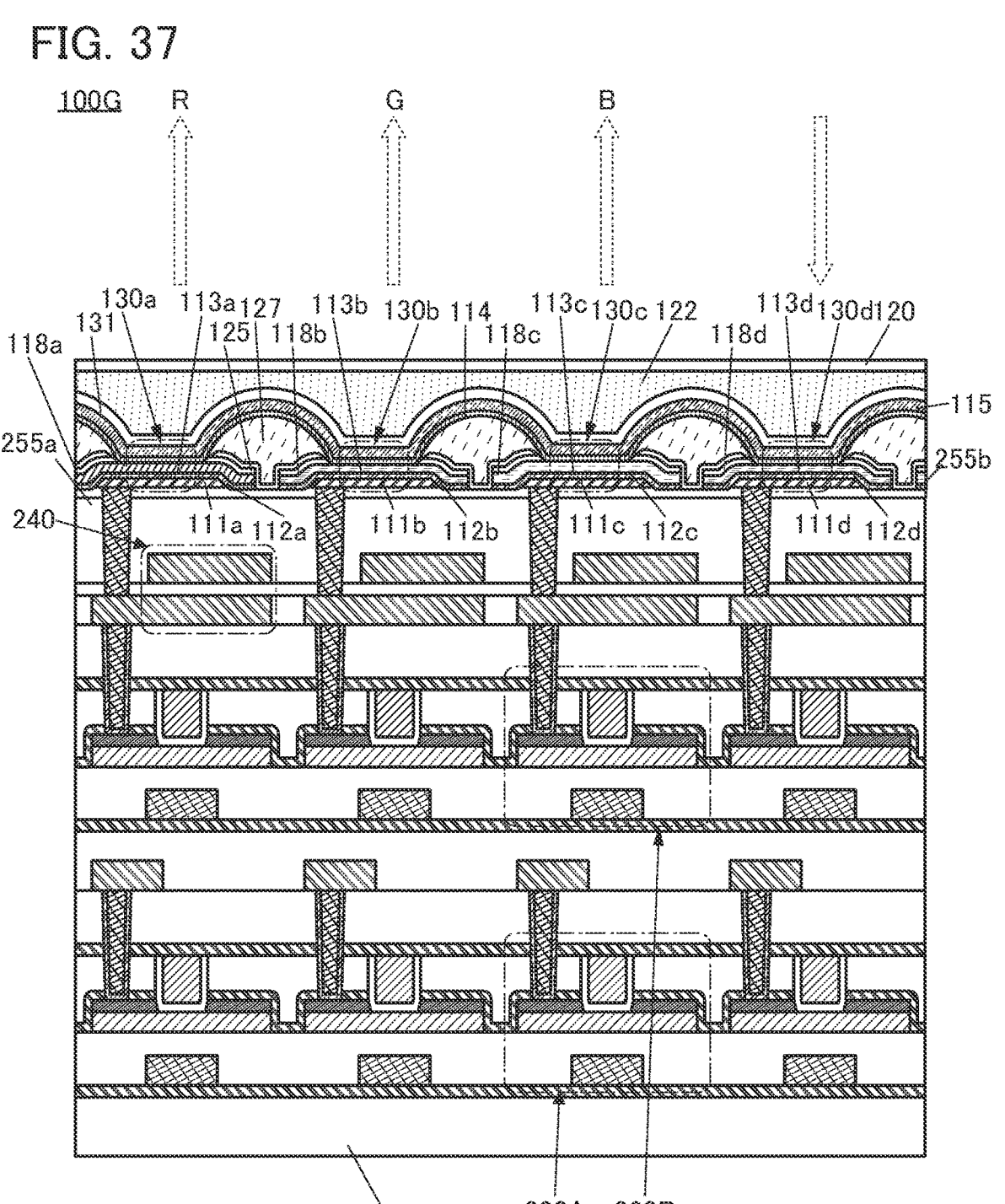
FIG. 37 is a cross-sectional view illustrating an example of a display apparatus.

In a display apparatus 100G illustrated in FIG. 37, a transistor 320A and a transistor 320B each including an oxide semiconductor in a semiconductor layer where a channel is formed are stacked.

The description of the display apparatus 100D can be referred to for the transistor 320A, the transistor 320B, and the components around them.

Although the structure where two transistors including an oxide semiconductor are stacked is described, the present invention is not limited thereto. For example, three or more transistors may be stacked.

<Structure Example of Transistor>

Cross-sectional structure examples of a transistor that can be used for the display apparatuses are described below.

Figure 38A:
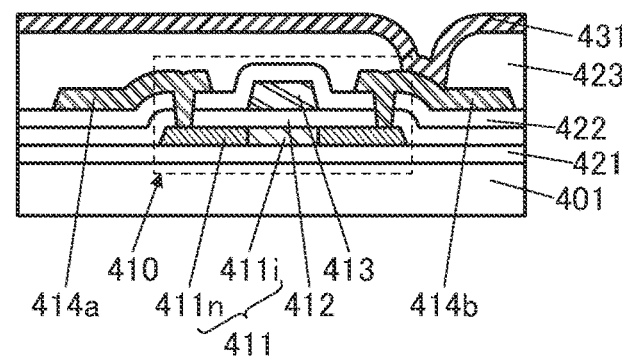
FIG. 38A to FIG. 38D are diagrams illustrating examples of transistors.

FIG. 38A is a cross-sectional view including a transistor 410.

The transistor 410 is a transistor provided over a substrate 401 and includes polycrystalline silicon as its semiconductor layer. For example, the transistor 410 corresponds to the transistor 55B in the pixel circuit 81_2 illustrated in FIG. 41B. In other words, FIG. 38A illustrates an example where one of a source and a drain of the transistor 410 is electrically connected to a conductive layer 431 of the light-emitting device.

The transistor 410 includes a semiconductor layer 411, an insulating layer 412, a conductive layer 413, and the like. The semiconductor layer 411 includes a channel formation region $411i$ and low-resistance regions $411n$. The semiconductor layer 411 contains silicon. The semiconductor layer 411 preferably contains polycrystalline silicon. Part of the insulating layer 412 functions as agate insulating layer. Part of the conductive layer 413 functions as agate electrode.

Alternatively, the semiconductor layer 411 can contain a metal oxide exhibiting semiconductor characteristics (also referred to as an oxide semiconductor). In this case, the transistor 410 can be referred to as an OS transistor.

The low-resistance region $411n$ is a region containing an impurity element. For example, in the case where the transistor 410 is an n-channel transistor, phosphorus, arsenic, or the like is added to the low-resistance region $411n$. Meanwhile, in the case where the transistor 410 is a p-channel transistor, boron, aluminum, or the like is added to the low-resistance region $411n$. In addition, in order to control the threshold voltage of the transistor 410, the above-described impurity may be added to the channel formation region $411i$.

An insulating layer 421 is provided over the substrate 401. The semiconductor layer 411 is provided over the insulating layer 421. The insulating layer 412 is provided to cover the semiconductor layer 411 and the insulating layer 421. The conductive layer 413 is provided at a position that is over the insulating layer 412 and overlaps with the semiconductor layer 411.

An insulating layer 422 is provided to cover the conductive layer 413 and the insulating layer 412. A conductive layer $414a$ and a conductive layer $414b$ are provided over the insulating layer 422. The conductive layer $414a$ and the conductive layer $414b$ are electrically connected to the low-resistance regions $411n$ through the opening portions provided in the insulating layer 422 and the insulating layer 412. Part of the conductive layer $414a$ functions as one of a source electrode and a drain electrode, and part of the conductive layer $414b$ functions as the other of the source electrode and the drain electrode. An insulating layer 423 is provided to cover the conductive layer 414a, the conductive layer 414b, and the insulating layer 422.

The conductive layer 431 functioning as a pixel electrode is provided over the insulating layer 423. The conductive layer 431 is provided over the insulating layer 423 and is electrically connected to the conductive layer 414b through an opening provided in the insulating layer 423. Although not illustrated here, an EL layer and a common electrode can be stacked over the conductive layer 431.

Figure 38B:
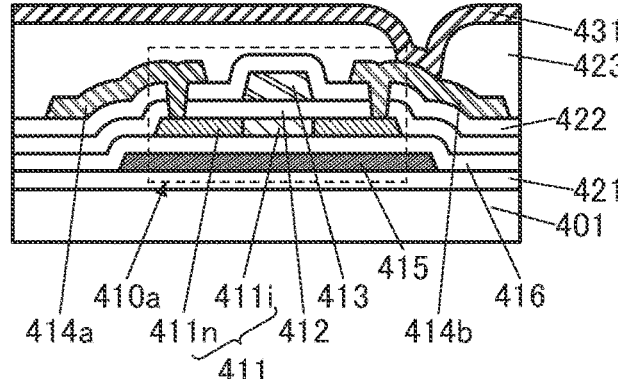

FIG. 38B illustrates a transistor 410a including a pair of gate electrodes. The transistor 410a illustrated in FIG. 38B is different from FIG. 38A mainly in including a conductive layer 415 and an insulating layer 416.

The conductive layer 415 is provided over the insulating layer 421. The insulating layer 416 is provided to cover the conductive layer 415 and the insulating layer 421. The semiconductor layer 411 is provided such that at least the channel formation region 411i overlaps with the conductive layer 415 with the insulating layer 416 therebetween.

In the transistor 410a illustrated in FIG. 38B, part of the conductive layer 413 functions as a first gate electrode, and part of the conductive layer 415 functions as a second gate electrode. At this time, part of the insulating layer 412 functions as a first gate insulating layer, and part of the insulating layer 416 functions as a second gate insulating layer.

Here, to electrically connect the first gate electrode to the second gate electrode, the conductive layer 413 is electrically connected to the conductive layer 415 through an opening portion provided in the insulating layer 412 and the insulating layer 416 in a region not illustrated. To electrically connect the second gate electrode to a source or a drain, the conductive layer 415 is electrically connected to the conductive layer 414a or the conductive layer 414b through an opening portion provided in the insulating layer 422, the insulating layer 412, and the insulating layer 416 in a region not illustrated.

In the case of using LTPS transistors as all of the transistors included in the subpixel 81, the transistor 410 illustrated in FIG. 38A as an example or the transistor 410a illustrated in FIG. 38B as an example can be used. In that case, the transistors 410a may be used as all of the transistors included in the subpixel 81, the transistors 410 may be used as all of the transistors, or the transistors 410a and the transistors 410 may be used in combination.

Described below is an example of a structure including both a transistor including silicon as its semiconductor layer and a transistor including a metal oxide as its semiconductor layer.

Figure 38C:
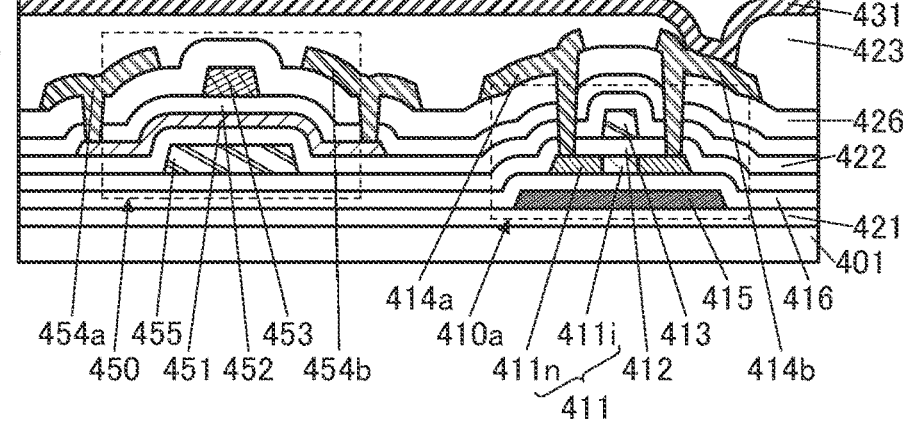

FIG. 38C is a schematic cross-sectional view including the transistor 410a and a transistor 450.

The above description in Structure example 1 can be referred to for the transistor 410a. Although an example using the transistor 410a is illustrated here, a structure including the transistor 410 and the transistor 450 may be employed or a structure including all of the transistor 410, the transistor 410a, and the transistor 450 may be employed.

The transistor 450 is a transistor including a metal oxide as its semiconductor layer. The structure illustrated in FIG. 38C shows an example where the transistor 450 and the transistor 410a correspond to the transistor 55A and the transistor 55B, respectively, in the pixel 81_2. That is, FIG. 38C illustrates an example where one of the source and the drain of the transistor 410a is electrically connected to the conductive layer 431.

FIG. 38C illustrates an example where the transistor 450 includes a pair of gates.

The transistor 450 includes a conductive layer 455, the insulating layer 422, a semiconductor layer 451, an insulating layer 452, a conductive layer 453, and the like. Part of the conductive layer 453 functions as a first gate of the transistor 450, and part of the conductive layer 455 functions as a second gate of the transistor 450. In this case, part of the insulating layer 452 functions as a first gate insulating layer of the transistor 450, and part of the insulating layer 422 functions as a second gate insulating layer of the transistor 450.

The conductive layer 455 is provided over the insulating layer 412. The insulating layer 422 is provided to cover the conductive layer 455. The semiconductor layer 451 is provided over the insulating layer 422. The insulating layer 452 is provided to cover the semiconductor layer 451 and the insulating layer 422. The conductive layer 453 is provided over the insulating layer 452 and includes a region overlapping with the semiconductor layer 451 and the conductive layer 455.

An insulating layer 426 is provided to cover the insulating layer 452 and the conductive layer 453. A conductive layer 454a and a conductive layer 454b are provided over the insulating layer 426. The conductive layer 454a and the conductive layer 454b are electrically connected to the semiconductor layer 451 through opening portions provided in the insulating layer 426 and the insulating layer 452. Part of the conductive layer 454a functions as one of a source electrode and a drain electrode and part of the conductive layer 454b functions as the other of the source electrode and the drain electrode. The insulating layer 423 is provided to cover the conductive layer 454a, the conductive layer 454b, and the insulating layer 426.

Here, the conductive layer 414a and the conductive layer 414b electrically connected to the transistor 410a are preferably formed by processing the same conductive film as the conductive layer 454a and the conductive layer 454b. FIG. 38C illustrates a structure where the conductive layer 414a, the conductive layer 414b, the conductive layer 454a, and the conductive layer 454b are formed on the same plane (i.e., in contact with the top surface of the insulating layer 426) and contain the same metal element. In this case, the conductive layer 414a and the conductive layer 414b are electrically connected to the low-resistance regions 411n through openings provided in the insulating layer 426, the insulating layer 452, the insulating layer 422, and the insulating layer 412. This is preferable because the manufacturing process can be simplified.

The conductive layer 413 functioning as the first gate electrode of the transistor 410a and the conductive layer 455 functioning as the second gate electrode of the transistor 450 are preferably formed by processing the same conductive film. FIG. 38C illustrates a structure where the conductive layer 413 and the conductive layer 455 are formed on the same plane (i.e., in contact with the top surface of the insulating layer 412) and contain the same metal element. This is preferable because the manufacturing process can be simplified.

Figure 38D:
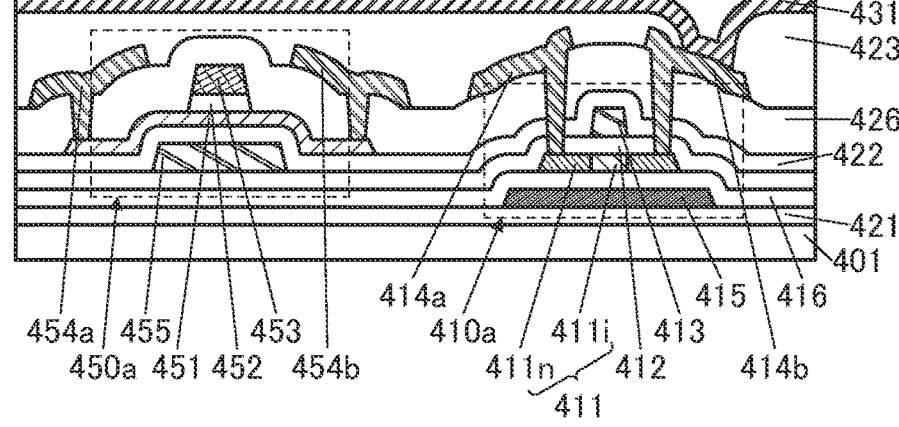

FIG. 38C illustrates a structure where the insulating layer 452 functioning as the first gate insulating layer of the transistor 450 covers an end portion of the semiconductor layer 451; however, as in a transistor 450a illustrated in FIG. 38D, the insulating layer 452 may be processed to have the same or substantially the same top surface shape as the conductive layer 453.

Note that in this specification and the like, the expression "having substantially the same top surface shapes" means that at least outlines of stacked layers partly overlap with each other. For example, the case of processing an upper layer and a lower layer with the use of the same mask pattern or mask patterns that are partly the same is included. However, in some cases, the outlines do not completely overlap with each other and the upper layer is positioned on an inner side of the lower layer or the upper layer is positioned on an outer side of the lower layer; such a case is also represented by the expression "having substantially the same top surface shapes".

Although the example where the transistor 410*a* corresponds to the transistor 55B and is electrically connected to the pixel electrode is shown here, one embodiment of the present invention is not limited thereto. For example, a structure where the transistor 450 or the transistor 450*a* corresponds to the transistor 55B may be employed. In this case, the transistor 410*a* corresponds to the transistor 55A, the transistor 55C, or another transistor.

This embodiment can be combined with any of the other embodiments as appropriate.

Embodiment 6

In this embodiment, electronic devices of one embodiment of the present invention will be described with reference to FIG. 39 to FIG. 41.

An electronic device of this embodiment includes the display apparatus of one embodiment of the present invention in a display portion. The definition and resolution of the display apparatus of one embodiment of the present invention can be easily increased. Thus, the display apparatus of one embodiment of the present invention can be used for display portions of a variety of electronic devices.

Examples of electronic devices include a digital camera, a digital video camera, a digital photo frame, a mobile phone, a portable game machine, a portable information terminal, and an audio reproducing device in addition to electronic devices with a relatively large screen, such as a television device, a desktop or laptop personal computer, a monitor of a computer or the like, digital signage, and a large game machine such as a pachinko machine.

In particular, a display apparatus of one embodiment of the present invention can have high definition, and thus can be suitably used for an electronic device having a relatively small display portion. Examples of such an electronic device include a watch-type or a bracelet-type information terminal device (wearable device), and a wearable device worn on a head, such as a device for VR such as a head-mounted display, a glasses-type device for AR, and a device for MR.

The resolution of the display apparatus of one embodiment of the present invention is preferably as high as HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320). In particular, the resolution is preferably 4K, 8K, or higher. Furthermore, the pixel density (definition) of the display apparatus of one embodiment of the present invention is preferably higher than or equal to 100 ppi, higher than or equal to 300 ppi, further preferably higher than or equal to 500 ppi, still further preferably higher than or equal to 1000 ppi, still further preferably higher than or equal to 2000 ppi, still further preferably higher than or equal to 3000 ppi, still further preferably higher than or equal to 5000 ppi, yet further preferably higher than or equal to 7000 ppi. With the use of such a display apparatus having one or both of high resolution and high definition, the electronic device can have higher realistic sensation, sense of depth, and the like in personal use such as portable use and home use. There is no particular limitation on the screen ratio (aspect ratio) of the display apparatus of one embodiment of the present invention. For example, the display apparatus is compatible with a variety of screen ratios such as 1:1 (square), 4:3, 16:9, and 16:10.

The electronic device in this embodiment may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, odor, or infrared rays).

The electronic device in this embodiment can have a variety of functions. For example, the electronic device can have a function of displaying a variety of information (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Figure 39A:
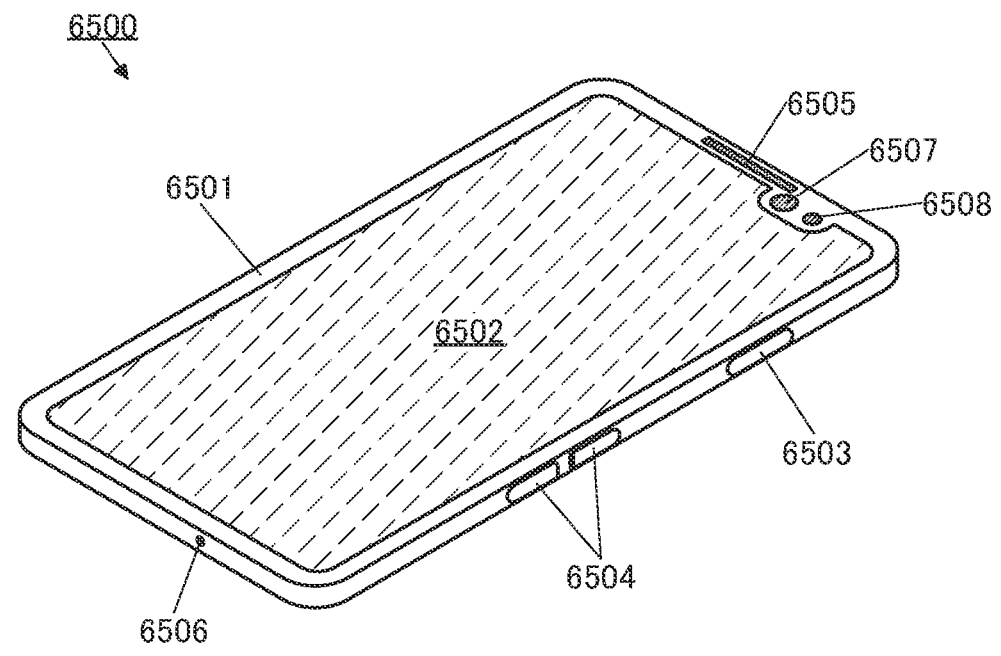
FIG. 39A and FIG. 39B are diagrams illustrating examples of electronic devices.

An electronic device 6500 illustrated in FIG. 39A is a portable information terminal that can be used as a smartphone.

The electronic device 6500 includes a housing 6501, a display portion 6502, a power button 6503, buttons 6504, a speaker 6505, a microphone 6506, a camera 6507, a light source 6508, and the like. The display portion 6502 has a touch panel function.

The display apparatus of one embodiment of the present invention can be used in the display portion 6502.

Figure 39B:
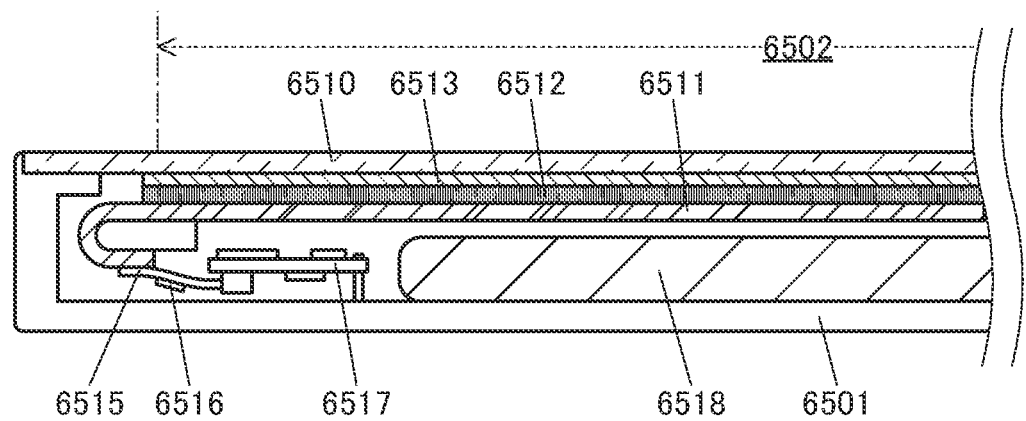

FIG. 39B is a schematic cross-sectional view including an end portion of the housing 6501 on the microphone 6506 side.

A protection member 6510 having a light-transmitting property is provided on a display surface side of the housing 6501, and a display panel 6511, an optical member 6512, a touch sensor panel 6513, a printed circuit board 6517, a battery 6518, and the like are placed in a space surrounded by the housing 6501 and the protection member 6510.

The display panel 6511, the optical member 6512, and the touch sensor panel 6513 are fixed to the protection member 6510 with an adhesive layer (not illustrated).

Part of the display panel 6511 is folded back in a region outside the display portion 6502, and an FPC 6515 is connected to the part that is folded back. An IC 6516 is mounted on the FPC 6515. The FPC 6515 is connected to a terminal provided on the printed circuit board 6517.

A flexible display of one embodiment of the present invention can be used as the display panel 6511. Thus, an extremely lightweight electronic device can be achieved. Since the display panel 6511 is extremely thin, the battery 6518 with high capacity can be mounted while the thickness of the electronic device is reduced. Moreover, part of the display panel 6511 is folded back so that a connection portion with the FPC 6515 is placed on the back side of a pixel portion, whereby an electronic device with a narrow bezel can be achieved.

FIG. 40A illustrates an example of a television device. In a television device 7100, a display portion 7000 is incorporated in a housing 7101. Here, the housing 7101 is supported by a stand 7103.

The display apparatus of one embodiment of the present invention can be used for the display portion 7000.

Operation of the television device 7100 illustrated in FIG. 40A can be performed with an operation switch provided in the housing 7101 and a separate remote controller 7111. Alternatively, the display portion 7000 may be provided with a touch sensor, and the television device 7100 may be operated by touch on the display portion 7000 with a finger or the like. The remote controller 7111 may include a display portion for displaying information output from the remote controller 7111. With operation keys or a touch panel provided in the remote controller 7111, channels and volume can be operated and an image displayed on the display portion 7000 can be operated.

Note that the television device 7100 has a structure where a receiver, a modem, and the like are provided. A general television broadcast can be received with the receiver. When the television device is connected to a communication network with or without wires via the modem, one-way (from a transmitter to a receiver) or two-way (between a transmitter and a receiver or between receivers, for example) data communication can be performed.

FIG. 40B illustrates an example of a laptop personal computer. A laptop personal computer 7200 includes a housing 7211, a keyboard 7212, a pointing device 7213, an external connection port 7214, and the like. In the housing 7211, the display portion 7000 is incorporated.

The display apparatus of one embodiment of the present invention can be used for the display portion 7000.

FIG. 40C and FIG. 40D illustrate examples of digital signage.

Digital signage 7300 illustrated in FIG. 40C includes a housing 7301, the display portion 7000, a speaker 7303, and the like. The digital signage 7300 can also include an LED lamp, an operation key (including a power switch or an operation switch), a connection terminal, a variety of sensors, a microphone, and the like.

FIG. 40D is digital signage 7400 attached to a cylindrical pillar 7401. The digital signage 7400 includes the display portion 7000 provided along a curved surface of the pillar 7401.

The display apparatus of one embodiment of the present invention can be used for the display portion 7000 in FIG. 40C and FIG. 40D.

A larger area of the display portion 7000 can increase the amount of information that can be provided at a time. The larger display portion 7000 attracts more attentions, so that the effectiveness of the advertisement can be increased, for example.

The use of a touch panel in the display portion 7000 is preferable because in addition to display of an image or a moving image on the display portion 7000, intuitive operation by a user is possible. Moreover, for an application for providing information such as route information or traffic information, usability with intuitive operation can be enhanced.

As illustrated in FIG. 40C and FIG. 40D, preferably, the digital signage 7300 or the digital signage 7400 can work with an information terminal 7311 or an information terminal 7411 such as a smartphone of a user through wireless communication. For example, information of an advertisement displayed on the display portion 7000 can be displayed on a screen of the information terminal 7311 or the information terminal 7411. By operation of the information terminal 7311 or the information terminal 7411, display on the display portion 7000 can be switched.

It is possible to make the digital signage 7300 or the digital signage 7400 execute a game with use of the screen of the information terminal 7311 or the information terminal 7411 as an operation means (controller). Thus, an unspecified number of users can join in and enjoy the game at the same time.

Electronic devices illustrated in FIG. 41A to FIG. 41F each include a housing 9000, a display portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, odor, or infrared rays), a microphone 9008, and the like.

The electronic devices illustrated in FIG. 41A to FIG. 41F have a variety of functions. For example, the electronic devices can have a function of displaying a variety of information (a still image, a moving image, a text image, and the like) on the display portion, a touch panel function, a function of displaying a calendar, date, time, and the like, a function of controlling processing with the use of a variety of software (programs), a wireless communication function, and a function of reading out and processing a program or data stored in a recording medium. Note that the functions of the electronic devices are not limited thereto, and the electronic devices can have a variety of functions. The electronic devices may each include a plurality of display portions. The electronic devices may each be provided with a camera or the like and have a function of taking a still image or a moving image, a function of storing the taken image in a recording medium (an external recording medium or a recording medium incorporated in the camera), a function of displaying the taken image on the display portion, or the like.

The electronic devices illustrated in FIG. 41A to FIG. 41F will be described in detail below.

FIG. 41A is a perspective view illustrating a portable information terminal 9101. For example, the portable information terminal 9101 can be used as a smartphone. Note that the portable information terminal 9101 may include the speaker 9003, the connection terminal 9006, the sensor 9007, or the like. The portable information terminal 9101 can display characters and image information on its plurality of surfaces. FIG. 41A illustrates an example where three icons 9050 are displayed. Furthermore, information 9051 indicated by dashed rectangles can be displayed on another surface of the display portion 9001. Examples of the information 9051 include notification of reception of an e-mail, an SNS message, or an incoming call, the title and sender of an e-mail, an SNS message, or the like, the date, the time, remaining battery, and the radio field intensity. Alternatively, the icon 9050 or the like may be displayed at the position where the information 9051 is displayed.

FIG. 41B is a perspective view illustrating a portable information terminal 9102. The portable information terminal 9102 has a function of displaying information on three or more surfaces of the display portion 9001. Here, an example is illustrated where information 9052, information 9053, and information 9054 are displayed on different surfaces. For example, a user of the portable information terminal 9102 can check the information 9053 displayed such that it can be seen from above the portable information terminal 9102, with the portable information terminal 9102 put in a breast pocket of his/her clothes. The user can see the display without taking out the portable information terminal 9102 from the pocket and decide whether to answer the call, for example.

FIG. 41C is a perspective view illustrating a watch-type portable information terminal 9200. For example, the portable information terminal 9200 can be used as a Smartwatch (registered trademark). The display surface of the display portion 9001 is curved, and display can be performed on the curved display surface. Furthermore, intercommunication between the portable information terminal 9200 and, for example, a headset capable of wireless communication enables hands-free calling. With the connection terminal 9006, the portable information terminal 9200 can perform mutual data transmission with another information terminal and charging. Note that the charging operation may be performed by wireless power feeding.

FIG. 41D to FIG. 41F are perspective views illustrating a foldable portable information terminal 9201. FIG. 41D is a perspective view of an opened state of the portable information terminal 9201, FIG. 41F is a perspective view of a folded state thereof, and FIG. 41E is a perspective view of a state in the middle of change from one of FIG. 41D and FIG. 41F to the other. The portable information terminal 9201 is highly portable in the folded state and is highly browsable in the opened state because of a seamless large display region. The display portion 9001 of the portable information terminal 9201 is supported by three housings 9000 joined together by hinges 9055. The display portion 9001 can be folded with a radius of curvature of greater than or equal to 0.1 mm and less than or equal to 150 mm, for example.

This embodiment can be combined with any of the other embodiments as appropriate.

SUPPLEMENTARY NOTES ON DESCRIPTION IN THIS SPECIFICATION AND THE LIKE

The following are notes on the description of the structures in the foregoing embodiments and the structures in the embodiments.

One embodiment of the present invention can be constituted by appropriately combining the structure described in an embodiment with any of the structures described in the other embodiments. In addition, in the case where a plurality of structure examples are described in one embodiment, some of the structure examples can be combined as appropriate.

Note that a content (or part thereof) described in one embodiment can be applied to, combined with, or replaced with another content (or part thereof) described in the embodiment and/or a content (or part thereof) described in another embodiment or other embodiments, for example.

Note that in each embodiment, a content described in the embodiment is a content described using a variety of diagrams or a content described with text disclosed in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

In this specification and the like, components are classified according to their functions, and illustrated as blocks independent of one another in block diagrams. However, in an actual circuit or the like, it is difficult to classify components according to their functions, and there is such a case where one circuit relates to a plurality of functions or a case where a plurality of circuits relate to one function. Therefore, the blocks in the block diagrams are not limited by the components described in the specification, and the description can be changed appropriately depending on the situation.

In drawings, the size, the layer thickness, or the region is shown arbitrarily for description convenience. Therefore, the size, the layer thickness, or the region is not limited to the illustrated scale. Note that the drawings schematically illustrates components for clarity, and embodiments of the present invention are not limited to shapes, values, or the like illustrated in the drawings. For example, variations in a signal, a voltage, or a current due to noise, variations in a signal, a voltage, or a current due to difference in timing, or the like can be included.

In this specification and the like, the terms "one of a source and a drain" (or a first electrode or a first terminal) and "the other of the source and the drain" (or a second electrode or a second terminal) are used to describe the connection relationship of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In addition, in this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

In this specification and the like, voltage and potential can be replaced with each other as appropriate. The term voltage refers to a potential difference from a reference potential, and when the reference potential is a ground potential, for example, voltage can be replaced with potential. The ground potential does not necessarily mean 0 V. Potentials are relative values, and a potential supplied to a wiring or the like is sometimes changed depending on the reference potential.

In this specification and the like, the terms "film" and "layer" can be interchanged with each other depending on the case or circumstances. For example, the term "conductive layer" can be changed into the term "conductive film" in some cases. Also, for example, the term "insulating film" can be changed into the term "insulating layer" in some cases.

In this specification and the like, a switch is in a conduction state (on state) or in a non-conduction state (off state) to determine whether current flows therethrough or not. Alternatively, a switch has a function of selecting and changing a current path.

In this specification and the like, the channel length refers to, for example, the distance between a source and a drain in a region where a semiconductor (or a portion where current flows in a semiconductor when a transistor is in an on state) and a gate overlap with each other or a region where a channel is formed in a top view of the transistor.

In this specification and the like, the channel width refers to, for example, the length of a portion where a source and a drain face each other in a region where a semiconductor (or a portion where current flows in a semiconductor when a transistor is in an on state) and a gate electrode overlap with each other or a region where a channel is formed.

In this specification and the like, the expression "A and B are connected" means the case where A and B are electrically connected as well as the case where A and B are directly connected. Here, the expression "A and B are electrically connected" means the case where electric signals can be transmitted and received between A and B when an object having any electric action is present between A and B.

REFERENCE NUMERALS

10: display apparatus, 21: timing control circuit, 22: image processor, 23: application processor, 30: driver circuit portion, 31: display portion driver circuit, 32: sensor portion driver circuit, 40: switching portion, 41: analog switch, 50: switching portion, 51: analog switch, 60: switching portion, 61: light-emitting device, 62: light-receiving device, 63: analog switch, 71: display portion, 72: signal line driver circuit, 73: gate line driver circuit, 74: control line driver circuit, 75: signal readout circuit, 80: pixel, 81B: subpixel, 81G: subpixel, 81R: subpixel, 82PS: subpixel

The invention claimed is:

1. A display apparatus comprising:
   a display portion comprising:
      a first subpixel including a light-emitting device;
      a second subpixel including a light-receiving device;
      a first gate line supplied with a first selection signal to scan the first subpixel; and
      a second gate line supplied with a second selection signal to scan the second subpixel;
   a gate line driver circuit comprising:
      a display portion driver circuit configured to generate the first selection signal;
      a sensor portion driver circuit configured to generate the second selection signal, the sensor portion driver circuit located adjacent to the display portion driver circuit; and
      a first switching portion configured to be input with the first selection signal and the second selection signal;
   a second switching portion configured to allot the first selection signal or the second selection signal output from the gate line driver circuit to the first gate line or the second gate line to be output; and
   a timing control circuit configured to control the first switching portion and the second switching portion,
   wherein the second switching portion is provided between the first switching portion and the display portion,
   wherein the timing control circuit is configured to switch between a display operation and a light detection operation,
   wherein the gate line driver circuit is configured to output the first selection signal with a first frame frequency and the second selection signal having a selection period shorter than the first selection signal in the display operation, and
   wherein the gate line driver circuit is configured to output the first selection signal with a second frame frequency lower than the first frame frequency and the second selection signal having a selection period equivalent to a selection period of the first selection signal in the light detection operation.

2. The display apparatus according to claim 1, wherein the first switching portion and the second switching portion each comprise a plurality of analog switches.

3. The display apparatus according to claim 1, further comprising an image processor,
   wherein the image processor is configured to output a switching signal that controls the timing control circuit in accordance with a detection state or a non-detection state of an object when the light detection operation is executed.

4. The display apparatus according to claim 1,
   wherein the light-emitting device is configured to emit visible light, and
   wherein the light-receiving device is configured to detect visible light.

5. The display apparatus according to claim 1,
   wherein the light-emitting device is configured to emit infrared light, and
   wherein the light-receiving device is configured to detect infrared light.

6. A display module comprising the display apparatus according to claim 1 and at least one of a connector and an integrated circuit.

7. An electronic device comprising the display module according to claim 6 and at least one of a housing, a battery, a camera, a speaker, and a microphone.

8. The display apparatus according to claim 1, wherein the display portion driver circuit and the sensor portion driver circuit are configured to switch between the first selection signal and the second selection signal to be output based on a signal output from a common shift register.

9. A display apparatus comprising:
   a display portion comprising:
      a first subpixel including a light-emitting device;
      a second subpixel including a light-receiving device;
      a first gate line supplied with a first selection signal to scan the first subpixel; and
      a second gate line supplied with a second selection signal to scan the second subpixel;
   a gate line driver circuit comprising:
      a display portion driver circuit configured to generate the first selection signal;
      a sensor portion driver circuit configured to generate the second selection signal, the sensor portion driver circuit located adjacent to the display portion driver circuit; and
      a first switching portion configured to be input with the first selection signal and the second selection signal;
   a second switching portion configured to allot the first selection signal or the second selection signal output from the gate line driver circuit to the first gate line or the second gate line to be output; and
   a timing control circuit configured to control the first switching portion and the second switching portion,
   wherein the second switching portion is provided between the first switching portion and the display portion,
   wherein the timing control circuit is configured to switch between a display operation by driving the light-emitting device and a detection operation by driving the light-receiving device,
   wherein the gate line driver circuit is configured to output the first selection signal with a first frame frequency and the second selection signal having a selection period shorter than the first selection signal in the display operation, and
   wherein the gate line driver circuit is configured to output the first selection signal with a second frame frequency lower than the first frame frequency and the second selection signal having a selection period equivalent to a selection period of the first selection signal in the detection operation.

10. The display apparatus according to claim 9, wherein each of the first switching portion and the second switching portion comprises a plurality of analog switches.

11. The display apparatus according to claim 9, further comprising an image processor, wherein the image processor is configured to output a switching signal that controls the timing control circuit in accordance with a detection state or a non-detection state of an object when the detection operation is executed.

12. The display apparatus according to claim 9, wherein the light-emitting device is configured to emit visible light, and wherein the light-receiving device is configured to detect visible light.

13. The display apparatus according to claim 9, wherein the light-emitting device is configured to emit infrared light, and wherein the light-receiving device is configured to detect infrared light.

14. A display module comprising the display apparatus according to claim 9 and at least one of a connector and an integrated circuit.

15. An electronic device comprising the display module according to claim 14 and at least one of a housing, a battery, a camera, a speaker, and a microphone.

16. The display apparatus according to claim 9, wherein the display portion driver circuit and the sensor portion driver circuit are configured to switch between the first selection signal and the second selection signal to be output based on a signal output from a common shift register.

\* \* \* \* \*